US010139793B2

(12) United States Patent
Yamada et al.

(10) Patent No.: US 10,139,793 B2
(45) Date of Patent: Nov. 27, 2018

(54) METHOD FOR CONTROLLING TERMINAL DEVICE THAT REMOTELY OPERATES AIR CONDITIONER

(71) Applicant: Panasonic Intellectual Property Corporation of America, Torrance, CA (US)

(72) Inventors: Kazushige Yamada, Kanagawa (JP); Taiji Sasaki, Osaka (JP); Masashi Sugiyama, Osaka (JP); Yoichi Nishida, Osaka (JP); Tetsuji Fuchikami, Osaka (JP); Shunji Harada, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 399 days.

(21) Appl. No.: 14/951,600

(22) Filed: Nov. 25, 2015

(65) Prior Publication Data

US 2016/0161960 A1    Jun. 9, 2016

(30) Foreign Application Priority Data

Dec. 9, 2014   (JP) .................................. 2014-248516

(51) Int. Cl.
*G06F 19/00* (2018.01)
*G05B 15/02* (2006.01)
(Continued)

(52) U.S. Cl.
CPC .............. *G05B 15/02* (2013.01); *F24F 11/30* (2018.01); *G05D 23/1904* (2013.01);
(Continued)

(58) Field of Classification Search
CPC ...... G05B 15/02; G06F 3/04847; F24F 11/30; F24F 11/56; F24F 2110/10;
(Continued)

(56) References Cited

U.S. PATENT DOCUMENTS

2011/0046798 A1* 2/2011 Imes .................... H04L 67/42
700/286
2012/0131504 A1* 5/2012 Fadell ................. F24D 19/1084
715/810

(Continued)

FOREIGN PATENT DOCUMENTS

JP      2001-343477      12/2001
JP      2013-076493      4/2013

OTHER PUBLICATIONS

"Hitachi air conditional mobile control" [online], [retrieved on Sep. 17, 2014], Internet<URL:https://itunes.apple.com/jp/app/ri-lieakonmobairukontororu/id615848889?mt=8>.

*Primary Examiner* — Michael D Masinick
(74) *Attorney, Agent, or Firm* — Greenblum & Bernstein, P.L.C.

(57) ABSTRACT

Acquiring correspondence among a plurality of time zones and target upper limit temperatures and target lower limit temperatures of the air conditioner that correspond to the respective plurality of time zones. A display allows a user to set the preset temperatures of the air conditioner in the respective plurality of time zones. The display includes a graph region having a first axis corresponding to the plurality of time zones and a second axis corresponding to the preset temperatures of the air conditioner. The graph region includes, in each of the plurality of time zones, a first temperature region having a first appearance and a second temperature region displayed having a second appearance. A symbol indicative of a corresponding preset temperature is displayed in the first temperature region in a corresponding one of the plurality of time zones in the graph region.

12 Claims, 29 Drawing Sheets

(51) Int. Cl.
   *G06F 3/0484*    (2013.01)
   *G05D 23/19*     (2006.01)
   *F24F 11/30*     (2018.01)
   F24F 110/10      (2018.01)
   F24F 11/56       (2018.01)

(52) U.S. Cl.
   CPC ..... *G05D 23/1905* (2013.01); *G06F 3/04847* (2013.01); *F24F 11/56* (2018.01); *F24F 2110/10* (2018.01)

(58) Field of Classification Search
   CPC ........... G05D 23/1904; G05D 23/1905; G05D 23/1917; G06T 11/206
   See application file for complete search history.

(56) References Cited

U.S. PATENT DOCUMENTS

| | | | | |
|---|---|---|---|---|
| 2013/0013118 | A1* | 1/2013 | Merkulov | G05D 23/1902 700/286 |
| 2013/0263034 | A1* | 10/2013 | Bruck | F24F 11/0086 715/771 |
| 2014/0058567 | A1* | 2/2014 | Matsuoka | G05D 23/1917 700/276 |

* cited by examiner

FIG. 3

| TEMPERATURE RANGE INFORMATION | | |
|---|---|---|
| SCHEDULED TIME | UPPER LIMIT TEMPERATURE | LOWER LIMIT TEMPERATURE |
| 11 O'CLOCK | 28 DEGREES | 22 DEGREES |
| 0 O'CLOCK | 28 DEGREES | 22 DEGREES |
| 1 O'CLOCK | 29 DEGREES | 21 DEGREES |
| 2 O'CLOCK | 28 DEGREES | 22 DEGREES |
| ⋮ | ⋮ | ⋮ |

FIG. 4

| SETTING INFORMATION | | | | |
|---|---|---|---|---|
| SCHEDULED TIME | OPERATION MODE | PRESET TEMPERATURE | WIND DIRECTION | AIR VOLUME |
| 11 O'CLOCK | COOLING | 22 DEGREES | UPPER | STRONG |
| 0 O'CLOCK | OFF | 25 DEGREES | UPPER | STRONG |
| 1 O'CLOCK | COOLING | 25 DEGREES | UPPER RIGHT | WEAK |
| 2 O'CLOCK | DEHUMIDIFICATION | 22 DEGREES | UPPER RIGHT | WEAK |
| ⋮ | ⋮ | ⋮ | ⋮ | ⋮ |

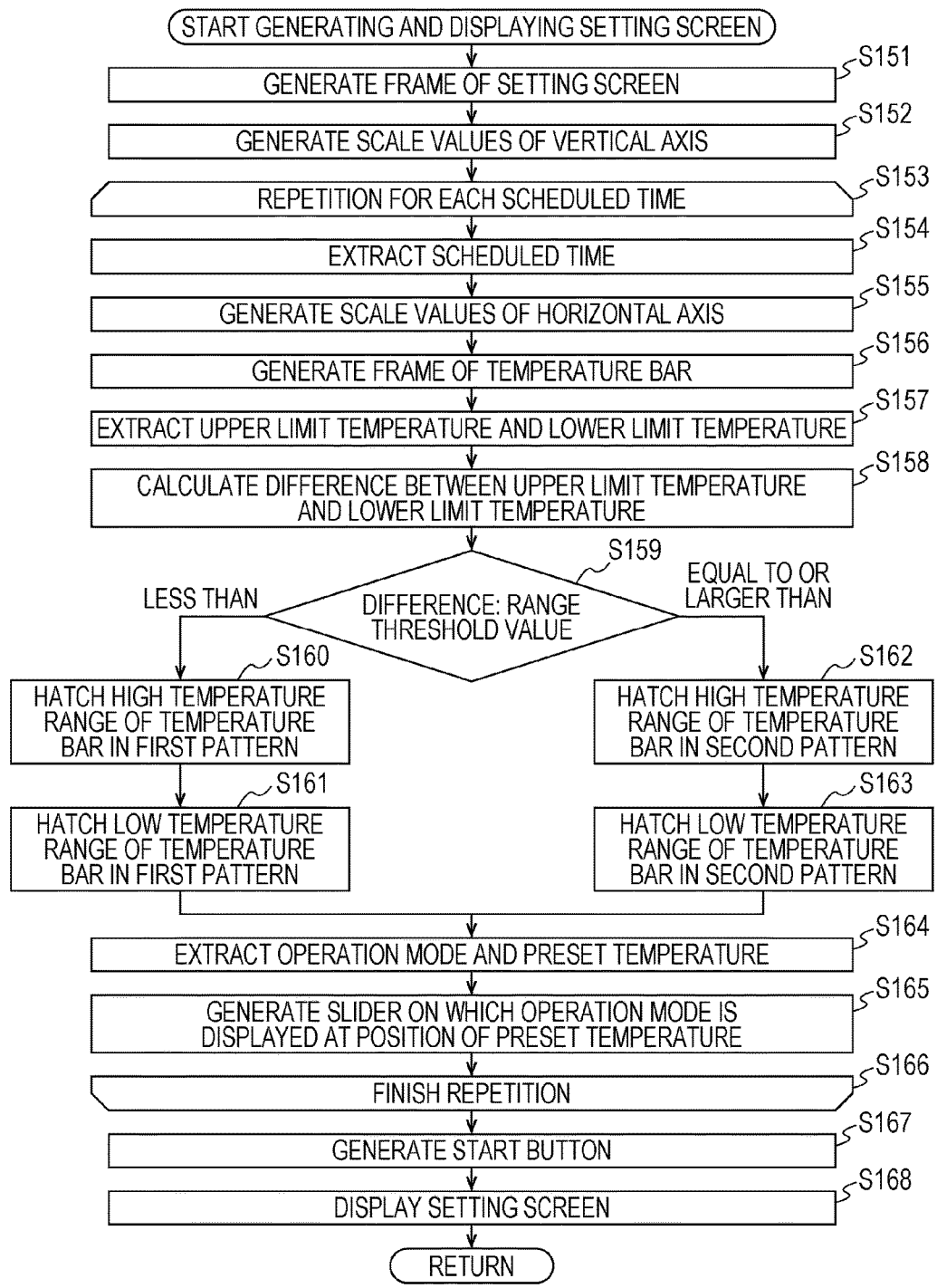

METHOD FOR CONTROLLING TERMINAL DEVICE THAT REMOTELY OPERATES AIR CONDITIONER

BACKGROUND

1. Technical Field

The present disclosure relates to a technique used in a terminal device that remotely operates an air conditioner.

2. Description of the Related Art

As a result of partial revision of interpretation of a ministerial ordinance that stipulates technical standards of electrical appliances (May 10, 2013), the regulations on apparatuses, such as an air conditioner, having a remote control mechanism using a communication line was eased. As a result, the number of application programs having a function of remotely operating an air conditioner by using a mobile terminal such as a smartphone or a tablet is increasing.

According to the technique disclosed in "HITACHI Eakon Mobairu Kontororu (HITACHI air conditional mobile control)" [online], [retrieved on Sep. 17, 2014], Internet<URL:https://itunes.apple.com/jp/app/ri-lieakon-mobairukontororu/id615848889?mt=8> (hereinafter referred to as Non-Patent Literature 1), it is possible to remotely operate an air conditioner by displaying, on a smartphone, a screen similar to an operation panel of an infrared remote control.

According to the technique disclosed in Japanese Unexamined Patent Application Publication No. 2013-76493 (hereinafter referred to as Patent Literature 1), it is possible to set temperatures of an air conditioner in respective time zones by touch operation on a screen of a smartphone on which a graph screen is displayed. According to the technique disclosed in Japanese Unexamined Patent Application Publication No. 2001-343477 (hereinafter referred to as Patent Literature 2), it is possible to set temperatures at respective times by operating knob members for the respective times provided in a remote control.

However, the control methods disclosed in Non-Patent Literature 1, Patent Literature 1, and Patent Literature 2 needed further improvements.

SUMMARY

In one general aspect, the techniques disclosed here feature a method of providing an interface of an apparatus that controls an air conditioner via a network, including a computer, a memory, and a display, comprising causing the computer to: acquire information, stored in the memory, on correspondence among a plurality of time zones and target upper limit temperatures and target lower limit temperatures of the air conditioner that correspond to the respective plurality of time zones, the target upper limit temperatures being upper limit values of recommended preset temperatures of the air conditioner, and the target lower limit temperatures being lower limit values of the recommended preset temperatures of the air conditioner; and display, on the display, a setting screen that allows a user to set the preset temperatures of the air conditioner in the respective plurality of time zones, the setting screen including a graph region in which a graph whose first axis corresponds to the plurality of time zones and whose second axis corresponds to the preset temperatures of the air conditioner is displayed, the graph region including, in each of the plurality of time zones, a first temperature region displayed having a first appearance and a second temperature region displayed having a second appearance, the first temperature region being a temperature region that is not less than the target lower limit temperatures and not more than the target upper limit temperatures, the second temperature region being a temperature region other than the first temperature region, and a symbol indicative of a corresponding preset temperature being displayed in the first temperature region in a corresponding one of the plurality of time zones in the graph region.

According to the aspect of the present disclosure, further improvements have been accomplished.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 illustrates an example of a data structure of a temperature range table;

FIG. 4 illustrates an example of a data structure of an air conditioner control information table;

FIG. 11 is a flow chart illustrating operation for generating and displaying a setting screen;

DETAILED DESCRIPTION

Underlying Knowledge Forming Basis of the Present Disclosure

In recent years, the number of application programs having a function of remotely operating an air conditioner by using a mobile terminal such as a smartphone or a tablet is increasing.

Figure 37:
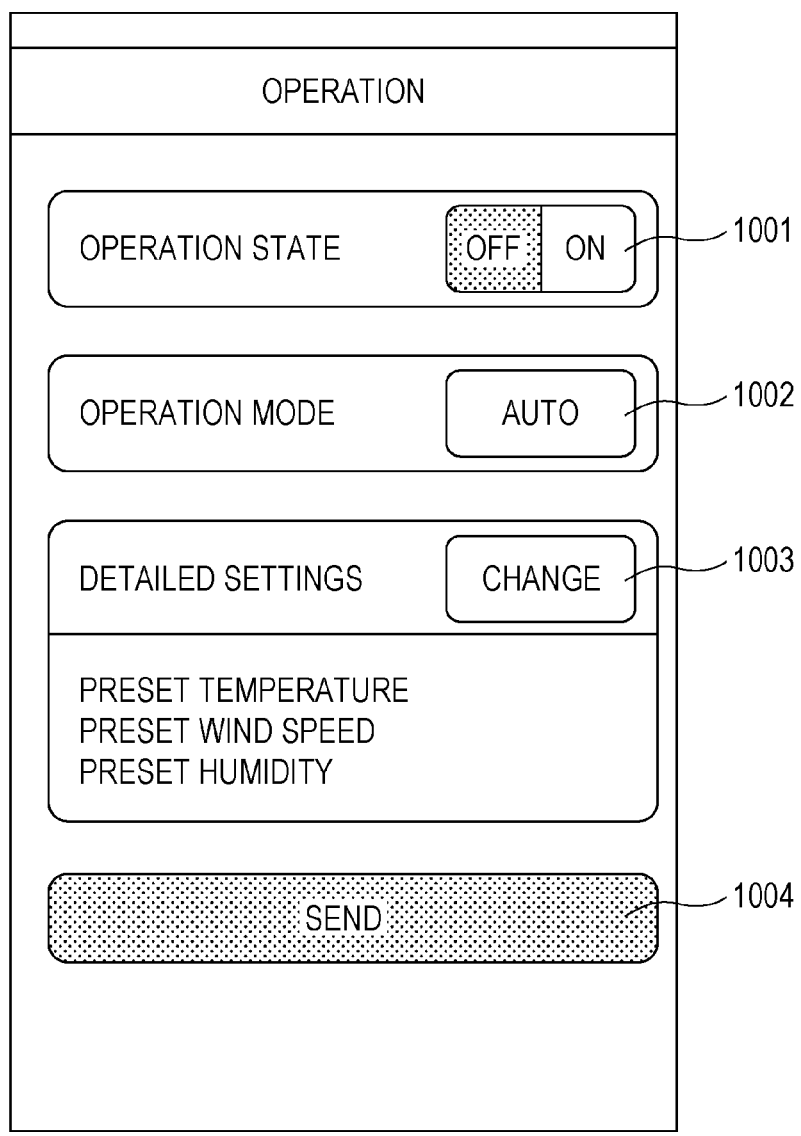
FIG. 37 is a diagram illustrating a setting screen in Non-Patent Literature 1.

According to the technique disclosed in Non-Patent Literature 1, it is possible to remotely operate an air conditioner by displaying, on a smartphone, a screen similar to an operation panel of an infrared remote control. FIG. 37 illustrates a setting screen of a mobile terminal described in Non-Patent Literature 1. A shutdown button 1001, a mode change button 1002, a detailed setting change button 1003, and a send button 1004 are displayed on the setting screen.

The shutdown button 1001 is used to turn on or off the air conditioner. The mode change button 1002 is used to switch a mode such as cooling or heating. The detailed setting change button 1003 is used to change the temperature, wind speed, humidity, and the like. When the send button 1004 is pressed after completion of the settings, setting information is sent to the air conditioner.

Figure 38:
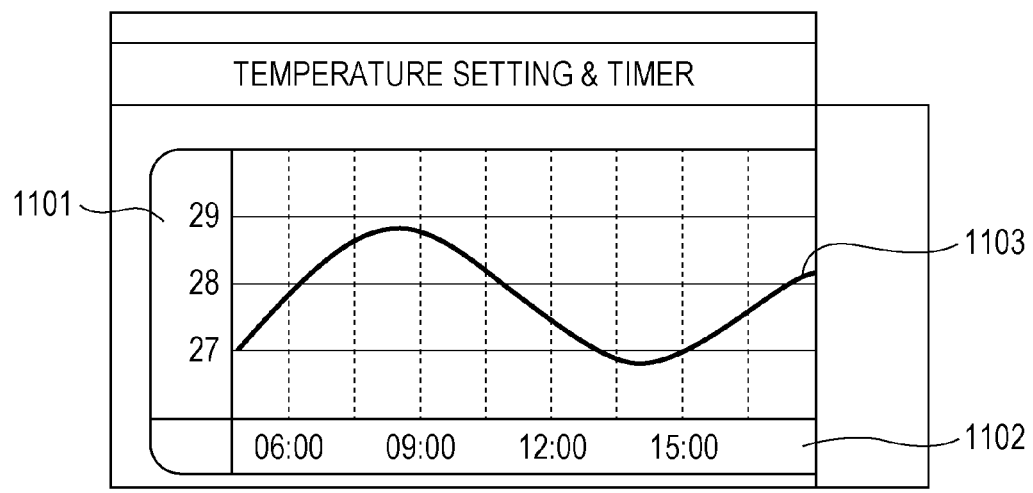
FIG. 38 is a diagram illustrating a setting screen in Patent Literature 1.

According to the technique disclosed in Patent Literature 1, it is possible to set temperatures of an air conditioner in respective time zones by touch operation on a screen of a smartphone on which a graph screen is displayed. FIG. 38 illustrates a temperature setting screen displayed on a touch panel of a smartphone described in Patent Literature 1. In FIG. 38, a vertical axis 1101 represents a preset temperature, and a horizontal axis 1102 represents passage of time. A curve 1103 represents preset temperatures at respective times. A user touches a portion of the curve 1103 that corresponds to a desired time and then slides the portion in the vertical axis direction. This makes it possible to change a preset temperature of the air conditioner at the desired time.

Figure 39:
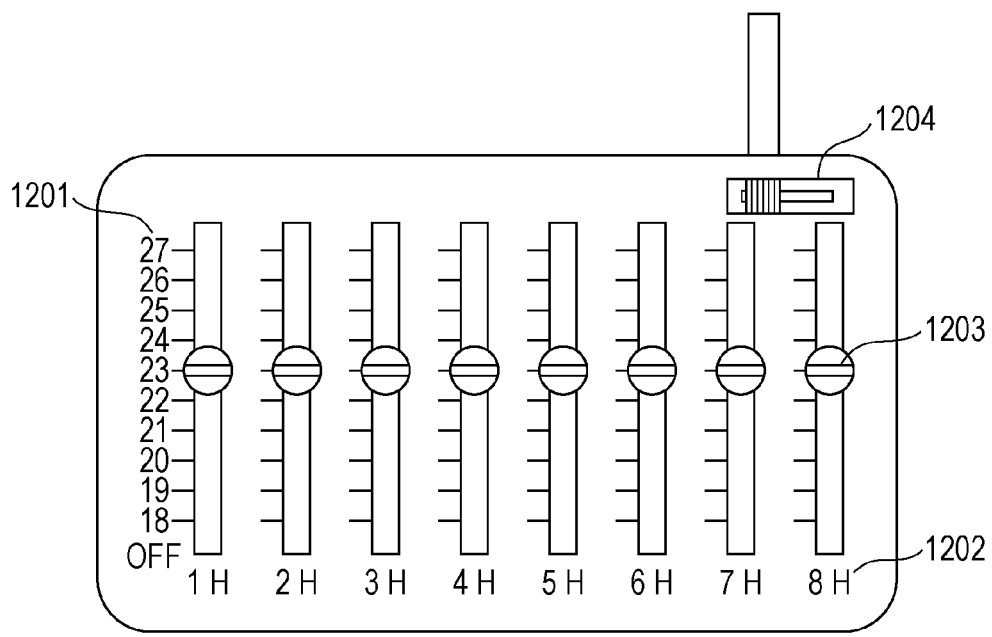
FIG. 39 is a diagram illustrating a remote control in Patent Literature 2.

According to the technique disclosed in Patent Literature 2, it is possible to set preset temperatures at respective times by operating knob members for the respective times provided in a remote control. FIG. 39 illustrates a remote control described in Patent Literature 2. In FIG. 39, a vertical axis 1201 represents a preset temperature, and a horizontal axis 1202 represents a time elapsed (one hour later, two hours later, . . . ) from the start of an operation of a timer. A user changes a preset temperature by sliding a knob member 1203 at an elapsed time to a desired temperature. The remote control includes a switch 1204 for switching between normal operation and timer operation. In a case where the user switches the switch 1204 to the timer operation, preset temperatures after the respective elapsed times are set in the air conditioner.

However, the inventor of the present invention found that the following problems arise in the aforementioned conventional arts.

According to the control method disclosed in Non-Patent Literature 1, detailed temperature settings at each time is impossible. Therefore, for example, the room temperature sometimes become too low or too high during sleep. As a result of continuous operation of the air conditioner, a user sometimes gets chilled or wakes up in the heat.

According to the control methods disclosed in Patent Literature 1 and Patent Literature 2, detailed temperature control at each time is possible, but a preset temperature can be freely changed even by an erroneous operation or the like. This may result in a large change of the preset temperature. For example, the temperature which should be set to 30 degrees may be mistakenly changed to 16 degrees. Such a rapid change in temperature sometimes causes a change in health condition of a user or leads to unnecessary electric power consumption of the air conditioner.

The following improvements were considered in order to solve the above problems.

(1) A method according to one aspect of the present disclosure is a method of providing an interface of an apparatus that controls an air conditioner via a network, including a computer, a memory, and a display, the method including causing the computer to: acquire information, stored in the memory, on correspondence among a plurality of time zones and target upper limit temperatures and target lower limit temperatures of the air conditioner that correspond to the respective plurality of time zones, the target upper limit temperatures being upper limit values of recommended preset temperatures of the air conditioner, and the target lower limit temperatures being lower limit values of the recommended preset temperatures of the air conditioner; and display, on the display, a setting screen that allows a user to set the preset temperatures of the air conditioner in the respective plurality of time zones, the setting screen including a graph region in which a graph whose first axis corresponds to the plurality of time zones and whose second axis corresponds to the preset temperatures of the air conditioner is displayed, the graph region including, in each of the plurality of time zones, a first temperature region displayed having a first appearance and a second temperature region displayed having a second appearance, the first temperature region being a temperature region that is not less than the target lower limit temperatures and not more than the target upper limit temperatures, the second temperature region being a temperature region other than the first temperature region, and a symbol indicative of a corresponding preset temperature being displayed in the first temperature region in a corresponding one of the plurality of time zones in the graph region.

(2) In the aspect, the method may be arranged such that the target upper limit temperatures in the respective plurality of time zones satisfy the following formula (1):

MIN (a third temperature obtained by adding a predetermined value to a first temperature which is a preset temperature in a first time zone, a fourth temperature obtained by adding the predetermined value to a second temperature which is a preset temperature in a second time zone); and the target lower limit temperatures in the respective plurality of time zones satisfy the following formula (2):

MAX (a fifth temperature obtained by subtracting the predetermined value from the first temperature, a sixth temperature obtained by subtracting the predetermined value from the second temperature).

(3) In the aspect, the method may be arranged such that the first time zone and the second time zone are adjacent time zones among the plurality of time zones.

(4) In the aspect, the method may be arranged further include causing the computer to compare the eighth temperature with a target upper limit temperature corresponding to the third time zone, and compare the eighth temperature with a target lower limit temperature corresponding to the third time zone, when the corresponding symbol is slid from a position indicative of a seventh temperature which is a preset temperature to a position indicative of an eighth temperature in a third time zone included in the plurality of time zones, as a result of the comparison, when the eighth temperature is higher than the target upper limit temperature corresponding to the third time zone, a symbol corresponding to a fourth time zone which is one or two time zones adjacent to the third time zone is moved from a position indicative of a ninth temperature which is a preset temperature in the fourth time zone to a position indicative of a tenth temperature obtained by adding the predetermined value to the eighth temperature, and as a result of the comparison, when the eighth temperature is lower than the target lower limit temperature corresponding to the third time zone, the symbol corresponding to the fourth time zone is moved from the position indicative of the ninth temperature to a position indicative of an eleventh temperature obtained by subtracting the predetermined value from the eighth temperature.

(5) In the aspect, the method may be arranged to further include causing the computer to: set the preset temperature in the third time zone to the eighth temperature, set the preset temperature in the fourth time zone to the tenth temperature, and calculate the target upper limit temperatures and the target lower limit temperatures corresponding to the respective plurality of time zones in accordance with the formulas (1) and (2) by using the eighth temperature and the tenth temperature, when the symbol corresponding to the fourth time zone is moved to the position indicative of the tenth temperature; set the preset temperature in the fourth time zone to the eleventh temperature, and calculate the target upper limit temperatures and the target lower limit temperatures corresponding to the respective plurality of time zones in accordance with the formulas (1) and (2) by using the eighth temperature and the eleventh temperature, when the symbol corresponding to the fourth time zone is moved to the position indicative of the eleventh temperature; and update display of the first temperature region and the second temperature region in each of the plurality of time zones on the basis of the corresponding target upper limit temperatures and the corresponding target lower limit temperatures calculated for the respective plurality of time zones.

(6) In the aspect, the method may be arranged to further include causing the computer to update the information on the correspondence by using the corresponding target upper limit temperatures and the corresponding target lower limit temperatures calculated for the respective plurality of time zones.

(7) In the aspect, the method may be arranged such that the first appearance includes a first color and a first pattern; and the second appearance includes a second color different from the first color and a second pattern different from the first pattern.

(8) In the aspect, the method may be arranged such that the setting screen includes an icon which is activated by the user when the user has set the preset temperatures in the respective plurality of time zones; the apparatus is connected to the air conditioner via the network, and the method further includes causing the computer to: generate a control command for operating the air conditioner at the set preset temperatures in the respective plurality of time zones when the icon is activated by the user; and transmit the generated control command to the air conditioner via the network.

Embodiments of the present disclosure are described below with reference to the drawings.

1. Embodiment 1

An air conditioner remote control system 10 according to Embodiment 1 is described below.

1.1 Outline of Air Conditioner Remote Control System 10

Figure 1:
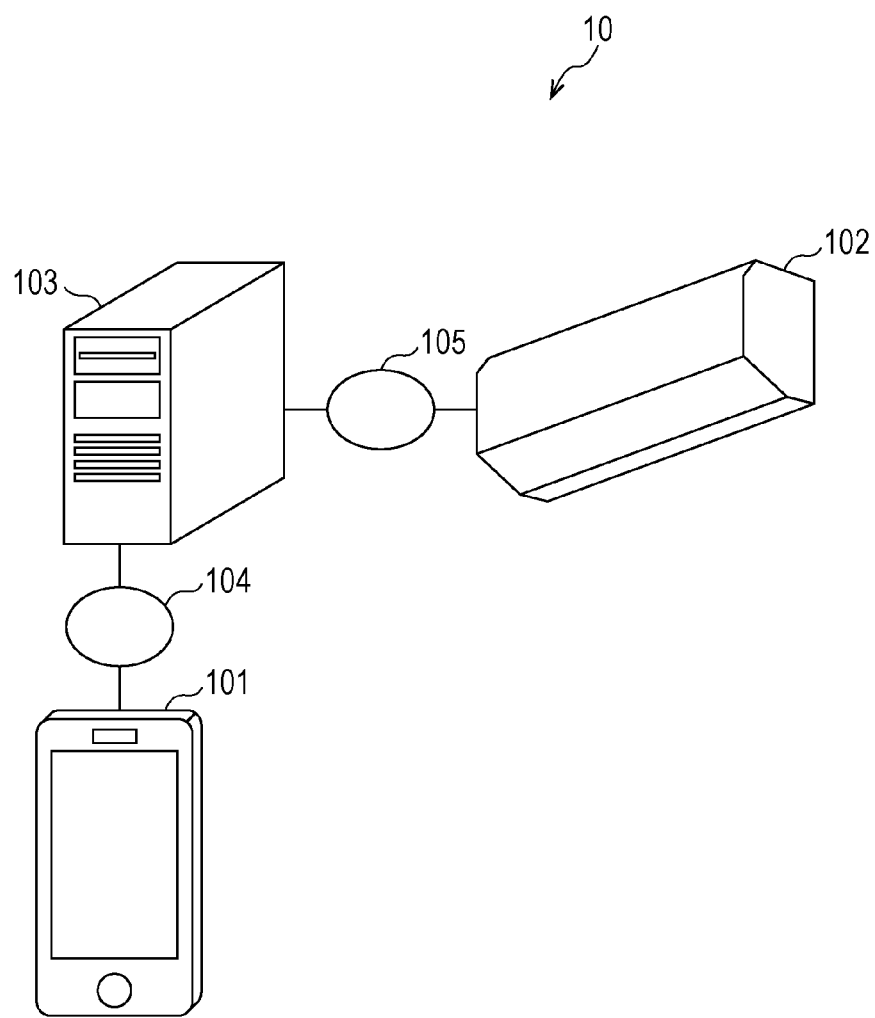
FIG. 1 is a system configuration diagram illustrating a configuration of an air conditioner remote control system according to Embodiment 1.

FIG. 1 illustrates an overall configuration of the air conditioner remote control system 10.

As illustrated in FIG. 1, the air conditioner remote control system 10 includes a mobile terminal 101, a server device 103, and an air conditioner 102. The mobile terminal 101 is connected to the server device 103 via a network 104. The server device 103 is connected to the mobile terminal 101 via the network 104 and is connected to the air conditioner 102 via a network 105.

The network 104 is, for example, a mobile telephone network and the Internet. The network 105 is, for example, the Internet. In other words, the mobile terminal 101 is connected to the server device 103 via the mobile telephone network and the Internet. The server device 103 is connected to the air conditioner 102 via the Internet.

The mobile terminal 101 displays a setting screen for accepting selection of a single preset temperature from among a plurality of candidate temperatures so that the air conditioner 102 operates to change the ambient temperature to a target temperature in a single time zone. The mobile terminal 101 acquires an upper limit temperature and a lower limit temperature of the target temperature of the air conditioner 102 in the time zone. Next, the mobile terminal 101 calculates a difference between the upper limit temperature and the lower limit temperature. Then, the mobile terminal 101 determines whether or not the calculated difference is equal to or larger than a range threshold value. In a case where the difference is equal to or larger than the range threshold value, items related to the upper limit temperature and the lower limit temperature are displayed on the setting screen in a form different from those displayed in a case where the difference is less than the range threshold value.

The mobile terminal 101 transmits a control command to the server device 103 via the network 104. The control command includes an air conditioner control information table including information such as a preset temperature which is a target temperature of the air conditioner 102. The server device 103 receives and stores therein the air conditioner control information table. When a time comes to set the preset temperature and the like, the server device 103 transmits setting information including the preset temperature and the like to the air conditioner 102. The air conditioner 102 receives the setting information including the preset temperature and the like as a target temperature and the like. Next, the air conditioner 102 operates so that the ambient temperature and the like become the preset temperature and the like which are the target temperature and the like included in the information in accordance with the received setting information.

1.2 Mobile Terminal 101

Figure 2:
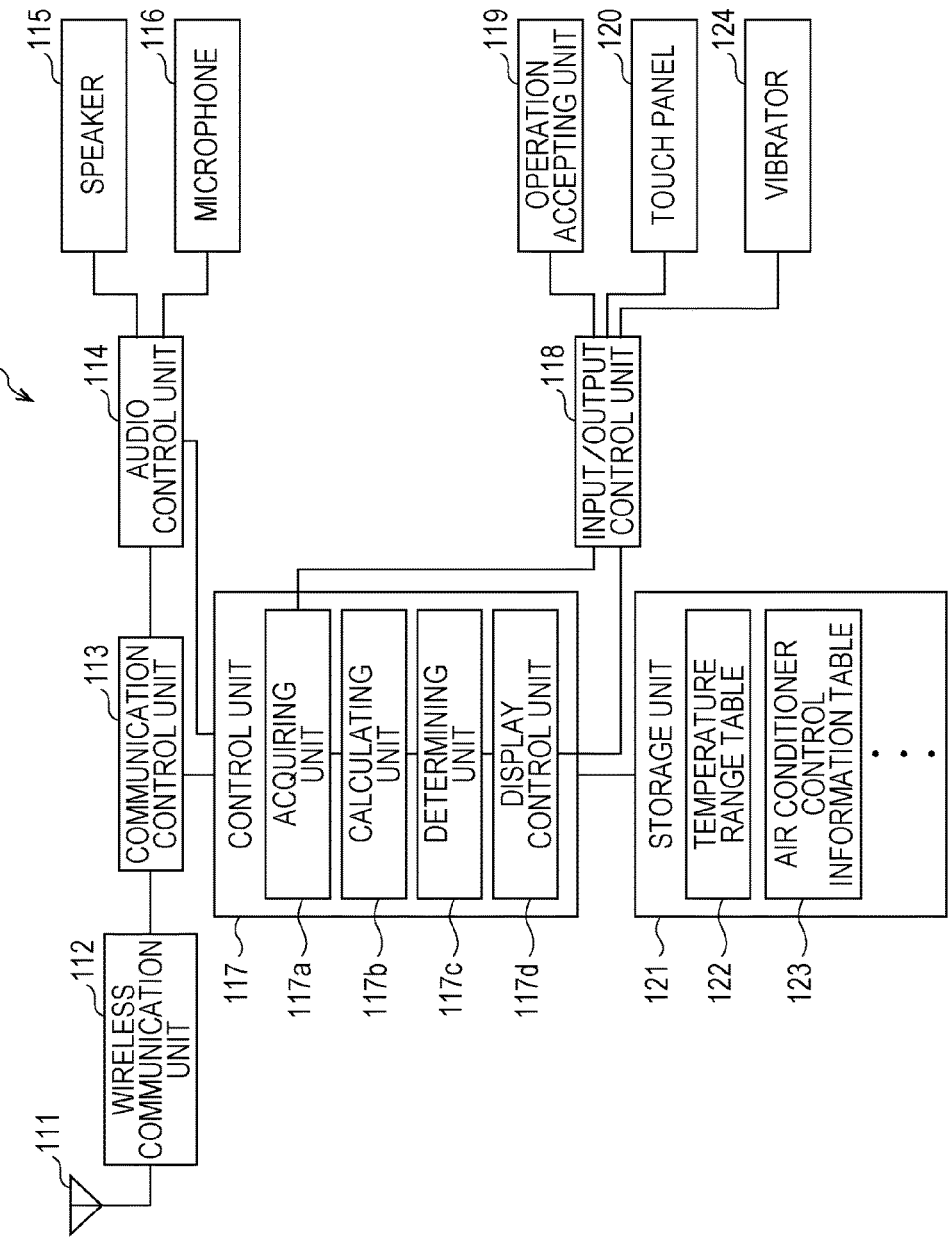
FIG. 2 is a block diagram illustrating a configuration of a mobile terminal.

FIG. 2 illustrates a configuration of the mobile terminal 101.

As illustrated in FIG. 2, the mobile terminal 101 includes an antenna 111, a wireless communication unit 112, a communication control unit 113, an audio control unit 114, a speaker 115, a microphone 116, a control unit 117, an input/output control unit 118, an operation accepting unit 119, a touch panel 120, a vibrator 124, and a storage unit 121.

Specifically, the mobile terminal 101 is a computer system constituted by a microprocessor, a signal processor, a ROM, a RAM, and the like. Computer programs are stored in the RAM. The microprocessor and the signal processor operate in accordance with the computer programs. Thus, the mobile terminal 101 accomplishes functions thereof.

(1) Storage Unit 121

The storage unit 121 is constituted by a non-volatile semiconductor memory.

The storage unit 121 holds a temperature range table 122 and an air conditioner control information table 123. The storage unit 121 also stores therein a plurality of computer programs, a plurality of application programs, and the like. An example of the application programs is an air conditioner control application. The air conditioner control application is a program for accepting user's input of setting information and then transmitting the input setting information to the air conditioner 102 via the server device 103. The setting information includes a scheduled time, an operation mode, a preset temperature, a wind direction, an air volume, and the like.

Temperature Range Table 122

FIG. 3 illustrates an example of a data structure of the temperature range table 122.

As illustrated in FIG. 3, the temperature range table 122 includes a plurality of pieces of temperature range information. Each piece of temperature range information includes a scheduled time, an upper temperature, and a lower temperature in association with one another.

The scheduled time is a time at which corresponding upper limit temperature and lower limit temperature are applied in the air conditioner 102. Specifically, the corresponding upper limit temperature and lower limit temperature are applied during a time zone from the scheduled time to a next set scheduled time.

The upper limit temperature is an upper limit value of a target temperature that is set in the air conditioner 102. A temperature higher than the upper limit temperature should not be set in the air conditioner 102.

The lower limit temperature is a lower limit value of a target temperature that is set in the air conditioner 102. A temperature lower than the lower limit temperature should not be set in the air conditioner 102.

The scheduled time, the upper limit temperature, and the lower limit temperature may be set in advance by a user of the mobile terminal 101. In other words, the user may determine the upper limit temperature and the lower limit temperature. Alternatively, the scheduled time, the upper limit temperature, and the lower limit temperature may be set in advance by the mobile terminal 101. In other words, the mobile terminal 101 may determine the upper limit temperature and the lower limit temperature. An example of a case where the mobile terminal 101 determines the upper limit temperature and the lower limit temperature will be described later.

A temperature within a range of not more than the upper limit temperature and not less than the lower limit temperature is referred to as a recommended temperature, and a range of not more than the upper limit temperature and not less than the lower limit temperature is referred to as a recommended temperature range or a recommended temperature region. A temperature range higher than the upper limit temperature is referred to as a high temperature range, and a temperature range lower than the lower limit temperature is referred to as a low temperature range. A temperature within the high temperature range and the low temperature range is referred to as a non-recommended temperature, and the high temperature range and the low temperature range are referred to as a non-recommended temperature range or a non-recommended temperature region.

The temperature range table 122 illustrated in FIG. 3 includes, for example, temperature range information constituted by a scheduled time 122a "11 O'CLOCK", an upper limit temperature 122b "28 DEGREES", and a lower limit temperature 122c "22 DEGREES". This temperature range information indicates that the upper limit temperature is set to 28 degrees and the lower limit temperature is set to 22 degrees in a time zone from 11 o'clock to a next scheduled time in the air conditioner 102.

Air Conditioner Control Information Table 123

FIG. 4 illustrates an example of a data structure of the air conditioner control information table 123.

As illustrated in FIG. 4, the air conditioner control information table 123 includes a plurality of pieces of setting information.

Each piece of setting information includes a scheduled time, an operation mode, a preset temperature, a wind direction, and an air volume in association with one another.

The scheduled time is a time at which corresponding operation mode, preset temperature, wind direction, and air volume are applied in the air conditioner 102. Specifically, the corresponding operation mode, preset temperature, wind direction, and air volume are applied in a time zone from the scheduled time to a next scheduled time.

The operation mode is a mode of operation of the air conditioner 102. The operation mode includes, for example, "COOLING", "DEHUMIDIFICATION", "HEATING", and "OFF". The "COOLING" indicates that the air conditioner 102 operates in a cooling mode. The "DEHUMIDIFICATION" indicates that the air conditioner 102 operates in a dehumidification mode. The "HEATING" indicates that the air conditioner 102 operates in a heating mode. The "OFF" indicates that the air conditioning function of the air conditioner 102 is stopped and the air conditioner 102 is not in operation.

The preset temperature is a target temperature that should be set in the air conditioner 102. The air conditioner 102 operates so that the ambient temperature becomes the target temperature.

The wind direction is a wind direction that should be set in the air conditioner 102. The air conditioner 102 changes a direction of an air-blowing fan so that air is blown in the set wind direction.

The air volume is an air volume that should be set in the air conditioner 102. The air conditioner 102 blows air in the set air volume.

The air conditioner control information table 123 illustrated in FIG. 4 includes, for example, setting information constituted by a scheduled time 123a "11 O'CLOCK", an operation mode 123b "COOLING", a preset temperature 123c "22 DEGREES", a wind direction 123d "UPWARD", and an air volume 123e "STRONG". This setting information indicates that the air conditioner 102 operates in a cooling mode during a time zone from 11 o'clock to a next scheduled time and that the preset temperature is 22 degrees, the wind direction is upward, and the air volume is strong.

(2) Touch Panel 120

The touch panel 120 is, for example, constituted by a liquid crystal display and a touch pad unit. The touch pad unit repeatedly detects a touch operation of a user. Next, a detected contact position is output to the control unit 117 via the input/output control unit 118.

The liquid crystal display receives image data from the control unit 117 via the input/output control unit 118. Next, the liquid crystal display displays an image based on the received image data.

An example of the image is the setting screen. The liquid crystal display receives image data that constitutes the setting screen from the control unit 117 via the input/output control unit 118. Next, the liquid crystal display displays the setting screen based on the received image data. The setting screen is used to accept user's selection of a preset temperature and the like in order to operate the air conditioner 102 so that the ambient temperature and the like become the preset temperature and the like which are a target temperature and the like.

Example of Setting Screen

Figure 5A:
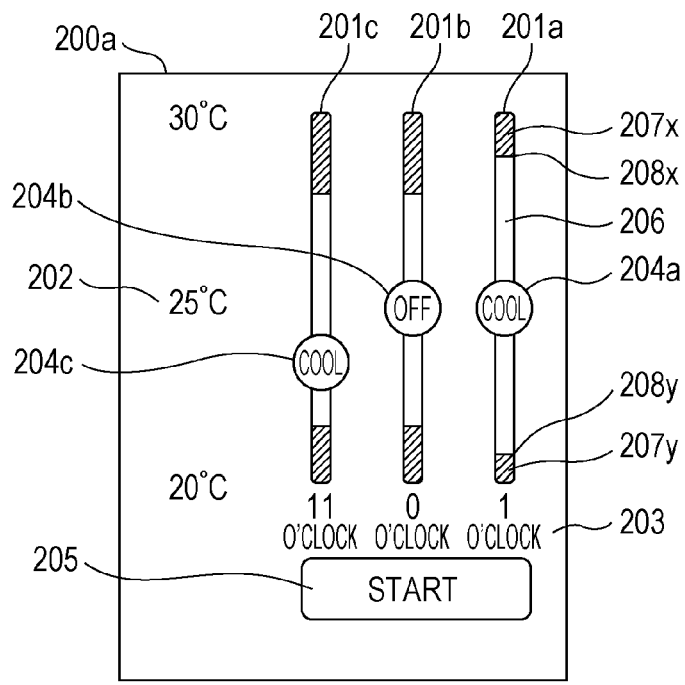
FIG. 5A is a diagram illustrating a setting screen displayed on the mobile terminal.

FIG. 5A illustrates a setting screen 200a as an example of a setting screen displayed on the liquid crystal display of the touch panel 120.

As illustrated in FIG. 5A, the setting screen 200a includes a vertical axis 202, a horizontal axis 203, a plurality of temperature bars 201a, 201b, and 201c, a plurality of temperature setting buttons 204a, 204b, and 204c, and a start button 205.

Figure 5B:
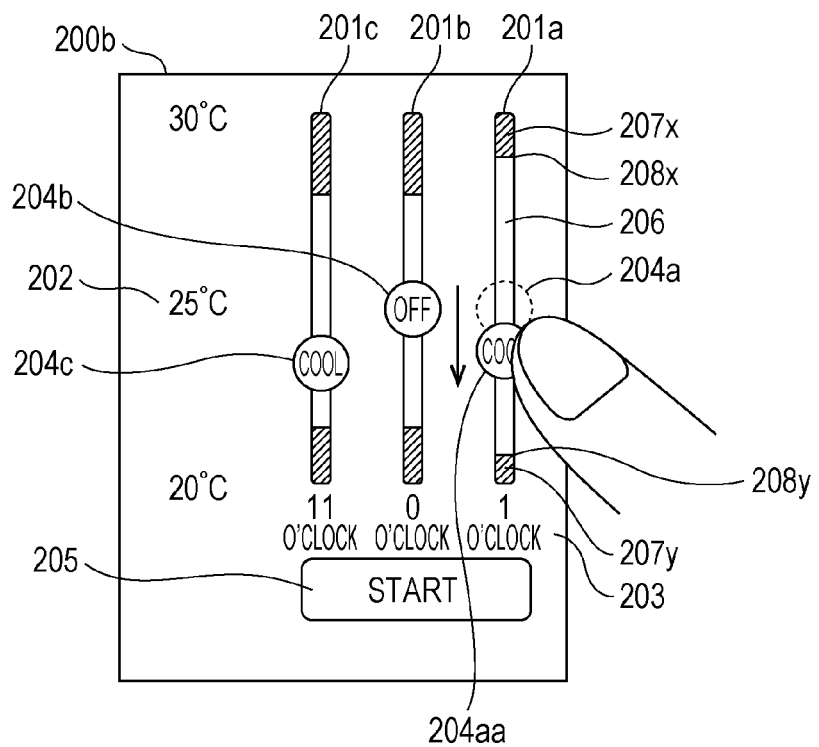
FIG. 5B is a diagram illustrating a setting screen displayed on the mobile terminal.

The temperature bars 201a, 201b, and 201c are long band-like rails. The temperature setting buttons 204a, 204b, and 204c are sliders. As illustrated in FIG. 5B, a user slides an object for operation such as his or her finger on an operation surface of the touch panel 120 while keeping contact with a slider. The slider moves on a rail on the operation surface of the touch panel 120 in accordance with movement of the object for operation. When the object for operation is detached from the operation surface of the touch panel 120, movement of the slider stops. The slider maintains its display at this position.

As described above, the slider is provided so as to be movable while being regulated by the rail.

The vertical axis 202 represents a change of temperature. Scale values indicative of a plurality of temperatures are displayed along the vertical axis 202 in a vertical direction on the left side of the setting screen 200a. On the setting screen 200a, "30° C.", "25° C.", and "20° C." are displayed from top to bottom. Positions corresponding to "30° C.", "25° C.", and "20° C." indicate that the temperature is 30° C., 25° C., and 20° C., respectively.

The horizontal axis 203 represents a change of time. Scale values indicative of a plurality of scheduled times are displayed along the horizontal axis 203 in a horizontal direction on a lower part of the setting screen 200a. On the setting screen 200a, "11 O'CLOCK", "0 O'CLOCK", and "1 O'CLOCK" are displayed as scheduled times from left to right. Positions corresponding to "11 O'CLOCK", "0 O'CLOCK", and "1 O'CLOCK" indicate that the scheduled time is 11 o'clock, 0 o'clock, and 1 o'clock, respectively.

Note that the horizontal axis 203 of the setting screen 200a in FIG. 5A shows absolute times such as the scheduled times 11 o'clock, 0 o'clock, and 1 o'clock. However, the times shown by the horizontal axis 203 are not limited to the absolute times. The horizontal axis 203 may show relative times. For example, the horizontal axis 203 may show "0 HOUR LATER", "1 HOUR LATER", "2 HOURS LATER", . . . instead of "11 O'CLOCK", "0 O'CLOCK", and "1 O'CLOCK". "0 HOUR LATER" is a current time at which a user is about to set a preset temperature and the like. "1 HOUR LATER", "2 HOURS LATER", . . . are relative times from "0 HOUR LATER".

The plurality of temperature bars 201a, 201b, and 201c correspond to the plurality of scheduled times "11 O'CLOCK", "0 O'CLOCK", and "1 O'CLOCK", respectively, and indicate ranges of candidate temperatures that are targets of selection at the respective scheduled times. Each temperature bar is formed in a long band-like shape in a vertical direction corresponding to a change of temperature in a central portion of the setting screen 200a and is disposed above a corresponding scheduled time. Each temperature bar shows a position of an upper limit temperature and a position of a lower limit temperature. For example, the temperature bar 201a shows a position 208x of an upper limit temperature and a position 208y of a lower limit temperature.

Each temperature bar shows a high temperature range, a recommended temperature range, and a low temperature range. The high temperature range is a temperature range higher than the upper limit temperature, the recommended temperature range is a temperature range not more than the upper limit temperature and not less than the lower limit temperature, and the low temperature range is a temperature range lower than the lower limit temperature.

The high temperature range and the low temperature range have a display color, a decoration, or a combination of display color and decoration that is different from that of the recommended temperature range so that the high temperature range and the low temperature range are distinguishable from the recommended temperature range. The display color includes a case where no color is added, and the decoration includes a case where no decoration is added.

The temperature bar 201a includes a high temperature range 207x, a recommended temperature range 206, and a low temperature range 207y. In this example, the high temperature range 207x and the low temperature range 207y are hatched with leftward diagonal lines and rightward diagonal lines. In this example, the recommended temperature range 206 is not hatched.

The temperature bar 201b includes a high temperature range, a recommended temperature range, and a low temperature range. In this example, the high temperature range and the low temperature range are hatched with rightward diagonal lines. In this example, the recommended temperature range is not hatched.

In this example, as for the temperature bar 201a, a difference between the upper limit temperature and the lower limit temperature is equal to or larger than the range threshold value. Meanwhile, as for the temperature bars 201b and 201c, a difference between the upper limit temperature and the lower limit temperature is less than the range threshold value.

As described above, the high temperature range 207x and the low temperature range 207y of the temperature bar 201a are hatched with leftward diagonal lines and rightward diagonal lines. Meanwhile, the high temperature range and the low temperature range of the temperature bar 201b are hatched with rightward diagonal lines. The high temperature range and the low temperature range of the temperature bar 201c are also hatched with rightward diagonal lines.

That is, among the plurality of temperature bars, a non-recommended temperature range of a temperature bar in which a difference between an upper limit temperature and a lower limit temperature is equal to or larger than the range threshold value is displayed in a form different from a non-recommended temperature range of a temperature bar in which a difference between an upper limit temperature and a lower limit temperature is less than the range threshold value. The different form is a different display color, a different decoration, or a combination of different display color and different decoration. This makes it possible to distinguish between a temperature bar in which the aforementioned difference is equal to or larger than the range threshold value and a temperature bar in which the aforementioned difference is less than the range threshold value.

The plurality of temperature setting buttons 204a, 204b, and 204c are disposed on the plurality of temperature bars 201a, 201b, and 201c, respectively. An operation mode of the air conditioner 102 is displayed on each of the temperature setting buttons 204a, 204b, and 204c.

Specifically, the temperature setting buttons 204a, 204b, and 204c are disposed at positions of candidate temperatures of approximately 25° C., approximately 25° C., and approximately 23° C., respectively. Furthermore, operation modes "COOL", "OFF", and "COOL" are displayed on the temperature setting buttons 204a, 204b, and 204c, respectively.

That is, the temperature setting button 204a indicates that the temperature is set to approximately 25° C. at a scheduled time of 1 o'clock and the operation mode is "COOLING". The temperature setting button 204b indicates that the temperature is set to approximately 25° C. at a scheduled time of 0 o'clock and the operation mode is "OFF". Note that since the operation mode is "OFF", there is no meaning in the temperature setting to approximately 25° C. The temperature setting button 204c indicates that the temperature is set to approximately 23° C. at a scheduled time of 11 o'clock and the operation mode is "COOLING". The temperatures indicated by positions at which the temperature setting buttons 204a, 204b, and 204c are disposed are preset temperatures selected by a user.

As illustrated in FIG. 5B, a user slides an object for operation on the operation surface of the touch panel 120 while keeping contact with the temperature setting button 204a which is a slider. The temperature setting button moves on the temperature bar 201a, which is a rail on the operation surface of the touch panel 120, in accordance with movement of the object for operation. When the object for operation is detached from the operation surface, movement of the temperature setting button stops. A temperature setting button 204aa maintains its display at this position. The touch panel 120 supplies this position of the temperature setting button 204aa to the control unit 117 via the input/output control unit 118. This position indicates a temperature corresponding to the position at which the temperature setting button 204aa is disposed.

The user can select a single preset temperature from among a plurality of candidate temperatures at any time by sliding a displayed slider along a rail.

Furthermore, the operation mode of the air conditioner 102 can be changed when the user taps a temperature setting button. That is, the operation mode is changed to cooling, heating, dehumidification, and power OFF in this order every time the user taps the temperature setting button. In accordance with this, the mode displayed on the temperature setting button is changed, for example, to "COOL", "HEAT", "DEHUMIDIFY", and "OFF".

The tap operation is a user's operation of continuously making an object for operation in contact with on the touch panel 120 for a predetermined period of time. In the tap operation, the user continuously makes an object for operation in contact with the touch panel 120 for a predetermined period of time, for example, for 0.1 seconds, without changing the contact position. The user detaches the object for operation from the touch panel 120 after elapse of the predetermined period of time.

The start button 205 is used to transmit, to the server device 103, a preset temperature and an operation mode at each scheduled time that are set on the setting screen 200a. When the user presses the start button 205, the preset temperature and the operation mode at each scheduled time are transmitted to the server device 103.

(3) Operation Accepting Unit 119

The operation accepting unit 119 includes a plurality of buttons.

Some of the plurality of buttons are disposed on the front of the mobile terminal 101, and the other buttons are disposed on a side surface of the mobile terminal 101. Each of the buttons is pressed by a user and is thus operated.

When a button is pressed by a user, an operation signal corresponding to the button is supplied to the input/output control unit 118.

(4) Input/Output Control Unit 118

The input/output control unit 118 receives the operation signal from the operation accepting unit 119. Furthermore, the input/output control unit 118 receives position information indicative of a contact position from the touch panel 120. Furthermore, the input/output control unit 118 receives text or image data from the control unit 117, supplies the text or image data to the touch panel 120, and then causes the text or image data to be displayed on the touch panel 120. Furthermore, the input/output control unit 118 instructs the vibrator 124 to start or stop vibration.

(5) Control Unit 117

The control unit 117 controls the communication control unit 113, the audio control unit 114, and the input/output control unit 118. The control unit 117 performs other control operations.

The control unit 117 receives the position information from the input/output control unit 118 and reads out an application program corresponding to the received position information from the storage unit 121. Next, the control unit 117 executes the application program thus read out.

The control unit 117 includes an acquiring unit 117a, a calculating unit 117b, a determining unit 117c, and a display control unit 117d.

The acquiring unit 117a acquires an upper limit temperature and a lower limit temperature of a target temperature in the air conditioner 102. The calculating unit 117b calculates a difference between the upper limit temperature and the lower limit temperature. The determining unit 117c determines whether or not the calculated difference is equal to or larger than the range threshold value. In a case where the difference is equal to or larger than the range threshold value, the display control unit 117d causes items related to the upper limit temperature and the lower limit temperature to be displayed on the setting screen in a form different from that in a case where the difference is less than the range threshold value. The items related to the upper limit temperature and the lower limit temperature are, for example, a high temperature range and a low temperature range in a temperature bar that have been descried above. Displaying the different form means, for example, changing the type of hatching of the high temperature range and the low temperature range. Note that the items related to the upper limit temperature and the lower limit temperature may be, for example, a recommended temperature range in a temperature bar that has been described above.

Processing Performed in Case where User's Operation is Accepted

The control unit 117 receives a contact position of a user's object for operation from the touch panel 120. Next, the control unit 117 generates an operation signal corresponding to the contact position by using the received contact position. Note that a contact position and a corresponding operation signal are stored in association with each other in advance in the control unit 117. Furthermore, the control unit 117 receives an operation signal corresponding to a user's operation from the operation accepting unit 119.

The control unit 117 determines the type of operation signal. The operation signal is a signal indicative of an operation for designating an air conditioner control application, an operation of a slider, an operation of the start button 205, a tap operation of a slider, change of the operation mode, designation of a wind direction or an air volume, and other operations.

In a case where the received operation signal is a signal indicative of designation of the air conditioner control application, the control unit 117 reads out the air conditioner control application from the storage unit 121. Next, the control unit 117 activates the air conditioner control application thus read out.

In a case where the received operation signal is a signal indicative of an operation of a slider, the control unit 117 changes a preset temperature. Details of the preset temperature changing processing will be described later.

In a case where the received operation signal is a signal indicative of an operation of the start button 205, the control unit 117 transmits a control command to the server device 103. Details of the transmitting processing will be described later.

In a case where the received operation signal is a signal indicative of a tap operation of a slider, the control unit 117 changes an operation mode at a corresponding scheduled time to an operation mode designated by the tap operation in the air conditioner control information table 123.

In a case where the received operation signal is a signal indicative of designation of a wind direction or an air volume, the control unit 117 changes a wind direction or an air volume at a corresponding scheduled time to the designated wind direction or air volume in the air conditioner control information table 123.

In a case where the received operation signal is a signal indicative of other operation, the control unit 117 performs other processing.

Operation of Air Conditioner Control Application

When the air conditioner control application is activated, the control unit 117 operates as follows in accordance with the air conditioner control application.

The acquiring unit 117a of the control unit 117 reads out setting screen data from the storage unit 121, reads out the air conditioner control information table 123, and reads out the temperature range table 122.

The display control unit 117d of the control unit 117 generates a setting screen and then supplies the generated setting screen to the touch panel 120 via the input/output control unit 118. The touch panel 120 displays the setting screen. Details of generation of the setting screen will be described later.

The control unit 117 operates as described above upon a user's operation.

Generation and Display of Setting Screen

The display control unit 117d causes a plurality of candidate temperatures to be displayed on the setting screen 200a. Items related to an upper limit temperature and a lower limit temperature are recommended temperatures that are not more than the upper limit temperature and not less than the lower limit temperature or non-recommended temperatures that are larger than the upper limit temperature or smaller than the lower limit temperature among the candidate temperatures displayed on the setting screen 200a. The display control unit 117d causes recommended temperatures in a case where a difference between the upper limit temperature and the lower limit temperature is equal to or larger than the range threshold value to be displayed in a form different from those in a case where the difference is less than the threshold value. Alternatively, the display control unit 117d causes non-recommended temperatures in a case where the difference is equal to or larger than the range threshold value to be displayed in a form different from those in a case where the difference is less than the range threshold value.

Furthermore, the display control unit 117d causes a rail part (temperature bar) formed in a long band-like shape to be displayed on the setting screen 200a. The candidate temperatures whose values vary depending on the distance from one end of the band are shown along the band. The rail part is divided into a recommended temperature part that corresponds to the recommended temperatures and a non-recommended temperature part that corresponds to the non-recommended temperatures. Items related to the upper limit temperature and the lower limit temperature are the recommended temperature part or the non-recommended temperature part.

The display control unit 117d causes a recommended temperature part in a case where a difference between an upper limit temperature and a lower limit temperature is equal to or larger than the range threshold value to be displayed in a form different from that in a case where the difference is less than the threshold value. Alternatively, the display control unit 117d causes a non-recommended temperature part in a case where the difference is equal to or larger than the range threshold value to be displayed in a form different from that in a case where the difference is less than the range threshold value.

The different form may be a different color, a different size, or a different decoration.

In a case where a difference between an upper limit temperature and a lower limit temperature is equal to or larger than the range threshold value, the display control unit 117d may cause information indicating that the difference is equal to or larger than the range threshold value to be displayed on the setting screen 200a as warning for a user and emit a warning sound or vibrate the mobile terminal 101.

(Details of Preset Temperature Changing Processing)

The determining unit 117c of the control unit 117 determines whether or not a selected preset temperature is within a range between an upper limit temperature and a lower limit temperature. In a case where the selected preset temperature is not within the range, the selected preset temperature is abandoned. In a case where the selected preset temperature is within the range, the control unit 117 regards the selected preset temperature as an effective one.

More specifically, in a case where an accepted operation signal is a signal indicative of an operation of a slider, the acquiring unit 117a of the control unit 117 receives the position of the slider from the touch panel 120 via the input/output control unit 118. The calculating unit 117b converts the received position of the slider into a temperature. Note that positions of the slider and corresponding temperatures are stored in association with each other in advance in the control unit 117.

The determining unit 117c determines whether or not the temperature obtained by conversion is within a range between an upper limit temperature and a lower limit temperature at a corresponding scheduled time in the temperature range table 122.

In a case where the temperature obtained by conversion is not within the range between the upper limit temperature and the lower limit temperature, the display control unit 117d controls the speaker 115 to emit a beep sound only for a certain period of time via the audio control unit 114. Furthermore, the display control unit 117d controls the vibrator 124 to vibrate only for the certain period of time via the input/output control unit 118. The certain period of time is, for example, 2 seconds.

In a case where a temperature that has been selected by a user is not within a range between an upper limit temperature and a lower limit temperature at a corresponding scheduled time, a background color of a region occupied by a temperature setting button may be changed. Furthermore, in this case, the color, size, decoration, and/or font type (font attribute) of a character displayed on the temperature setting button may be changed or the shape and/or the size of the temperature setting button may be changed. Furthermore, a dialogue screen notifying the user of an error may be displayed.

This makes it possible to warn the user that the preset temperature has been changed to a temperature that is out of the range between the upper limit temperature and the lower limit temperature, thereby guiding the user toward safer usage.

In a case where the temperature obtained by conversion is within the range between the upper limit temperature and the lower limit temperature, the control unit 117 does not cause the speaker 115 to emit a beep sound nor cause the vibrator 124 to vibrate.

The control unit 117 updates the preset temperature corresponding to the scheduled time with the temperature obtained by conversion in the air conditioner control information table 123 stored in the storage unit 121.

Details of Transmitting Processing

When the start button 205 is pressed, the control unit 117 reads out the air conditioner control information table 123 from the storage unit 121. Next, the control unit 117 generates a control command including the air conditioner control information table 123 thus read out. Next, the control unit 117 transmits the generated control command to the server device 103 via the communication control unit 113, the wireless communication unit 112, the antenna 111, and the network 104.

In this example, the control command including the air conditioner control information table 123 is transmitted to the server device 103 via the network 104.

However, the present embodiment is not limited to this. The following method may be used.

The control unit 117 determines whether or not a current time matches a scheduled time in the air conditioner control information table 123 stored in the storage unit 121. In a case where the current time does not match a scheduled time in the air conditioner control information table stored in the storage unit 121, the control unit 117 repeats the processing for determining whether or not a current time matches a scheduled time after elapse of a period of time.

In a case where the current time matches a scheduled time in the air conditioner control information table 123 stored in the storage unit 121, the control unit 117 reads out setting information including the scheduled time that matches the current time from the air conditioner control information table 123. Next, the control unit 117 generates a control command including the setting information thus read out.

Next, the control unit 117 transmits the generated control command to the server device 103 via the communication control unit 113, the wireless communication unit 112, the antenna 111, and the network 104. Alternatively, the control unit 117 may transmit the generated control command to the air conditioner 102 via the network 104.

(Details of Setting Screen Generating Processing)

The display control unit 117d of the control unit 117 generates a rectangular outer frame along an outer periphery of the setting screen 200a. The display control unit 117d generates a plurality of scale values in a vertical direction along the vertical axis 202 in a left portion of the setting screen 200a. For example, the display control unit 117d generates "30° C.", "25° C.", and "20° C." as the scale values of the vertical axis 202 as illustrated in FIG. 5A.

Next, the display control unit 117d repeats the following processing (a) through (h) for each scheduled time included in the temperature range table 122.

(a) The display control unit 117d extracts the scheduled time from the temperature range table 122.

(b) The display control unit 117d generates a single scale value of the horizontal axis 203 of the setting screen 200a by using the extracted scheduled time and causes the generated scale value to be displayed on a lower side of a central part of the setting screen 200a. For example, the display control unit 117d generates and displays "11 o'clock" as a scheduled time as illustrated in FIG. 5A.

(c) The display control unit 117d generates a frame of a temperature bar of a long band-like shape in a central part of the setting screen 200a so that the frame is located at a position corresponding to the scale value of the horizontal axis 203. For example, the display control unit 117d generates the temperature bar 201c as illustrated in FIG. 5A.

(d) The acquiring unit 117a extracts an upper limit temperature and a lower limit temperature that correspond to the scheduled time from the temperature range table 122.

(e) The calculating unit 117b calculates a difference between the extracted upper limit temperature and lower limit temperature.

(f) The determining unit 117c compares the calculated difference with a range threshold value.

In a case where the difference is less than the range threshold value, the display control unit 117d hatches a high temperature range of the temperature bar in a first pattern and hatches a low temperature range of the temperature bar in the first pattern. The hatching of the first pattern is, for example, hatching with diagonally leftward lines.

In a case where the difference is equal to or larger than the range threshold value, the display control unit 117d hatches the high temperature range of the temperature bar in a second pattern and hatches the low temperature range of the temperature bar in the second pattern. The hatching of the second pattern is, for example, hatching with diagonally leftward lines and diagonally rightward lines.

The display control unit 117d may further color the high temperature range and the low temperature range in a first color in addition to the hatching of the first pattern or may further color the high temperature range and the low temperature range in a second color in addition to the hatching of the second pattern. The first color and the second color are different from each other. The first color is, for example, green, and the second color is, for example, red.

Alternatively, the display control unit 117d may color the high temperature range and the low temperature range in a first color instead of the hatching of the first pattern or may color the high temperature range and the low temperature range in a second color instead of the hatching of the second pattern. The first color and the second color are different from each other. The first color is, for example, green, and the second color is, for example, red.

(g) The display control unit 117d extracts an operation mode and a preset temperature corresponding to the scheduled time from the air conditioner control information table 123.

(h) The display control unit 117d generates a slider on which the extracted operation mode is displayed. Next, the display control unit 117d causes the generated slider to be displayed at a position corresponding to the extracted preset temperature on the temperature bar.

In a case where the operation mode is "cooling", the display control unit 117d displays "COOL" on the slider. In a case where the operation mode is "heating", the display control unit 117d displays "HEAT" on the slider. In a case where the operation mode is "OFF", the display control unit 117d displays "OFF" on the slider.

When repetition of the processing (a) through (h) is finished, the display control unit 117d generates the start button 205 and causes the generated start button 205 to be displayed in a lower part of the setting screen 200a.

The display control unit 117d supplies the generated setting screen 200a to the touch panel 120 via the input/output control unit 118. The setting screen 200a is displayed on the touch panel 120.

(6) Vibrator 124

The vibrator 124 is constituted by a motor and a weight with an unbalanced center of gravity that is attached to the shaft of the motor. The vibrator 124 vibrates or stops vibrating under control of the control unit 117 via the input/output control unit 118.

(7) Antenna 111, Wireless Communication Unit 112, and Communication Control Unit 113

The antenna 111 transmits or receives a wireless signal to/from a wireless base station. The wireless communication unit 112 performs selection, conversion, and the like of the frequency of the wireless signal. The communication control unit 113 transmits or receives information to/from the wireless communication unit 112 and the control unit 117.

(8) Audio Control Unit 114, Speaker 115, and Microphone 116

The audio control unit 114 demodulates an audio signal received by the wireless communication unit 112. The audio control unit 114 supplies the audio signal to the speaker 115. Furthermore, the audio control unit 114 modulates an audio signal received by the microphone 116 and causes the wireless communication unit 112 to transmit the audio signal.

The speaker 115 outputs sound or the like. The microphone 116 collects sound or the like.

1.3 Server Device 103

Figure 6:
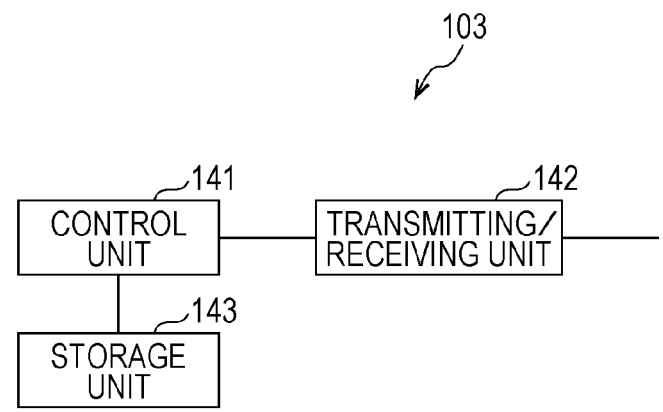
FIG. 6 is a block diagram illustrating a configuration of a server device.

FIG. 6 illustrates a configuration of the server device 103.

As illustrated in FIG. 6, the server device 103 includes a control unit 141, a transmitting/receiving unit 142, and a storage unit 143.

Specifically, the server device 103 is a computer system constituted by a microprocessor, a ROM, a RAM, a hard disc unit, and the like. Computer programs are stored in the RAM or the hard disc unit. The microprocessor operates in accordance with the computer programs. Thus, the server device 103 accomplishes functions thereof.

(1) Storage Unit 143

The storage unit 143 is, for example, constituted by a hard disc unit.

The storage unit 143 stores therein the computer programs that operate in the server device 103. Furthermore, the storage unit 143 stores therein an air conditioner control information table received from the mobile terminal 101.

(2) Transmitting/Receiving Unit 142

The transmitting/receiving unit 142 is connected to the mobile terminal 101 via the network 104 and is connected to the air conditioner 102 via the network 105.

The transmitting/receiving unit 142 receives a control command including an air conditioner control information table from the mobile terminal 101 via the network 104. Next, the transmitting/receiving unit 142 supplies the received control command to the control unit 141.

The transmitting/receiving unit 142 receives a control command including setting information from the control unit 141. Next, the transmitting/receiving unit 142 supplies the received control command to the air conditioner 102 via the network 105.

(3) Control Unit 141

The control unit 141 receives a control command including an air conditioner control information table from the mobile terminal 101 via the network 104 and the transmitting/receiving unit 142. Next, the control unit 141 extracts the air conditioner control information table from the received control command. Next, the control unit 141 writes the extracted air conditioner control information table into the storage unit 143.

The control unit 141 determines whether or not a current time matches a scheduled time in the air conditioner control information table stored in the storage unit 143. In a case where the current time does not match a scheduled time in the air conditioner control information table stored in the storage unit 143, the control unit 141 repeats the processing for determining whether or not the current time matches a scheduled time after elapse of a period of time.

In a case where the current time matches a scheduled time in the air conditioner control information table stored in the storage unit 143, the control unit 141 reads out setting information including the scheduled time that matches the current time from the air conditioner control information table. Next, the control unit 141 generates a control command including the setting information thus read out.

Next, the control unit 141 transmits the generated control command to the air conditioner 102 via the transmitting/receiving unit 142 and the network 105.

1.4 Air Conditioner 102

Figure 7:
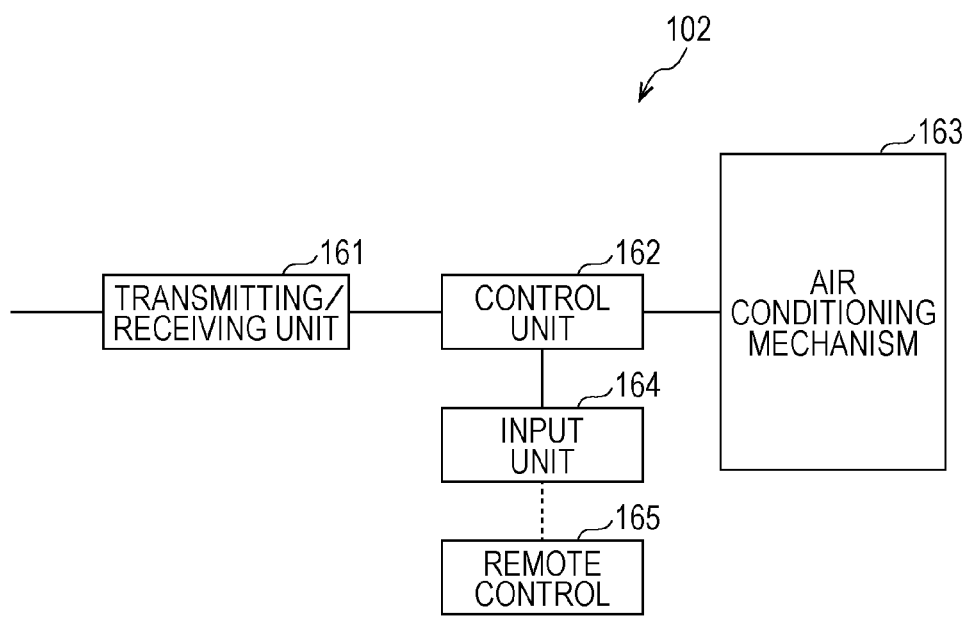
FIG. 7 is a block diagram illustrating a configuration of an air conditioner.

FIG. 7 illustrates a configuration of the air conditioner 102.

The air conditioner 102 is connected to an outdoor unit (not illustrated) via a connection pipe. The outdoor unit includes a compressor, an outdoor air blower, and an outdoor heat exchanger.

As illustrated in FIG. 7, the air conditioner 102 includes a transmitting/receiving unit 161, a control unit 162, an input unit 164, and an air conditioning mechanism 163. The air conditioner 102 is operated by using a remote control 165.

The air conditioning mechanism 163 includes an indoor heat exchanger, an indoor air blower fan, and the like.

Specifically, the control unit 162 is a computer system constituted by a microprocessor, a ROM, a RAM, and the like. Computer programs are stored in the RAM. The microprocessor operates in accordance with the computer programs. Thus, the control unit 162 accomplishes functions thereof.

The transmitting/receiving unit 161 receives a control command including setting information from the server device 103 via the network 105. Next, the transmitting/receiving unit 161 supplies the received control command to the control unit 162.

The control unit 162 receives the control command from the transmitting/receiving unit 161. Next, the control unit 162 extracts the setting information from the received control command. Next, the control unit 162 controls the air conditioning mechanism 163 to operate by using the extracted setting information.

The air conditioning mechanism 163 operates in accordance with an operation mode, a preset temperature, which is a target temperature, a wind direction, an air volume, and the like included in the setting information.

1.5 Operation of Air Conditioner Remote Control System 10

Operation of the air conditioner remote control system 10 is described below.

(1) Overall Operation of Air Conditioner Remote Control System 10

Overall operation of the air conditioner remote control system 10 is described below with reference to the sequence diagrams illustrated in FIGS. 8 through 10.

The touch panel 120 and the operation accepting unit 119 of the mobile terminal 101 accept user's operation. In a case where the accepted operation is operation other than designation of an air conditioner control application ("OTHER OPERATION" in Step S101), the control unit 117 performs other processing (Step S111).

In a case where the accepted operation is designation of an air conditioner control application ("DESIGNATION OF AIR CONDITIONER CONTROL APP" in Step S101), the control unit 117 reads out the air conditioner control application. Next, the air conditioner control application is activated (Step S102). Next, the acquiring unit 117a reads out setting screen data from the storage unit 121 (Step S103), reads out an air conditioner control information table 123 (Step S104), and reads out a temperature range table 122 (Step S105).

Next, the display control unit 117d generates a setting screen and supplies the generated setting screen to the touch panel 120 via the input/output control unit 118. The touch panel 120 displays the setting screen (Step S106).

Next, the touch panel 120 and the operation accepting unit 119 accept user's operation. In a case where the accepted operation is operation of a slider ("OPERATION OF SLIDER" in Step S107), the control unit 117 proceeds to the control operation in Step S121.

In a case where the accepted operation is operation of the start button 205 ("START BUTTON" in Step S107), the control unit 117 proceeds to the control operation in Step S141.

In a case where the accepted operation is tap operation of a slider ("TAP OPERATION OF SLIDER" in Step S107), the control unit 117 changes the operation mode (Step S108) and proceeds to the control operation in Step S107.

In a case where the accepted operation is designation of a wind direction or an air volume ("DESIGNATION OF WIND DIRECTION OR AIR VOLUME" in Step S107), the control unit 117 changes a wind direction or an air volume (Step S109) and proceeds to the control operation in Step S107.

In a case where the accepted operation is other operation ("OTHER OPERATION" in Step S107), the control unit 117 performs other processing (Step S110).

The touch panel 120 detects the position of the slider and supplies the detected position to the control unit 117 via the input/output control unit 118 (Step S121). The acquiring unit 117a receives the position of the slider, and the calculating unit 117b converts the received position of the slider into a temperature (Step S122).

Next, the determining unit 117c determines whether or not the temperature obtained by conversion is within a range between an upper limit temperature and a lower limit temperature at a corresponding scheduled time in the temperature range table 122 (Step S123).

In a case where the temperature obtained by conversion is not within the range between the upper limit temperature and the lower limit temperature ("OUT OF TEMPERATURE RANGE" in Step S123, the display control unit 117d controls the speaker 115 to emit a beep sound (Step S124). Next, the display control unit 117d controls the vibrator 124 to vibrate via the input/output control unit 118 (Step S125).

Next, the control unit 117 updates setting information in the air conditioner control information table 123 stored in the storage unit 121 (Step S126). Next, the control unit 117 proceeds to the control operation in Step S107.

In a case where the temperature obtained by conversion is within the range between the upper limit temperature and the lower limit temperature ("WITHIN TEMPERATURE RANGE" in Step S123), the control unit 117 proceeds to the control operation in Step S126.

When the start button 205 is pressed ("START BUTTON" in Step S107), the control unit 117 reads out the air conditioner control information table 123 from the storage unit 121. Next, the control unit 117 generates a control command including the air conditioner control information table 123 thus read out (Step S141). Next, the control unit 117 transmits the generated control command to the server device 103 via the communication control unit 113, the wireless communication unit 112, the antenna 111, and the network 104 (Step S142).

The transmitting/receiving unit 142 of the server device 103 receives the control command from the mobile terminal 101 via the network 104 (Step S142). Next, the control unit 141 extracts the air conditioner control information table from the control command and then writes the extracted air conditioner control information table into the storage unit 143 (Step S143).

Next, the control unit 141 of the server device 103 determines whether or not a current time matches a scheduled time in the air conditioner control information table stored in the storage unit 143 (Step S144). In a case where the current time does not match the scheduled time in the air conditioner control information table stored in the storage unit 143 ("NO" in Step S144), the control unit 141 returns to Step S144 and repeats the processing.

In a case where the current time matches a scheduled time in the air conditioner control information table stored in the storage unit 143 ("YES" in Step S144), the control unit 141 reads out setting information including the scheduled time that matches the current time from the air conditioner control information table. Next, the control unit 141 generates a control command including the setting information thus read out (Step S145).

Next, the control unit 141 transmits the generated control command to the air conditioner 102 via the transmitting/receiving unit 142 and the network 105 (Step S146).

The transmitting/receiving unit 161 of the air conditioner 102 receives the control command from the server device 103 via the network 105 (Step S146).

The control unit 162 of the air conditioner 102 extracts the setting information from the received control command. Next, the control unit 162 controls the air conditioning mechanism 163 to operate based on the extracted setting information (Step S147).

(2) Operation for Generating and Displaying Setting Screen in Control Unit 117

Operation for generating and displaying setting screen in the display control unit 117*d* of the control unit 117 is described below with reference to the flow chart illustrated in FIG. 11.

The display control unit 117*d* generates an outer frame of the setting screen 200*a* (Step S151). Next, the display control unit 117*d* generates scale values of the vertical axis 202 (Step S152).

Next, the display control unit 117*d* repeats the following Steps S154 through S165 for each scheduled time included in the temperature range table 122 (Steps S153 through S166).

The display control unit 117*d* extracts the scheduled time from the temperature range table 122 (Step S154). Next, the display control unit 117*d* generates a scale value of the horizontal axis 203 of the setting screen 200*a* (Step S155).

Next, the display control unit 117*d* generates a frame of a temperature bar (Step S156).

Next, the acquiring unit 117*a* extracts an upper limit temperature and a lower limit temperature that correspond to the scheduled time from the temperature range table 122 (Step S157).

Next, the calculating unit 117*b* calculates a difference between the extracted upper limit temperature and lower limit temperature (Step S158).

Next, the determining unit 117*c* compares the calculated difference with a range threshold value (Step S159).

In a case where the difference is less than the range threshold value ("LESS THAN" in Step S159), the display control unit 117*d* hatches a high temperature range of the temperature bar in a first pattern (Step S160) and hatches a low temperature range of the temperature bar in the first pattern (Step S161).

In a case where the difference is equal to or larger than the range threshold value ("EQUAL TO OR LARGER THAN" in Step S159), the display control unit 117*d* hatches the high temperature range of the temperature bar in a second pattern (Step S162) and hatches the low temperature range of the temperature bar in the second pattern (Step S163).

Next, the display control unit 117*d* extracts an operation mode and a preset temperature corresponding to the scheduled time from the air conditioner control information table 123 (Step S164).

Next, the display control unit 117*d* generates a slider on which the extracted operation mode is displayed and causes the generated slider to be displayed at a position corresponding to the extracted preset temperature (Step S165).

After repetition from Step S153 to S166 is finished, the display control unit 117*d* generates the start button 205 (Step S167).

Next, the display control unit 117*d* supplies the generated setting screen 200*a* to the touch panel 120 via the input/output control unit 118. The touch panel 120 receives the setting screen 200*a* and displays the received setting screen 200*a* (Step S168).

This finishes the operation for generating and displaying the setting screen 200*a*.

As described above, detailed setting of a preset temperature of an air conditioner in each time zone is possible by using a mobile terminal. Furthermore, since a limitation is set on the width of fluctuation of the preset temperature, it is possible to avoid physical deconditioning and an increase in electricity bill.

Furthermore, a user can know whether or not a difference between an upper limit temperature and a lower limit temperature is equal to or larger than a threshold value on the basis of a display form of items related to the upper limit temperature and the lower limit temperature. In a case where the difference is equal to or larger than the range threshold value, a range of available preset temperatures is wide. Therefore, a user is highly likely to perform an operation that causes a rapid change of the ambient temperature of the air conditioner. In such a case, the user can be warned not to perform an operation that causes a rapid change of temperature.

1.6 Modification 1

An air conditioner remote control system 10*a*, which is Modification 1 of the air conditioner remote control system 10, is described below.

The air conditioner remote control system 10*a* has a configuration similar to the air conditioner remote control system 10. Differences from the air conditioner remote control system 10 are mainly described below.

In the air conditioner remote control system 10*a*, upper limit temperatures at a plurality of scheduled times are set in real time based on a minimum preset temperature among a plurality of preset temperatures. Furthermore, lower limit temperatures at a plurality of scheduled times are set in real time based on a maximum preset temperature among a plurality of preset temperatures. This makes it possible to prevent the upper limit temperatures from becoming too high and prevent the lower limit temperatures from becoming too low.

Furthermore, in a case where a selected preset temperature is not within a range between an upper limit temperature and a lower limit temperature, the selected preset temperature is forcibly changed to a temperature within the range between the upper limit temperature and the lower limit temperature. Thus, user's operation is restricted.

Figure 12A:
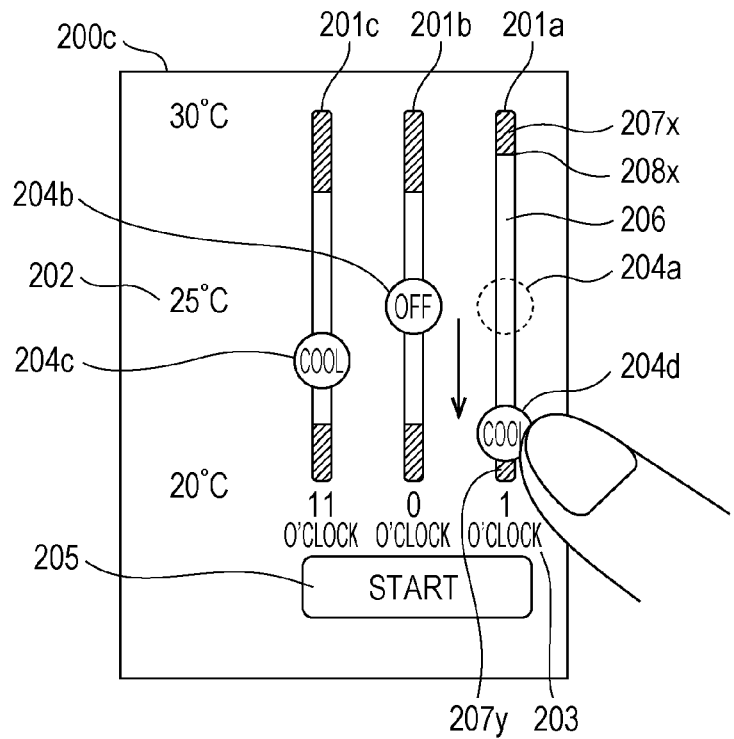
FIG. 12A is a diagram illustrating a setting screen displayed on a mobile terminal in Modification 1.

FIG. 12A illustrates a setting screen 200c. As illustrated in FIG. 12A, a user slides a temperature setting button 204a downward on the setting screen 200c to a position indicated by a temperature setting button 204d. The temperature setting button 204d is at a temperature position lower than a lower limit temperature 208y.

Figure 12B:
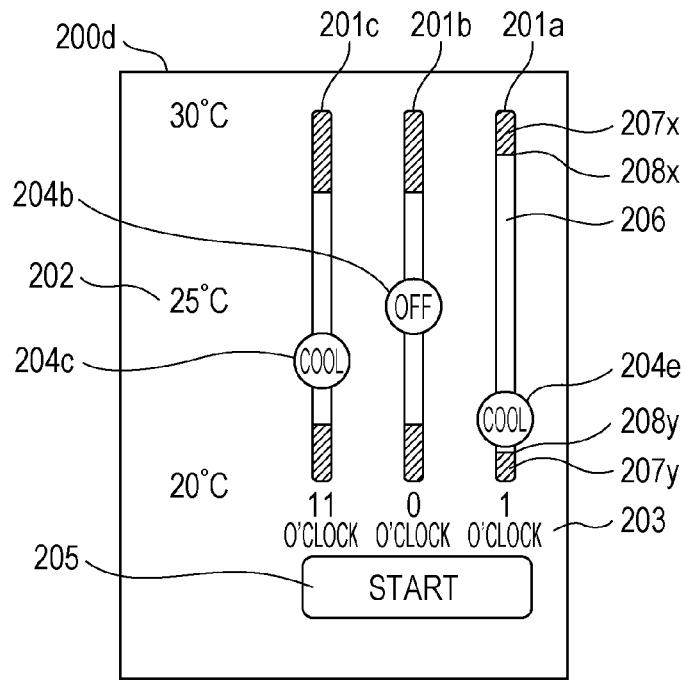
FIG. 12B is a diagram illustrating a setting screen displayed on the mobile terminal in Modification 1.

In this case, a control unit 117 determines whether or not the temperature setting button 204d is at a temperature position lower than the lower limit temperature 208y. The temperature setting button 204d is at a temperature position lower than the lower limit temperature 208y. Accordingly, the control unit 117 forcibly changes the position of the temperature setting button 204d. As illustrated in FIG. 12B, the control unit 117 sets, as a new preset temperature, a temperature that is closest to the lower limit temperature 208y and is higher than the lower limit temperature 208y. Next, the control unit 117 causes a new temperature setting button 204e to be displayed at a temperature position indicative of the new preset temperature. Note that the new preset temperature may be used as a lower limit temperature.

In a case where the changed temperature setting button is at a temperature position higher than the upper limit temperature 208x, the control unit 117 forcibly changes the position of the changed temperature setting button. The control unit 117 sets, as a new preset temperature, a temperature that is closest to the upper limit temperature 208x and is lower than the upper limit temperature 208x. Next, the control unit 117 causes a new temperature setting button to be displayed at a temperature position indicative of the new preset temperature. Note that the new preset temperature may be used as an upper limit temperature.

It is assumed here that a temperature is handled as an integer.

Next, operation in the air conditioner remote control system 10a is described with reference to the sequence drawings illustrated in FIGS. 13 and 14.

Figure 8:
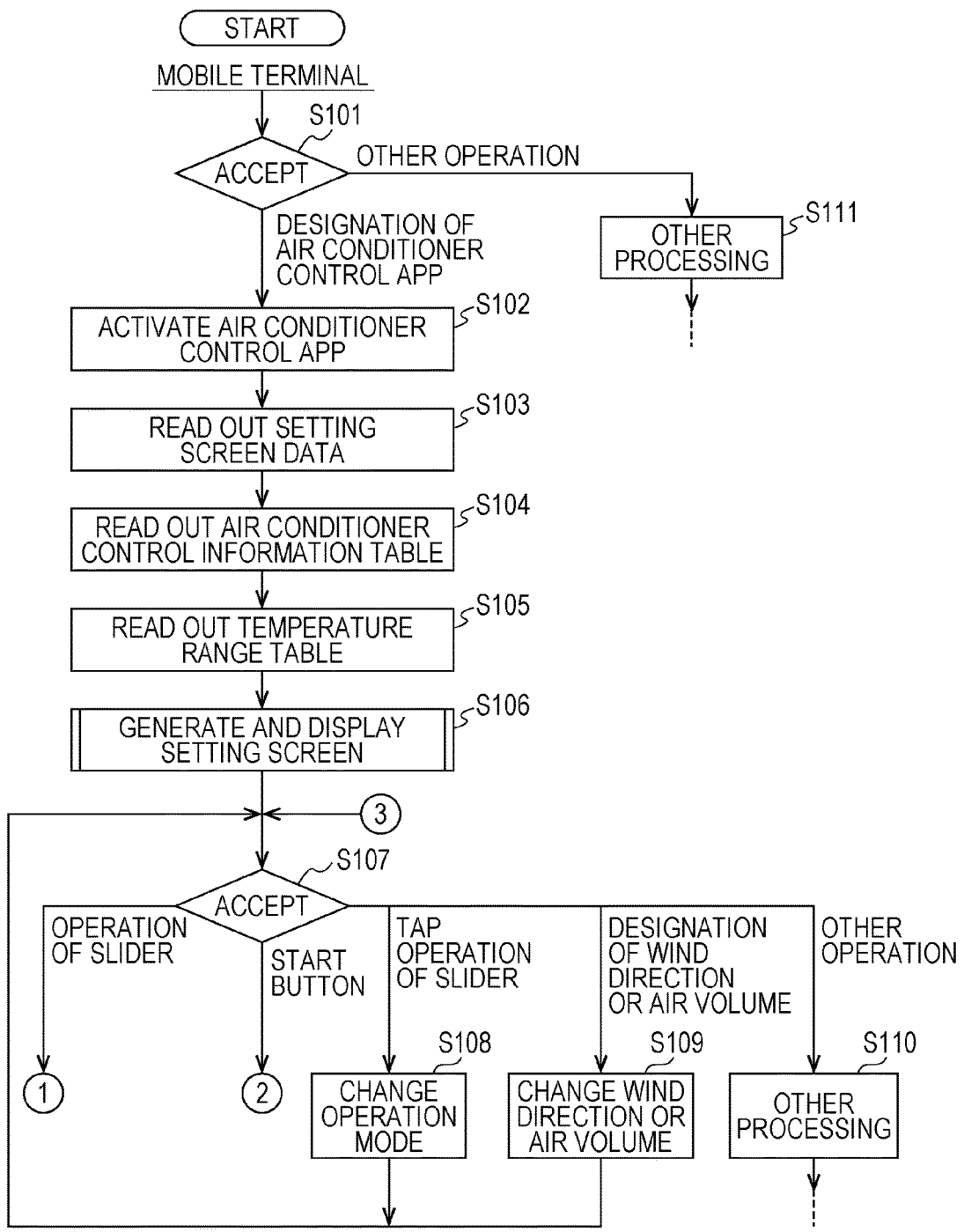
FIG. 8 is a (first) sequence diagram illustrating overall operation of the air conditioner remote control system.
Figure 13:
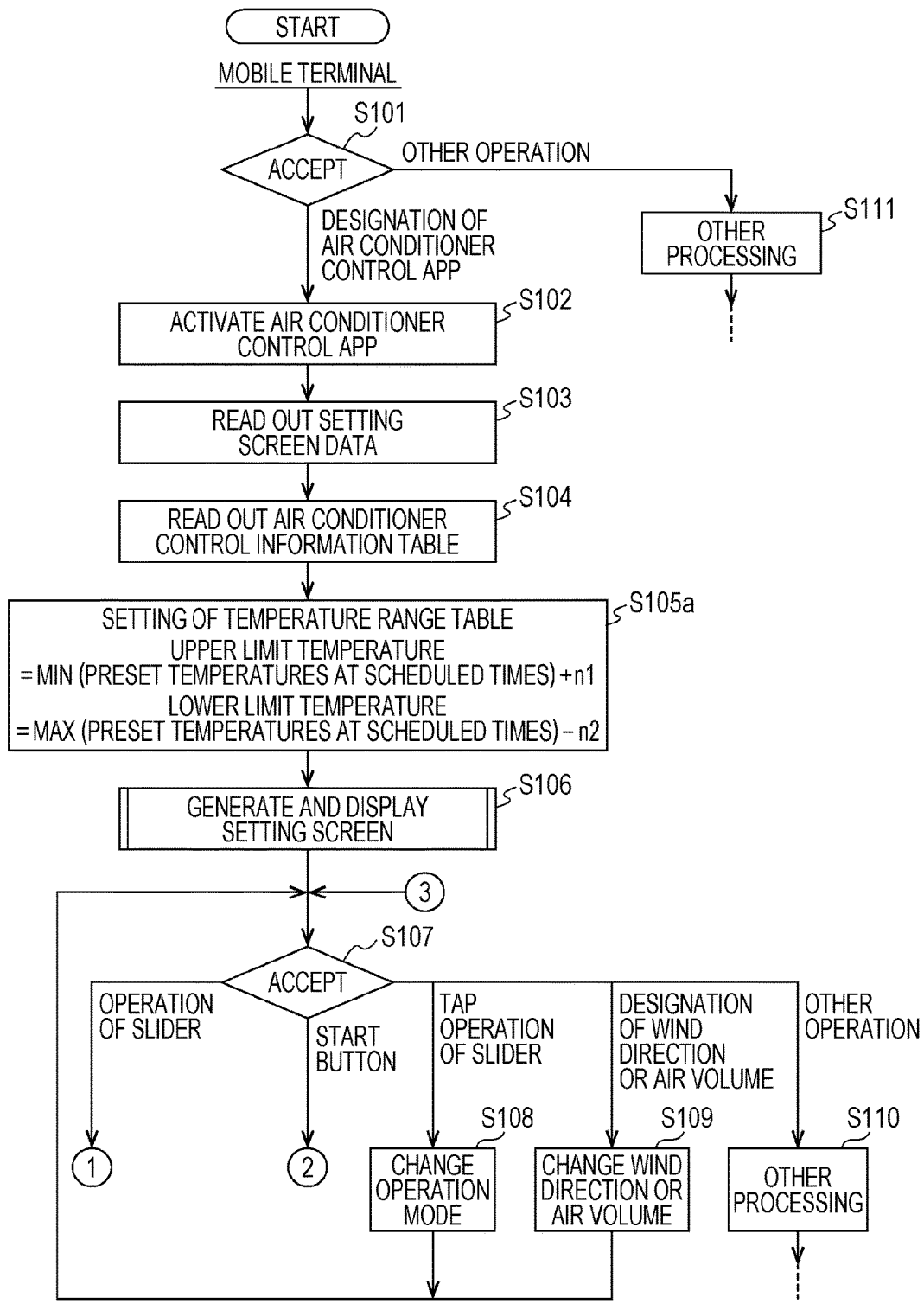
FIG. 13 is a (first) sequence diagram illustrating operation of the air conditioner remote control system in Modification 1.
Figure 14:
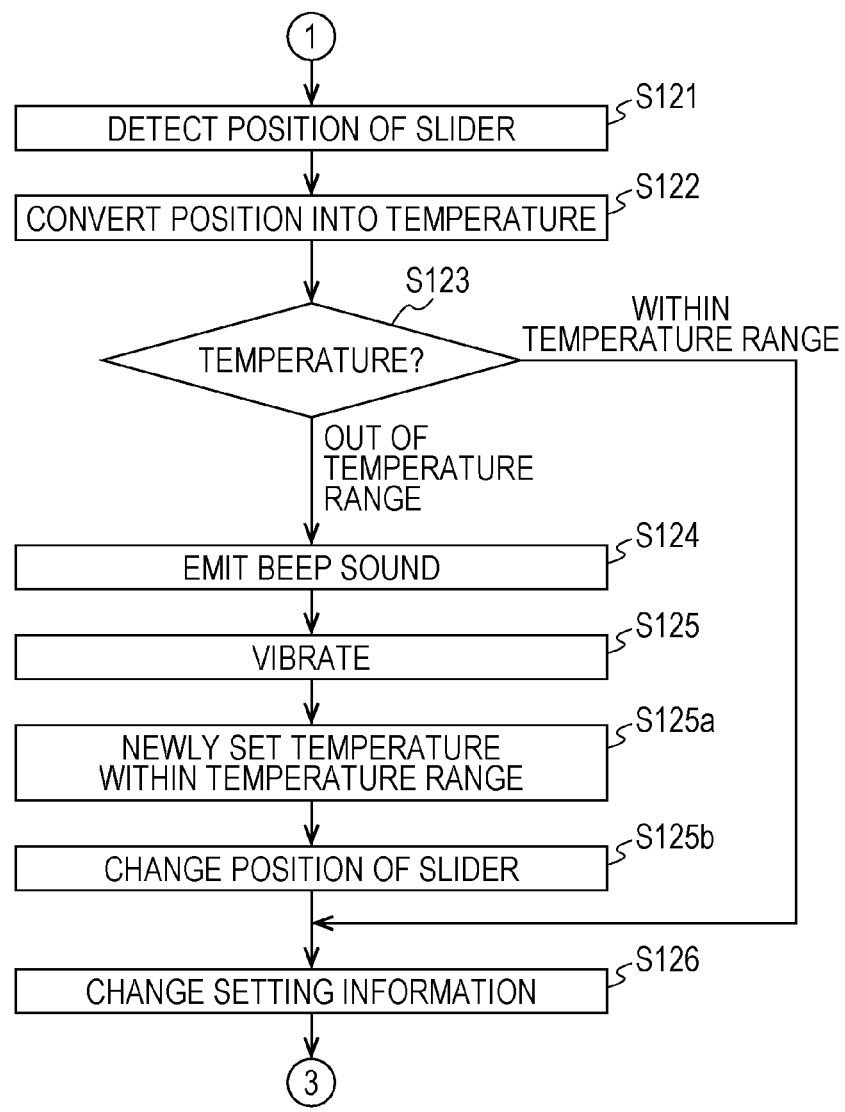
FIG. 14 is a (second) sequence diagram illustrating operation of the air conditioner remote control system in Modification 1.

The sequence diagram illustrated in FIG. 13 is almost identical to the sequence diagram illustrated in FIG. 8 illustrating operation of the air conditioner remote control system 10 according to Embodiment 1. A difference is that Step S105a is used in FIG. 13 instead of Step S105 in FIG. 8.

In Step S105a that follows Step S104, the control unit 117 sets an upper limit temperature and a lower limit temperature at each scheduled time in real time in accordance with the following formulas:

upper limit temperature=MIN(preset temperatures at a plurality of scheduled times)+$n1$  formula 1 lower limit temperature=MAX(preset temperatures at a plurality of scheduled times)−$n2$  formula 2 where n1 and n2 are suitably 5 degrees or lower.

The control unit 117 writes the calculated upper limit temperature and lower limit temperature at each scheduled time into corresponding temperature range information in a temperature range table 122 stored in a storage unit 121.

The term "real time" refers to "every time a preset temperature at a scheduled time is changed". Alternatively, the term "real time" may refer to "a timing at which a temperature setting button is slid". A timing at which an upper limit temperature and a lower limit temperature are set in accordance with the formulas 1 and 2 may be a timing at which a user finishes operation of sliding a temperature setting button. Alternatively, the timing at which an upper limit temperature and a lower limit temperature are set in accordance with the formulas 1 and 2 may be after elapse of a certain period of time from the end of user's operation of sliding a temperature setting button.

"MIN (a, b, c)" means that a minimum value out of a, b, and c is selected, and "MAX (a, b, c)" means that a maximum value out of a, b, and c is selected.

For example, preset temperatures at scheduled times of 11 o'clock, 0 o'clock, 1 o'clock, and 2 o'clock are 22 degrees, 25 degrees, 25 degrees, and 22 degrees, respectively, as illustrated in FIG. 4. Accordingly, an upper limit temperature and a lower limit temperature are calculated in accordance with the formulas 1 and 2 as follows:

upper limit temperature=MIN(22 degrees,25 degrees, 25 degrees,22 degrees)+$n1$

=22 degrees+5 degrees

=27 degrees lower limit temperature=MAX(22 degrees,25 degrees,25 degrees,22 degrees)−$n2$ =25 degrees−5 degrees =20 degrees where n1=n2=5 degrees.

Figure 9:
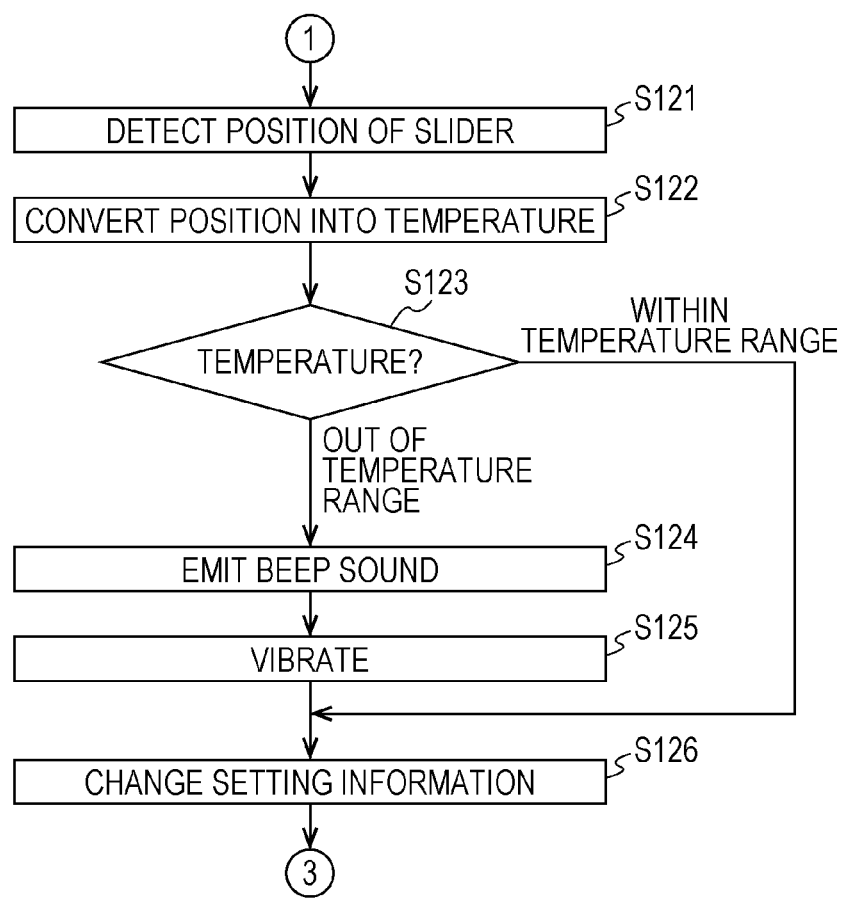
FIG. 9 is a (second) sequence diagram illustrating overall operation of the air conditioner remote control system.
Figure 10:
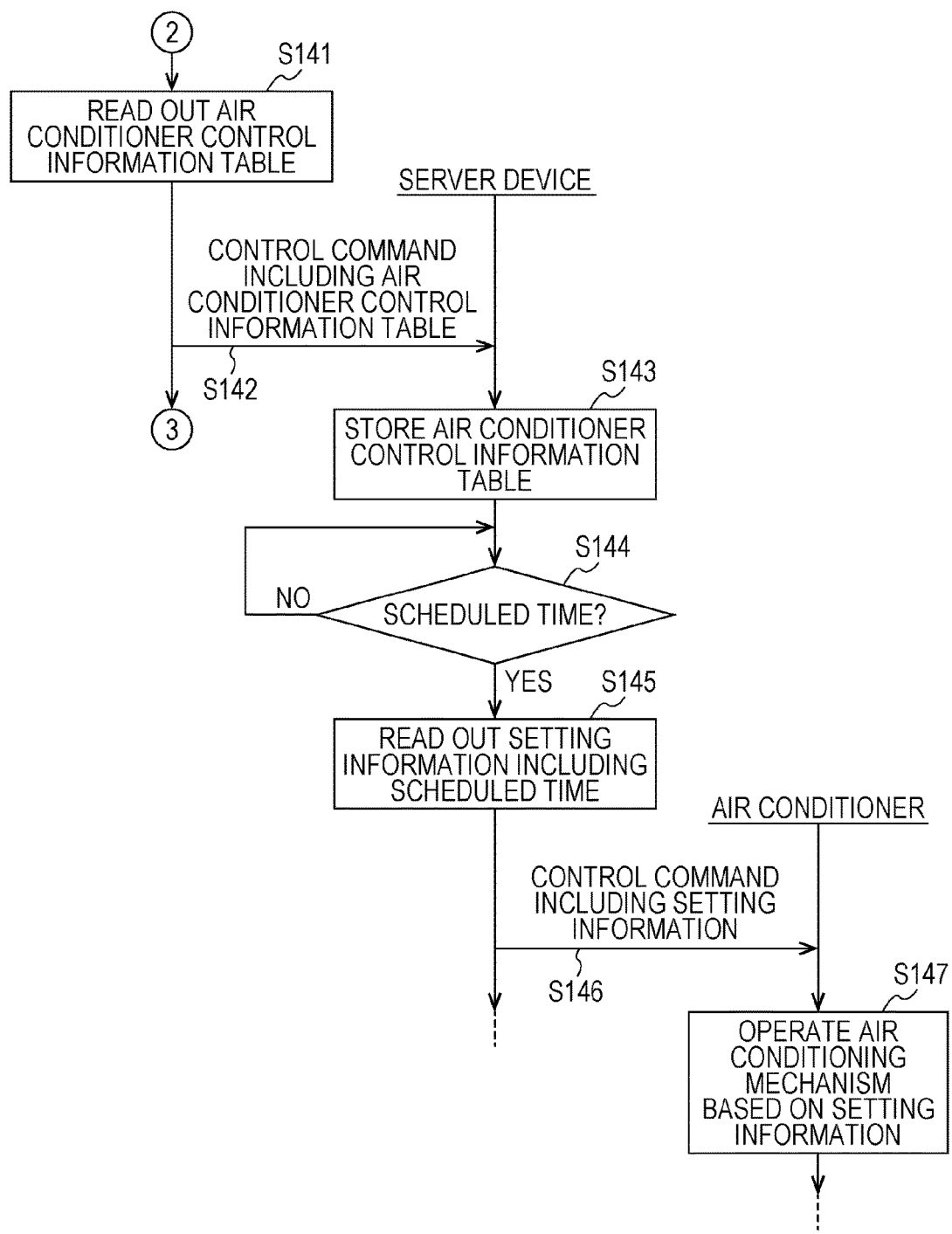
FIG. 10 is a (third) sequence diagram illustrating overall operation of the air conditioner remote control system.

The sequence diagram illustrated in FIG. 4 is almost identical to the sequence diagram of FIG. 9 illustrating operation of the air conditioner remote control system 10 according to Embodiment 1. A difference is that, in FIG. 14, Step S125a and S125b are inserted after Step S125 of FIG. 8.

In the step that follows Step S125, the control unit 117 newly sets a temperature within a temperature range (Step S125a). Next, the control unit 117 causes a new temperature setting button to be displayed at a temperature position indicative of the new preset temperature (Step S125b).

1.7 Modification 2

An air conditioner remote control system 10b, which is Modification 2 of the air conditioner remote control system 10, is described below.

The air conditioner remote control system 10b has a configuration similar to the air conditioner remote control system 10. Differences from the air conditioner remote control system 10 are mainly described below.

In the air conditioner remote control system 10b, an upper limit temperature at each scheduled time is set in real time based on preset temperatures at two scheduled times adjacent to the scheduled time. Furthermore, a lower limit temperature at each scheduled time is set in real time based on preset temperatures at two scheduled times adjacent to the scheduled time. This makes it possible to prevent an upper limit temperature from becoming too high and prevent a lower limit temperature from becoming too low.

Figure 15:
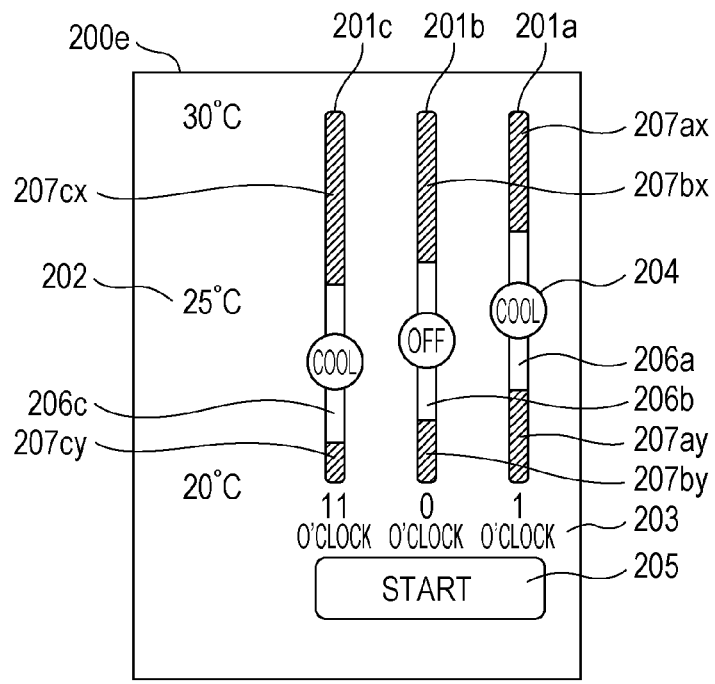
FIG. 15 is a diagram illustrating a setting screen displayed on a mobile terminal in Modification 2.

FIG. 15 illustrates a setting screen 200e. As illustrated in FIG. 15, preset temperatures at scheduled times of 11 o'clock, 0 o'clock, and 1 o'clock are 22 degrees, 23 degrees, and 24 degrees, respectively.

A control unit 117 sets an upper limit temperature and a lower limit temperature at the scheduled time "0 o'clock" in real time in accordance with the following formulas (see the flow chart of FIG. 16):

upper limit temperature=MIN(adjacent preset temperature on the right+$n1$,adjacent preset temperature on the left+$n2$)     formula 3

(Step S171)

lower limit temperature=MAX(adjacent preset temperature on the right−$n3$,adjacent preset temperature on the left−$n4$)     formula 4

(Step S172)

where n1, n2, n3, and n4 are suitably 5 degrees or lower.

The control unit 117 writes the calculated upper limit temperature and lower limit temperature at the scheduled time into corresponding temperature range information in a temperature range table 122 stored in a storage unit 121.

Figure 16:
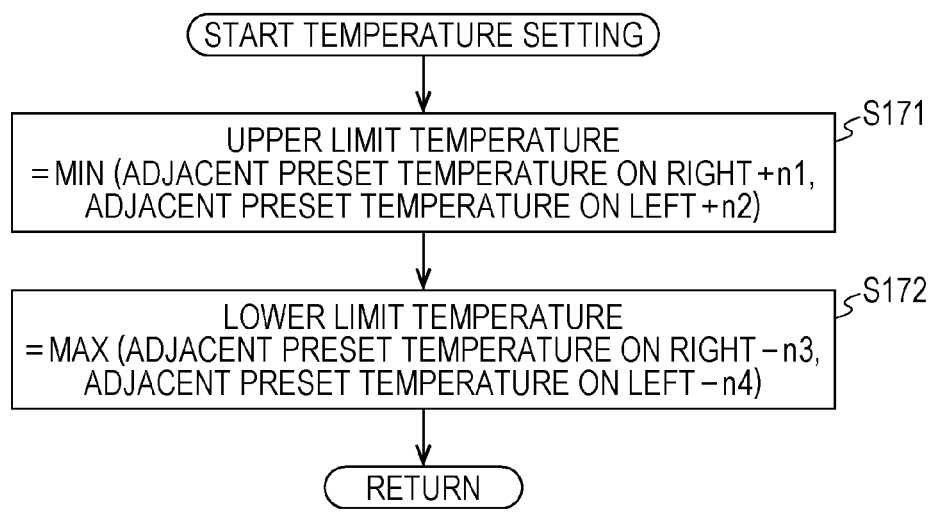
FIG. 16 is a flow chart illustrating operation for setting temperature in Modification 2.

Steps S171 and S172 in the flow chart illustrated in FIG. 16 need just be performed after Step S105 in the flow chart illustrated in FIG. 8.

For example, preset temperatures at scheduled times of 11 o'clock, 0 o'clock, and 1 o'clock are 22 degrees, 23 degrees, and 24 degrees, respectively, as illustrated in FIG. 15. Accordingly, an upper limit temperature and a lower limit temperature at the scheduled time "0 degree" are calculated in accordance with the formulas 3 and 4 as follows:

upper limit temperature=MIN(24+3,22+3)

=MIN(27,25)

=25 degrees lower limit temperature=MAX(24−3,22−3)

=MAX(21,19)

=21 degrees where n1=n2=n3=n4=5 degrees.

The term "real time" refers to "every time a preset temperature at a scheduled time is changed". Alternatively, the term "real time" may refer to "a timing at which a temperature setting button is slid". A timing at which an upper limit temperature and a lower limit temperature are set in accordance with the formulas 3 and 4 may be a timing at which a user finishes operation of sliding a temperature setting button. Alternatively, the timing at which an upper limit temperature and a lower limit temperature are set in accordance with the formulas 3 and 4 may be after elapse of a certain period of time from the end of user's operation of sliding a temperature setting button.

1.8 Modification 3

An air conditioner remote control system 10c, which is Modification 3 of the air conditioner remote control system 10, is described below.

The air conditioner remote control system 10c has a configuration similar to the air conditioner remote control system 10. Differences from the air conditioner remote control system 10 are mainly described below.

The air conditioner remote control system 10c is different from the air conditioner remote control system 10 in terms of the form of a setting screen displayed on a touch panel 120 of a mobile terminal 101.

(a) The air conditioner remote control system 10c may be different from the air conditioner remote control system 10 in terms of the form of a setting screen displayed on the touch panel 120 of the mobile terminal 101.

Figure 17:
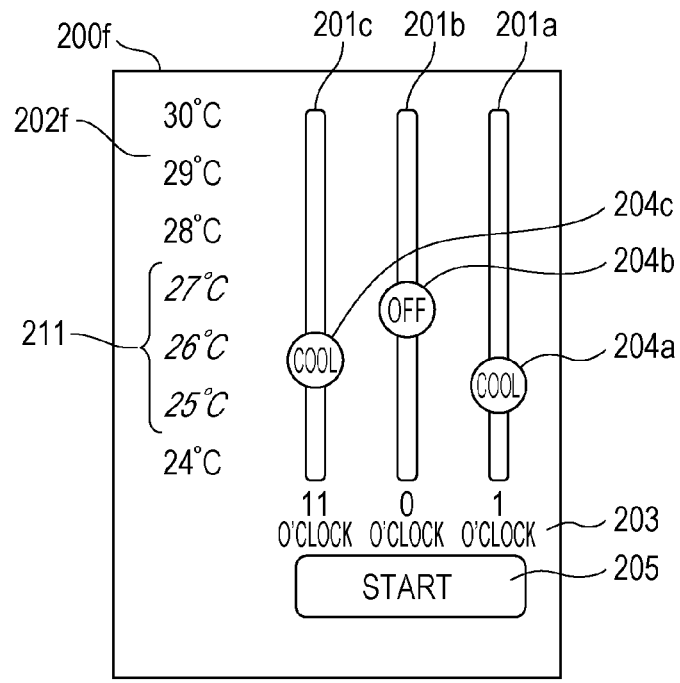
FIG. 17 is a diagram illustrating a setting screen displayed on a mobile terminal in Modification 3.

A control unit 117 may generate a setting screen 200f illustrated in FIG. 17.

The setting screen 200f is similar to the setting screen 200a illustrated in FIG. 5A.

It is assumed that upper limit temperatures at scheduled times of 11 o'clock, 0 o'clock, and 1 o'clock are the same and lower limit temperatures at the scheduled times of 11 o'clock, 0 o'clock, and 1 o'clock are the same on the setting screen 200f.

The setting screen 200f includes a vertical axis 202f, a horizontal axis 203, temperature bars 201a, 201b, and 201c, temperature setting buttons 204a, 204b, and 204c, and a start button 205 as in the setting screen 200a.

On the setting screen 200f, the upper limit temperatures and the lower limit temperatures are not displayed in the temperature bars 201a, 201b, and 201c.

Temperatures 211 among temperatures displayed on the vertical axis 202f are expressed by using a character style different from other displayed temperatures.

Specifically, the temperatures 211 include "25° C.", "26° C.", and "27° C." written in italics. The other displayed temperatures are displayed in Gothic font that is not italics. In this way, a range of temperatures expressed by italics indicates temperatures between the upper limit temperature and the lower limit temperature.

As described above, a recommended temperature range may be expressed by using a character style.

(b) The air conditioner remote control system 10c may be different from the air conditioner remote control system 10 in terms of the form of a setting screen displayed on the touch panel 120 of the mobile terminal 101.

Figure 18:
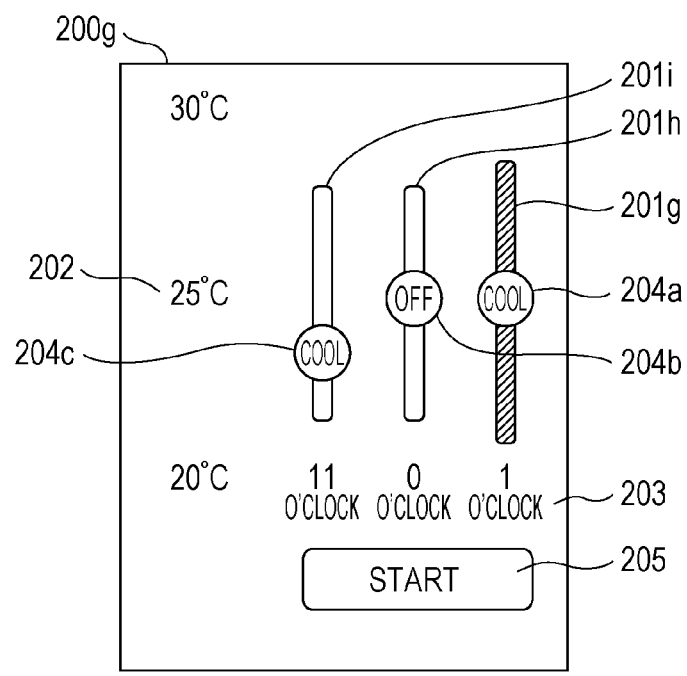
FIG. 18 is a diagram illustrating a setting screen displayed on the mobile terminal in Modification 3.

The control unit 117 may generate a setting screen 200g illustrated in FIG. 18.

The setting screen 200g is similar to the setting screen 200a illustrated in FIG. 5A.

The setting screen 200g includes a vertical axis 202, a horizontal axis 203, temperature bars 201g, 201h, and 201i, temperature setting buttons 204a, 204b, and 204c, and a start button 205 as in the setting screen 200a.

On the setting screen 200g, the temperature bar 201g displays only a range between an upper limit temperature and a lower limit temperature. The same applies to the temperature bars 201b and 201c. The setting screen 200g is different from the setting screen 200a illustrated in FIG. 5A in this point.

As for the temperature bar 201g, a difference between the upper limit temperature and the lower limit temperature is equal to or larger than a range threshold value, and therefore the whole temperature bar 201g is decorated in a first pattern. Meanwhile, as for the temperature bars 201b and 201c, a difference between an upper limit temperature and a lower limit temperature is less than the range threshold value, and therefore the whole temperature bars 201b and 201c are decorated in a second pattern.

In FIG. 18, the decoration of the first pattern is hatching with diagonally rightward lines, and the decoration of the second pattern is no hatching.

Note that the decoration of the first pattern may be hatching with diagonally rightward lines and diagonally leftward lines, and the decoration of the second pattern may be hatching with diagonally leftward lines. Alternatively, the decoration of the first pattern may be coloring using a first color, and the decoration of the second pattern may be coloring using a second color. The first color may be red, and the second color may be green.

As described above, a recommended temperature range may be expressed by the length of a rail part.

(c) The air conditioner remote control system 10*c* may be different from the air conditioner remote control system 10 in terms of the form of a setting screen displayed on the touch panel 120 of the mobile terminal 101.

Figure 19:
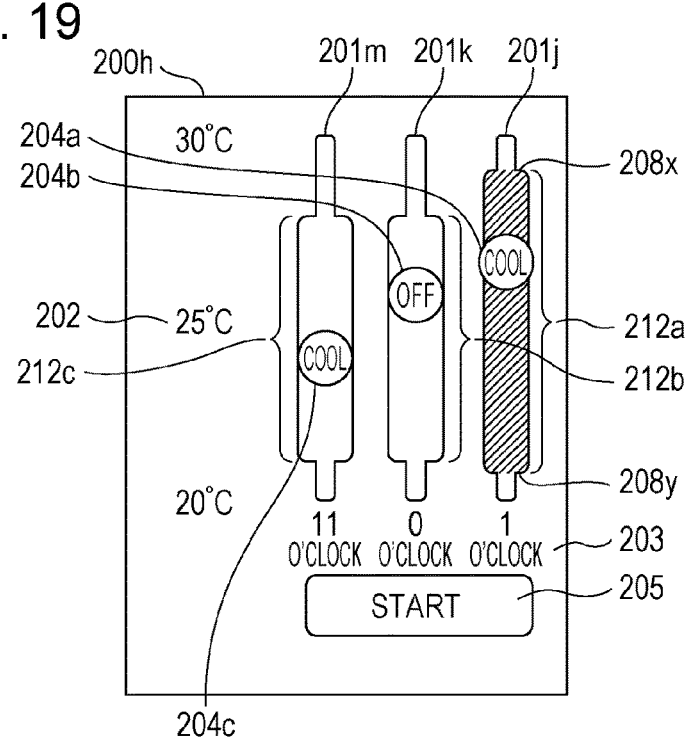
FIG. 19 is a diagram illustrating a setting screen displayed on the mobile terminal in Modification 3.

The control unit 117 may generate a setting screen 200*h* illustrated in FIG. 19.

The setting screen 200*h* is similar to the setting screen 200*a* illustrated in FIG. 5A.

The setting screen 200*h* includes a vertical axis 202, a horizontal axis 203, temperature bars 201*j*, 201*k*, and 201*m*, temperature setting buttons 204*a*, 204*b*, and 204*c*, and a start button 205 as in the setting screen 200*a*.

On the setting screen 200*g*, the temperature bar 201*j* is arranged such that a recommended temperature range between an upper limit temperature 208*x* and a lower limit temperature 208*y* is formed in a wide band-like shape and a high temperature range that is not less than the upper limit temperature 208*x* and a low temperature range that is not more than the lower limit temperature 208*y* are formed in a narrow band-like shape.

The same applies to the temperature bars 201*k* and 201*m*.

As for the temperature bar 201*j*, a difference between the upper limit temperature and the lower limit temperature is equal to or larger than a range threshold value, and therefore the recommended temperature range is decorated in a first pattern. Meanwhile, the high temperature range and the low temperature range are decorated in a second pattern. The width of the recommended temperature range 212*a* is narrower than the width of a recommended temperature range 212*b* and the width of a recommended temperature range 212*c*.

As for the temperature bars 201*k* and 201*m*, a difference between an upper limit temperature and a lower limit temperature is less than the range threshold value. Accordingly, a high temperature range, a recommended temperature range, and a low temperature range are decorated in a second pattern.

In FIG. 19, the decoration of the first pattern is hatching with diagonally rightward lines, and the decoration of the second pattern is no hatching.

Note that the decoration of the first pattern may be hatching with diagonally rightward lines and diagonally leftward lines, and the decoration of the second pattern is hatching with diagonally leftward lines. Alternatively, the decoration of the first pattern may be coloring using a first color, and the decoration of the second pattern may be coloring using a second color. The first color may be red, and the second color may be green.

As described above, a recommended temperature range may be expressed by the width of a rail part.

Figure 20:
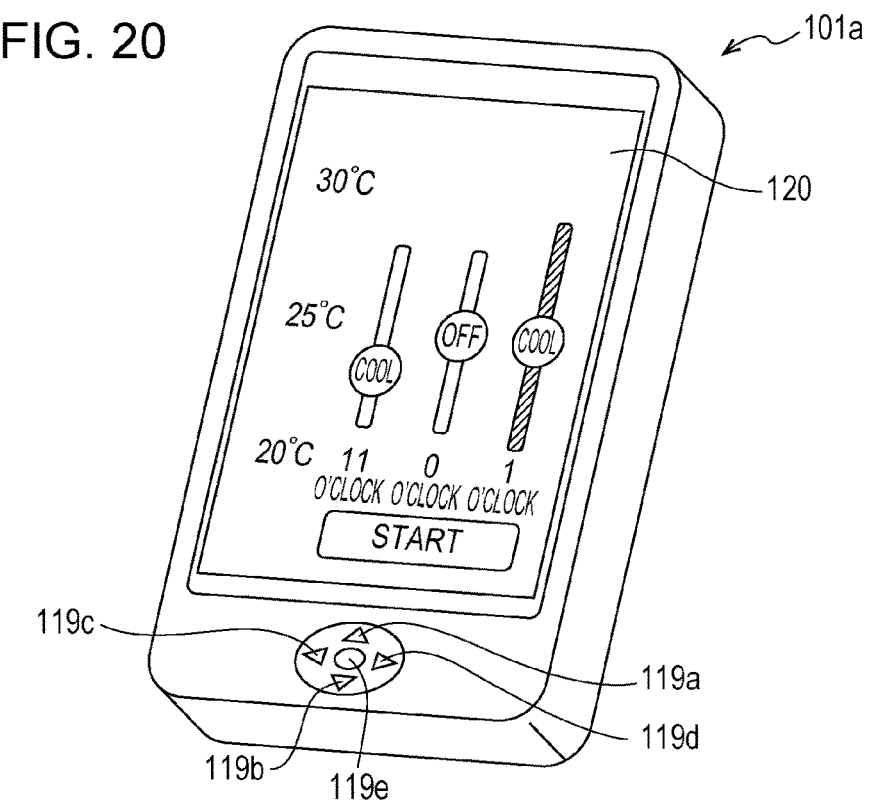
FIG. 20 is a perspective view illustrating appearance of the mobile terminal in Modification 3.

(d) The air conditioner remote control system 10*c* may include a mobile terminal 101*a* illustrated in FIG. 20 instead of the mobile terminal 101.

The mobile terminal 101*a* has a configuration similar to the mobile terminal 101 but is different from the mobile terminal 101 in the following points.

As illustrated in FIG. 20, the mobile terminal 101*a* includes physical buttons on a surface that is level with a display surface of a touch panel 120. The buttons are an up key 119*a*, a down key 119*b*, a left key 119*c*, a right key 119*d*, and a decision key 119*e*.

A setting screen identical to the setting screen 200*g* illustrated in FIG. 18 is displayed on the display surface of the touch panel 120. Note that the setting screen illustrated in FIG. 5A, 17, or 19 is displayed on the display surface of the touch panel 120.

When a user presses the left key 119*c*, the control unit 117 selects a temperature setting button located on the left of a temperature setting button that is currently being selected. In a case where there is no temperature setting button on the left of the temperature setting button that is currently being selected, the selected state of the temperature setting button that is currently being selected is not changed.

When the right key 119*d* is pressed by a user, the control unit 117 selects a temperature setting button located on the right of a temperature setting button that is currently being selected. In a case where there is no temperature setting button on the right of the temperature setting button that is currently being selected, the selected state of the temperature setting button that is currently being selected is not changed.

In this way, a temperature setting button which is a target of operation is switched by using the left key 119*c* or the right key 119*d*.

When the up key 119*a* is pressed one time by a user, the control unit 117 moves a selected temperature setting button upward by one degree. In this case, the control unit 117 adds one degree to a preset temperature. When the temperature setting button reaches an upper end of a temperature range, the temperature setting button does not move any further.

When the down key 119*b* is pressed one time by a user, the control unit 117 moves a selected temperature setting button downward by one degree. In this case, the control unit 117 subtracts one degree from a preset temperature. When the temperature setting button reaches a lower end of a temperature range, the temperature setting button does not move any further.

In this way, a temperature is changed by operating a temperature setting button by using the up key 119*a* or the down key 119*b*.

When the decision key 119*e* is pressed by a user, the control unit 117 transmits a control command including an air conditioner control information table.

1.9 Modification 4

An air conditioner remote control system 10*d*, which is Modification 4 of the air conditioner remote control system 10, is described below.

The air conditioner remote control system 10*d* has a configuration similar to the air conditioner remote control system 10. Differences from the air conditioner remote control system 10 are mainly described below.

The air conditioner remote control system 10*d* is different from the air conditioner remote control system 10 in terms of a setting screen displayed on a touch panel 120 of a mobile terminal 101.

Figure 21:
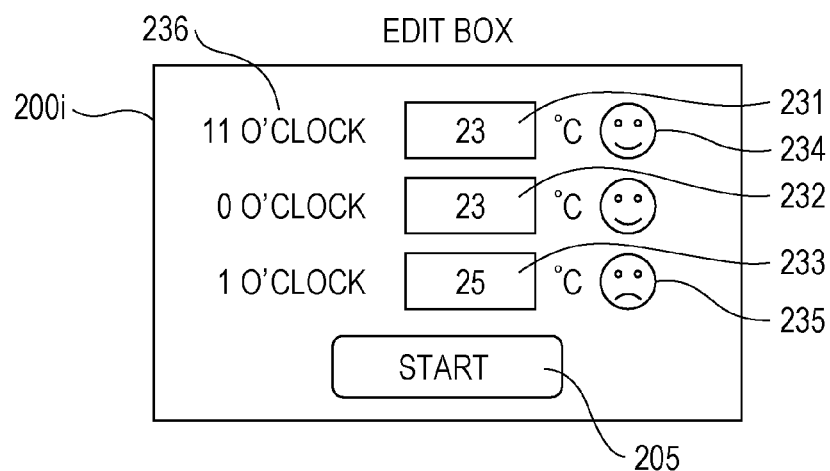
FIG. 21 is a diagram illustrating a setting screen displayed on a mobile terminal in Modification 4.

(1) A mobile terminal 101 of the air conditioner remote control system 10*d* may display a setting screen 200*i* illustrated in FIG. 21.

In this example, an item related to an upper limit temperature and a lower limit temperature is an indication for determination displayed on the setting screen 200*i* in association with displayed upper limit temperature and lower limit temperature. The indication for determination indicates whether or not a difference between the upper limit temperature and the lower limit temperature is equal to or larger than a range threshold value. A display control unit 117*d* causes the indication for determination in a case where the difference is equal to or larger than the range threshold value to be displayed in a form different from that in a case where the difference is less than the range threshold value.

The display control unit 117d causes a field that accepts selection of a preset temperature by user's input and displays the selected preset temperature and an indication for determination indicating whether or not a difference between an upper limit temperature and a lower limit temperature is equal to or larger than the range threshold value to be displayed in association with each other on the setting screen 200i.

The display control unit 117d causes the indication for determination in a case where the difference is equal to or larger than the range threshold value to be displayed in a form different from that in a case where the difference is less than the range threshold value.

More specifically, on the setting screen 200i, a plurality of display rows are displayed in a vertical direction in a central part of the setting screen 200i, and a start button 205 is displayed in a lower part of the setting screen 200i. Each display row includes a scheduled time, an input field in which a preset temperature is input and displayed, the unit of temperature, and an indication for determination indicating a result of comparison with the range threshold value.

As illustrated in FIG. 21, a first display row of the setting screen 200i includes a scheduled time 236 "11 O'CLOCK", an input field 231 "23", a unit "° C.", and an indication for determination 234. A third display row of the setting screen 200i includes a scheduled time "1 O'CLOCK", an input field 233 "25", a unit "° C.", and an indication for determination 235.

The indication for determination 234 and the indication for determination 235 have different forms.

At the scheduled time corresponding to the first display row, a difference between an upper limit temperature and a lower limit temperature is less than the range threshold value. Meanwhile, at the scheduled time corresponding to the third display row, a difference between an upper limit temperature and a lower limit temperature is equal to or larger than the range threshold value. The indication for determination 234 and the indication for determination 235 have different forms. This allows the user to know whether or not a difference between an upper limit temperature and a lower limit temperature in a display row is equal to or larger than the range threshold value on the basis of an indication for determination.

(Details of Processing for Generating Setting Screen 200i)

Details of processing for generating the setting screen 200i by a control unit 117 are described below.

The display control unit 117d of the control unit 117 generates a rectangular outer frame along an outer periphery of the setting screen 200i.

The display control unit 117d repeats the following processing (a) through (g) for each scheduled time included in a temperature range table 122.

(a) An acquiring unit 117a extracts the scheduled time and an upper limit temperature and a lower limit temperature that correspond to the scheduled time from the temperature range table 122.

(b) The acquiring unit 117a extracts a preset temperature corresponding to the scheduled time from an air conditioner control information table 123.

(c) The display control unit 117d causes a new display row in which the items are displayed to be inserted in a central part of the setting screen 200i.

(d) The display control unit 117d causes the scheduled time, an input field in which the preset temperature is displayed, and a unit to be displayed in the display row.

(e) A calculating unit 117b calculates a difference between the extracted upper limit temperature and lower limit temperature.

(f) A determining unit 117c compares the calculated difference with a range threshold value.

(g) In a case where the difference is less than the range threshold value, the display control unit 117d causes an indication for determination indicating that the difference is less than the range threshold value to be displayed in the display row. Meanwhile, in a case where the difference is equal to or larger than the range threshold value, the display control unit 117d causes an indication for determination indicating that the difference is equal to or larger than the range threshold value to be displayed in the display row.

After repetition of the processing (a) through (g) is finished, the display control unit 117d generates the start button 205 and causes the generated start button 205 to be displayed in a lower part of the setting screen 200i.

The display control unit 117d supplies the generated setting screen 200i to a touch panel 120 via an input/output control unit 118. The setting screen 200i is displayed by the touch panel 120.

As described above, each display row includes an indication for determination. A user can know whether or not a difference between an upper limit temperature and a lower limit temperature that correspond to the display row is equal to or larger than a range threshold value by looking at the indication for determination.

Furthermore, the display control unit 117d may change part of the setting screen 200i to a background color, a font attribute (character color, size, decoration), or an icon that is different from the other part in a case where a preset temperature within a non-recommended temperature range is input on the setting screen 200i.

Furthermore, operation may be restricted, for example, as follows.

In a case where a preset temperature within a non-recommended temperature range is input on the setting screen 200i, the control unit 117 controls the setting screen 200i to maintain a state before the input.

Figure 22:
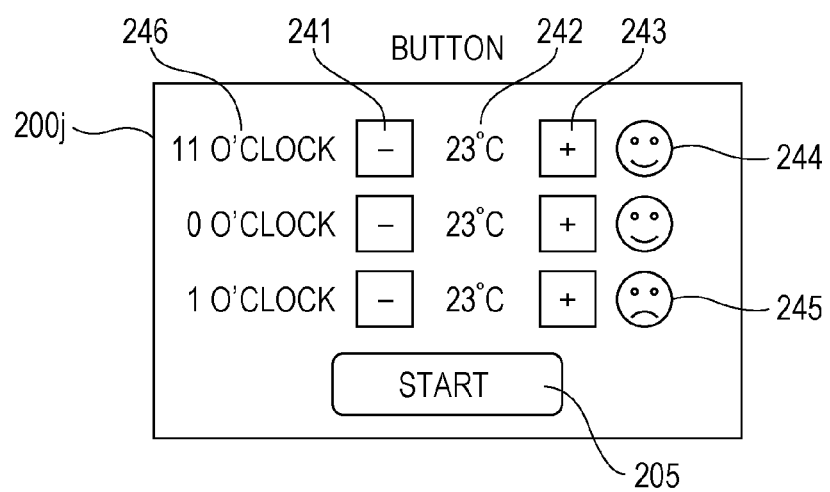
FIG. 22 is a diagram illustrating a setting screen displayed on the mobile terminal in Modification 4.

(2) The mobile terminal 101 of the air conditioner remote control system 10d may display a setting screen 200j illustrated in FIG. 22.

The display control unit 117d causes (i) a field for displaying a candidate temperature, (ii) a plus button for setting a preset temperature by adding one degree to the candidate temperature in response to user's operation, (iii) a minus button for setting a preset temperature by subtracting one degree from the candidate temperature in response to user's operation, and (iv) an indication for determination indicating whether or not a difference between an upper limit temperature and a lower limit temperature is equal to or larger than a range threshold value to be displayed on the setting screen 200j in association with one another. The display control unit 117d causes the indication for determination in a case where the difference is equal to or larger than the range threshold value to be displayed in a form different from that in a case where the difference is less than the range threshold value.

More specifically, a plurality of display rows are displayed in a vertical direction in a central part of the setting screen 200j, and a start button 205 is displayed in a lower part of the setting screen 200j. Each display row includes, in a horizontal direction, a scheduled time, a minus button, a display field for displaying a preset temperature, a unit of temperature, a plus button, and an indication for determination indicating a result of comparison with the threshold value.

As illustrated in FIG. 22, a first display row of the setting screen 200*j* includes a scheduled time 246 "11 O'CLOCK", a minus button 241 "−", a display field 242 "23", a unit "° C.", a plus button 243 "+", and an indication for determination 244. A third display row of the setting screen 200*j* includes a scheduled time "1 O'CLOCK", a minus button "−", a display field "23", a unit "° C.", a plus button "+", and an indication for determination 245.

The indication for determination 244 and the indication for determination 245 have different forms.

At the scheduled time corresponding to the first display row, a difference between an upper limit temperature and a lower limit temperature is less than the range threshold value. Meanwhile, at the scheduled time corresponding to the third display row, a difference between an upper limit temperature and a lower limit temperature is equal to or larger than the range threshold value. The indication for determination 244 and the indication for determination 245 have different forms. This allows the user to know whether or not a difference between an upper limit temperature and a lower limit temperature in a display row is equal to or larger than the range threshold value on the basis of an indication for determination.

(Details of Processing for Generating Setting Screen 200*j*)

Details of processing for generating setting screen 200*j* by the control unit 117 are described below.

The display control unit 117*d* of the control unit 117 generates a rectangular outer frame along an outer periphery of the setting screen 200*j*.

The display control unit 117*d* repeats the following processing (a) through (g) for each scheduled time included in the temperature range table 122.

(a) The acquiring unit 117*a* extracts the scheduled time and an upper limit temperature and a lower limit temperature that correspond to the scheduled time from the temperature range table 122.

(b) The acquiring unit 117*a* extracts a preset temperature corresponding to the scheduled time from the air conditioner control information table 123.

(c) The display control unit 117*d* causes a new display row in which the items are displayed to be inserted in a central part of the setting screen 200*i*.

(d) The display control unit 117*d* causes the scheduled time, the minus button, a display field in which the preset temperature is displayed, the unit, and the plus button to be displayed in the display row.

(e) The calculating unit 117*b* calculates a difference between the extracted upper limit temperature and lower limit temperature.

(f) The determining unit 117*c* compares the calculated difference with a range threshold value.

(g) In a case where the difference is less than the range threshold value, the display control unit 117*d* causes an indication for determination indicating that the difference is less than the range threshold value to be displayed in the display row. Meanwhile, in a case where the difference is equal to or larger than the range threshold value, the display control unit 117*d* causes an indication for determination indicating that the difference is equal to or larger than the range threshold value to be displayed in the display row.

After repetition of the processing (a) through (g) is finished, the display control unit 117*d* generates the start button 205 and causes the generated start button 205 to be displayed in a lower part of the setting screen 200*j*.

The display control unit 117*d* supplies the generated setting screen 200*j* to the touch panel 120 via the input/output control unit 118. The setting screen 200*j* is displayed by the touch panel 120.

As described above, each display row includes an indication for determination. A user can know whether or not a difference between an upper limit temperature and a lower limit temperature that correspond to the display row is equal to or larger than a range threshold value by looking at the indication for determination.

Furthermore, the display control unit 117*d* may change part of the setting screen to a background color, a font attribute (character color, size, decoration), or an icon that is different from the other part in a case where a preset temperature within a non-recommended temperature range is input.

Furthermore, the display control unit 117*d* may change a background color, a font attribute (character color, size, decoration), or an icon of the plus button or the minus button in a case where a current preset temperature is a temperature at a boundary at which the temperature is switched to a non-recommended temperature range (or a recommended temperature range) when the plus button or the minus button is pressed.

Furthermore, operation may be restricted, for example, as follows.

The control unit 117 causes the plus button or the minus button to be hidden or displayed in grey in a case where a current preset temperature is a temperature at a boundary at which the temperature is switched from a recommended temperature range to a non-recommended temperature range when the plus button or the minus button is pressed. As a result, the control unit 117 prohibits pressing of the plus button or the minus button.

Figure 23:
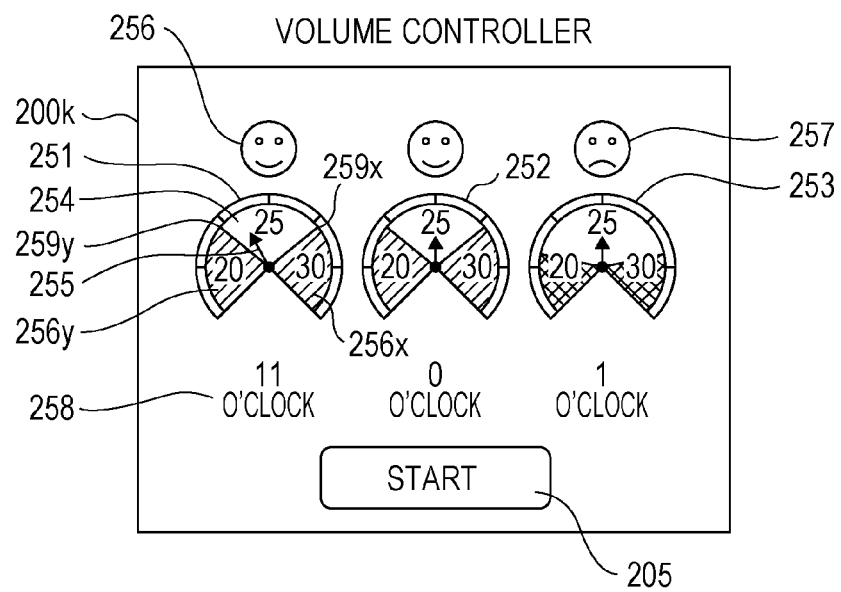
FIG. 23 is a diagram illustrating a setting screen displayed on the mobile terminal in Modification 4.

(3) The mobile terminal 101 of the air conditioner remote control system 10*d* may display a setting screen 200*k* illustrated in FIG. 23.

The display control unit 117*d* causes a fan-like indicator indicating a plurality of candidate temperatures to be displayed on the setting screen 200*k*. The candidate temperatures are displayed along an outer peripheral arc of a display region formed in an arc so as to be displayed at positions depending on distances from one end of the outer peripheral arc. The display region is divided into a recommended temperature part corresponding to recommended temperatures and a non-recommended temperature part corresponding to non-recommended temperatures. An item related to an upper limit temperature and a lower limit temperature is the recommended temperature part or the non-recommended temperature part.

The display control unit 117*d* causes a recommended temperature part in a case where a difference between an upper limit temperature and a lower limit temperature is equal to or larger than a range threshold value to be displayed in a form different from that in a case where the difference is less than the range threshold value. Alternatively, the display control unit 117*d* causes a non-recommended temperature part in a case where the difference is equal to or larger than the range threshold value to be displayed in a form different from that in a case where the difference is less than the range threshold value.

The different form may be a different color, a different decoration, or a combination of different color and different decoration.

More specifically, a plurality of display columns are displayed in a horizontal direction in a central part of the setting screen 200*k*, and a start button 205 is displayed in a lower part of the setting screen 200k. Each display column includes, in a vertical direction, an indication for determination indicating a result of comparison with a range threshold value, a rotary indicator (or a fan-like indicator; also called a volume controller), and a scheduled time.

As illustrated in FIG. 23, a first display column of the setting screen 200k includes an indication for determination 256, a rotary indicator 251, and a scheduled time 258 "11 O'CLOCK". A third display column of the setting screen 200k includes an indication for determination 257, a rotary indicator 253, and a scheduled time "1 O'CLOCK". The indication for determination 256 and the indication for determination 257 have different forms.

The rotary indicator 251 is formed in a fan-like shape and is marked with a plurality of scales indicative of temperatures along an outer peripheral arc of the fan. The plurality of scales correspond to a range of the ambient temperature of the air conditioner 102.

An operation part 255 formed in a needle-like shape is displayed in the rotary indicator 251 so as to be rotatable around the center of the fan. A preset temperature is indicated by a scale that is indicated by the operation part 255.

The rotary indicator 251 is divided into a low temperature region 256y, a recommended temperature region 254, and a high temperature region 256x by an upper limit temperature 259x and a lower limit temperature 259y. The low temperature region 256y is a temperature region lower than the lower limit temperature 259y. The recommended temperature region 254 is a temperature region that is not less than the lower limit temperature 259y and not more than the upper limit temperature 259x. The high temperature region 256x is a temperature region higher than the upper limit temperature 259x. The low temperature region 256y and the high temperature region 256x are sometimes referred to as a non-recommended temperature region.

As illustrated in FIG. 23, at a scheduled time corresponding to the first display column, a difference between an upper limit temperature and a lower limit temperature is less than a range threshold value. Meanwhile, at a scheduled time corresponding to the third display column, a difference between an upper limit temperature and a lower limit temperature is equal to or more than the range threshold value. The indication for determination 256 and the indication for determination 257 have different forms. This allows a user to know whether or not a difference between an upper limit temperature and a lower limit temperature in a display column is equal to or larger than a range threshold value based on an indication for determination.

The control unit 117 causes a non-recommended temperature region (a low temperature region and a high temperature region) in a case where a difference between an upper limit temperature and a lower limit temperature is equal to or larger than a range threshold value to be displayed in a rotary indicator by using a different color or a different decoration from that in a case where the difference is less than the range threshold value.

The control unit 117 may cause a recommended temperature region in a case where a difference between an upper limit temperature and a lower limit temperature is equal to or larger than a range threshold value to be displayed in a rotary indicator by using a different color or a different decoration from that in a case where the difference is less than the range threshold value.

The control unit 117 rotates the operation part 255 in accordance with movement of a user's object for operation that makes contact with the operation part 255. When the object for operation is detached from the touch panel 120, the control unit 117 stops rotation of the operation part 255. This selects, as a preset temperature, a temperature indicated by a scale that is indicated by the operation part 255. The control unit 117 accepts the selected preset temperature.

(Details of Processing for Generating Setting Screen 200k)

Details of processing for generating the setting screen 200k by the control unit 117 are described below.

The display control unit 117d of the control unit 117 generates a rectangular outer frame along an outer periphery of the setting screen 200k.

The display control unit 117d repeats the following processing (a) through (g) for each scheduled time included in the temperature range table 122.

(a) The acquiring unit 117a extracts the scheduled time and an upper limit temperature and a lower limit temperature that correspond to the scheduled time from the temperature range table 122.

(b) The acquiring unit 117a extracts a preset temperature corresponding to the scheduled time from the air conditioner control information table 123.

(c) The display control unit 117d causes a display column in which the items are displayed to be displayed on the right of a previously-displayed display column on the setting screen 200k. In a case where there is no previously-displayed display column, the display column is located at a left end of the setting screen 200k.

(d) The calculating unit 117b calculates a difference between the extracted upper limit temperature and lower limit temperature.

(e) The determining unit 117c compares the calculated difference with a range threshold value.

(f) In a case where the difference is less than the range threshold value, the display control unit 117d causes an indication for determination indicating that the difference is less than the range threshold value to be displayed above the display column. Meanwhile, in a case where the difference is equal to or larger than the range threshold value, the display control unit 117d causes an indication for determination indicating that the difference is equal to or larger than the range threshold value to be displayed above the display column.

(g) The display control unit 117d generates a rotary indicator by using the upper limit temperature, the lower limit temperature, and the preset temperature and causes the generated rotary indicator to be displayed below the indication for determination.

(h) The display control unit 117d causes the scheduled time to be displayed below the rotary indicator.

After repetition of the processing (a) through (h) is finished, the display control unit 117d generates the start button 205 and causes the generated start button 205 to be displayed in a lower part of the setting screen 200k.

The display control unit 117d supplies the generated setting screen 200k to the touch panel 120 via the input/output control unit 118. The setting screen 200k is displayed by the touch panel 120.

As described above, each display column includes an indication for determination. A user can know whether or not a difference between an upper limit temperature and a lower limit temperature that correspond to the display column is equal to or larger than the range threshold value by looking at the indication for determination.

The display control unit 117d may cause a background color, a color of a scale, and a font attribute (character color, size, decoration) of a label in a region of a non-recommended temperature range (or a recommended temperature range) to be different from those in other part of the setting screen 200k.

The display control unit 117d may change part of the setting screen 200k to a background color, a font attribute (character color, size, decoration), or an icon different from other part of the setting screen 200k in a case where a preset temperature within a non-recommended temperature range (or a recommended temperature range) is selected on the setting screen 200k.

The display control unit 117d may draw a mark (a line, an icon, or the like) at a boundary between a recommended temperature range and a non-recommended temperature range on the setting screen 200k.

Furthermore, operation may be restricted, for example, as follows.

In a case where a user rotates the operation part 255 from a recommended temperature range to a non-recommended temperature range, the control unit 117 may control the operation so that the rotation stops at a boundary between the recommended temperature range and the non-recommended temperature range.

The display control unit 117d may be configured not to draw a temperature label (scale value) in a non-recommended temperature range.

Figure 24:
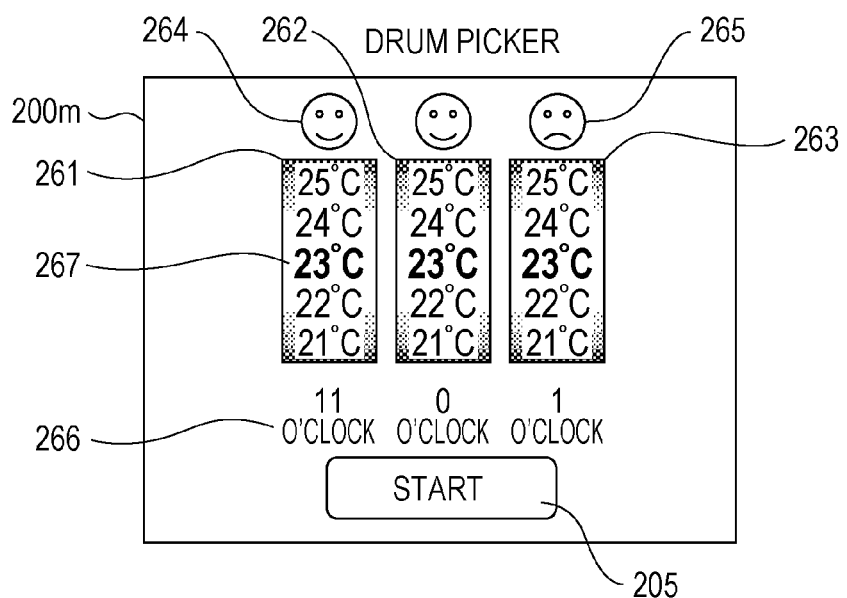
FIG. 24 is a diagram illustrating a setting screen displayed on the mobile terminal in Modification 4.

(4) The mobile terminal 101 of the air conditioner remote control system 10d may display a setting screen 200m illustrated in FIG. 24.

The display control unit 117d arranges a plurality of candidate temperatures in ascending order on an outer peripheral surface of a virtual cylinder rotably provided about a cylinder axis and projects a half of the outer peripheral surface on the setting screen 200m. The outer peripheral surface is divided into a recommended temperature part in which recommended temperatures are arranged and a non-recommended temperature part in which non-recommended temperatures are arranged. An item related to an upper limit temperature and a lower limit temperature is the recommended temperature part or the non-recommended temperature part.

The display control unit 117d causes a recommended temperature part in a case where a difference between an upper limit temperature and a lower limit temperature is equal to or larger than a range threshold value to be displayed in a form different from that in a case where the difference is less than the range threshold value. Alternatively, the display control unit 117d causes a non-recommended temperature in a case where the difference is equal to or larger than the range threshold value to be displayed in a form different from that in a case where the difference is less than the range threshold value.

The different form may be a different color or a different decoration.

More specifically, a plurality of display columns are displayed in a horizontal direction in a central part of the setting screen 200m, and a start button 205 is displayed in a lower part of the setting screen 200m. Each display column includes, in a vertical direction, an indication for determination indicating a result of comparison with a threshold value, a cylinder-type indicator (also called a drum picker or reel), and a scheduled time.

As illustrated in FIG. 24, a first display column of the setting screen 200m includes an indication for determination 264, a cylinder-type indicator 261, and a scheduled time 266 "11 O'CLOCK". A third display column of the setting screen 200m includes an indication for determination 265, a cylinder-type indicator 263, and a scheduled time "1 O'CLOCK".

On the setting screen 200m illustrated in FIG. 24, at a scheduled time corresponding to the first display column, a difference between an upper limit temperature and a lower limit temperature is less than the range threshold value. Meanwhile, at a scheduled time corresponding to the third display column, a difference between an upper limit temperature and a lower limit temperature is equal to or larger than the range threshold value. As illustrated in FIG. 24, the indication for determination 264 and the indication for determination 265 have different forms. This allows a user to know whether or not a difference between an upper limit temperature and a lower limit temperature in a display column is equal to or larger than a range threshold value based on an indication for determination.

Each cylinder-type indicator is an operation part that accepts input by contact of a user's object for operation.

This operation part is a cylinder-type indicator obtained by projecting, on a display surface of the touch panel 120, an outer peripheral surface of a virtual cylinder rotably provided around a cylinder axis virtually provided in parallel with the display surface of the touch panel 120. A plurality of temperatures are arranged along a rotation direction on the outer peripheral surface of the cylinder. These plurality of temperatures correspond to a range of ambient temperature of the air conditioner.

The display control unit 117d causes some of the plurality of temperatures arranged on the outer peripheral surface to be displayed on the setting screen 200m. A combination of the temperatures displayed on the setting screen 200m changes in accordance with rotation of the cylinder.

The control unit 117 accepts selection of a preset temperature by virtually rotating the cylinder in accordance with movement of a user's object for operation that is in contact with the cylinder-type indicator. Specifically, the control unit 117 accepts, as a preset temperature, a temperature displayed at the center among the temperatures displayed on the setting screen 200m.

Specifically, the control unit 117 changes display of the cylinder-type indicator 261 so that the cylinder virtually rotates in accordance with movement of a user's object for operation that is in contact with the cylinder-type indicator 261 which is the operation part. When the object for operation is detached from the touch panel 120, the control unit 117 stops the change of display of the cylinder-type indicator 261 so as to virtually stop rotation of the cylinder. A temperature 267 displayed at the center among a plurality of temperatures displayed in the cylinder-type indicator 261 is selected as a preset temperature, and the selected preset temperature is accepted by the control unit 117.

(Details of Processing for Generating Setting Screen 200m)

Details of processing for generating the setting screen 200m in the control unit 117 are described below.

The display control unit 117d of the control unit 117 generates a rectangular outer frame along an outer periphery of the setting screen 200m.

The display control unit 117d repeats the following processing (a) through (g) for each scheduled time included in the temperature range table 122.

(a) The acquiring unit 117a extracts the scheduled time and an upper limit temperature and a lower limit temperature that correspond to the scheduled time from the temperature range table 122.

(b) The acquiring unit 117a extracts a preset temperature corresponding to the scheduled time from the air conditioner control information table 123.

(c) The display control unit 117d causes a display column in which the items are displayed to be displayed on the right of a previously-displayed display column on the setting screen 200m. In a case where there is no previously-displayed display column, the display column is displayed at a left end of the setting screen 200m.

(d) The calculating unit 117b calculates a difference between the extracted upper limit temperature and lower limit temperature.

(e) The determining unit 117c compares the calculated difference with a range threshold value.

(f) In a case where the difference is less than the range threshold value, the display control unit 117d causes an indication for determination indicating that the difference is less than the range threshold value to be displayed above the display column. Meanwhile, in a case where the difference is equal to or larger than the range threshold value, the display control unit 117d causes an indication for determination indicating that the difference is equal to or larger than the range threshold value to be displayed above the display column.

(g) The calculating unit 117b calculates temperatures that are lower by one degree and two degrees than the extracted preset temperature. Next, the calculating unit 117b calculates temperatures that are higher by one degree and two degrees than the extracted preset temperature. Next, the display control unit 117d causes the temperature that is higher by two degrees, the temperature that is higher by one degree, the preset temperature, the temperature that is lower by one degree, and the temperature that is lower by two degrees to be arranged in this order on an outer peripheral surface of a virtual cylinder in a circumferential direction. Next, the display control unit 117d generates a cylinder-type indicator by projecting the outer peripheral surface on the display surface of the touch panel 120 so that the preset temperature is displayed at the center. Next, the display control unit 117d causes the generated cylinder-type indicator to be displayed below the indication for determination.

(h) The display control unit 117d causes the scheduled time to be displayed below the cylinder-type indicator.

After repetition of the processing (a) through (h) is finished, the display control unit 117d generates the start button 205 and causes the generated start button 205 to be displayed in a lower part of the setting screen 200m.

The display control unit 117d supplies the generated setting screen 200m to the touch panel 120 via the input/output control unit 118. The setting screen 200m is displayed by the touch panel 120.

As described above, each display column includes an indication for determination. A user can know whether or not a difference between an upper limit temperature and a lower limit temperature that correspond to the display column is equal to or larger than a range threshold value by looking at the indication for determination.

The display control unit 117d may cause a background color and a font attribute (character color, size, decoration) of a label in a region of a non-recommended temperature range (or a recommended temperature range) to be different from those in other part of the setting screen 200m.

The display control unit 117d may change part of the setting screen 200m to a background color, a font attribute (character color, size, decoration), or an icon different from other part of the setting screen 200m in a case where a preset temperature within a non-recommended temperature range (or a recommended temperature range) is selected on the setting screen 200m.

The display control unit 117d may draw a mark (a line, an icon, or the like) at a boundary between a recommended temperature range and a non-recommended temperature range on the setting screen 200m.

Furthermore, operation may be restricted, for example, as follows.

In a case where a user performs a scrolling operation from a recommended temperature range to a non-recommended temperature range, the control unit 117 may control the operation so that scrolling stops at a boundary between the recommended temperature range and the non-recommended temperature range.

The display control unit 117d may be configured not to draw a temperature label (temperature indication) in a non-recommended temperature range.

In the above description, a cylinder-type indicator is displayed on the setting screen 200m. However, the type of indicator displayed on the setting screen 200m is not limited to this.

The display control unit 117d may cause a list or a combo box to be displayed on the setting screen 200m instead of the cylinder-type indicator. A plurality of temperatures are displayed in the list or the combo box.

Other Modifications

Figure 25:
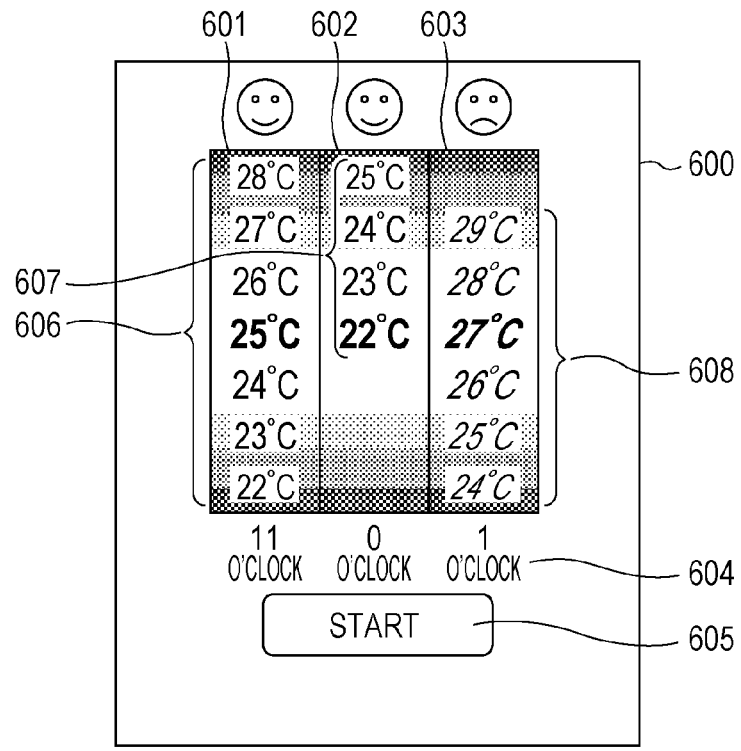
FIG. 25 is a diagram illustrating a setting screen displayed on the mobile terminal in Modification 4.

As illustrated in FIG. 25, the control unit 117 may generate and display a setting screen 600.

The display control unit 117d may use a different character style as a different form.

More specifically, a plurality of display columns are displayed in a horizontal direction in a central part of the setting screen 600 and a start button 205 is displayed in a lower part of the setting screen 600, as in the setting screen 200m. Each display column includes, in a vertical direction, an indication for determination, a cylinder-type indicator, and a scheduled time.

Each cylinder-type indicator is an operation part as in the setting screen 200m. Each cylinder-type indicator is obtained by projecting an outer peripheral surface of a cylinder on a display surface. A plurality of candidate temperatures are displayed along a rotation direction on the outer peripheral surface of the cylinder.

On the setting screen 600, a relationship between a scheduled time and an upper limit temperature and a lower limit temperature is the same as that shown in the temperature range table 122 of FIG. 3.

A first difference from the setting screen 200m is that temperatures within a recommended temperature range that is not more than an upper limit temperature and not less than a lower limit temperature at a scheduled time are arranged on an outer peripheral surface of a cylinder of each cylinder-type indicator of the setting screen 600. Temperatures higher than the upper limit temperature and temperatures lower than the lower limit temperature are not arranged on the outer peripheral surface.

This allows a user to know that temperatures displayed in each cylinder-type indicator are within a recommended temperature range between an upper limit temperature and a lower limit temperature at a corresponding scheduled time.

A second difference from the setting screen 200m is that a character style of the temperatures displayed on the outer peripheral surface of the cylinder of each cylinder-type indicator in a case where a difference between an upper limit temperature and a lower limit temperature at a corresponding scheduled time is equal to or larger than a range threshold value is different from that in a case where the difference between the upper limit temperature and the lower limit temperature at the corresponding scheduled time is less than the range threshold value.

All of temperatures 606 and all of temperatures 607 are displayed in Gothic font in cylinder-type indicators 601 and 602, respectively. Meanwhile, all of temperatures 608 are displayed in italics in a cylinder-type indicator 603.

This allows a user to distinguish whether or not a difference between an upper limit temperature and a lower limit temperature at a scheduled time corresponding to a cylinder-type indicator is equal to or larger than a range threshold value based on a character style of temperatures displayed in the cylinder-type indicator.

Note that whether or not a difference between an upper limit temperature and a lower limit temperature is equal to or larger than the range threshold value may be distinguished based on not a character style but a color or a decoration of a cylinder-type indicator. For example, in a case where a difference between an upper limit temperature and a lower limit temperature is equal to or larger than the range threshold value, a corresponding cylinder-type indicator may be displayed in red. In a case where the difference between the upper limit temperature and the lower limit temperature is less than the range threshold value, the cylinder-type indicator is displayed in green.

Alternatively, whether or not a difference between an upper limit temperature and a lower limit temperature is equal to or larger than the range threshold value may be distinguished based on not a character style but the width, length, or a combination of width and length (size) of a cylinder-type indicator. For example, the control unit 117 may make the width of a cylinder-type indicator smaller than a width threshold value in a case where a difference between an upper limit temperature and a lower limit temperature is equal to or larger than a range threshold value. The control unit 117 makes the width of a cylinder-type indicator larger than the width threshold value in a case where a difference between an upper limit temperature and a lower limit temperature is less than the range threshold value.

As described above, the control unit 117 may cause a non-recommended temperature region (in other words, a low temperature region and a high temperature region) in a case where a difference between an upper limit temperature and a lower limit temperature is equal to or larger than the range threshold value to be displayed in a cylinder-type indicator by using a color, size, decoration, or character style different from that in a case where the difference is less than the range threshold value.

Alternatively, the control unit 117 may cause a recommended temperature region in a case where the difference is equal to or larger than the range threshold value to be displayed in a cylinder-type indicator by using a color, size, decoration, or character style different from that in a case where the difference is less than the range threshold value.

1.10 Modification 5

An air conditioner remote control system 10e, which is Modification 5 of the air conditioner remote control system 10, is described below.

The air conditioner remote control system 10e has a configuration similar to the air conditioner remote control system 10. Differences from the air conditioner remote control system 10 are mainly described below.

The air conditioner remote control system 10e is different from the air conditioner remote control system 10 in terms of a setting screen displayed on a touch panel 120 of a mobile terminal 101.

Figure 26:
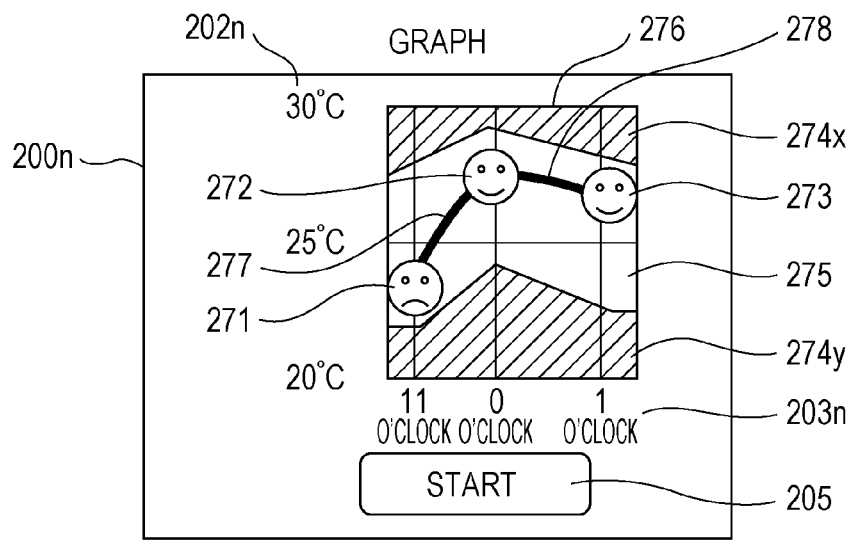
FIG. 26 is a diagram illustrating a setting screen displayed on a mobile terminal in Modification 5.

The mobile terminal 101 of the air conditioner remote control system 10e displays a setting screen 200n illustrated in FIG. 26.

The mobile terminal 101 displays the setting screen 200n that accepts selection of a single preset temperature from a plurality of candidate temperatures for each of a plurality of time zones in order to operate an air conditioner so that an ambient temperature becomes a target temperature. A calculating unit 117b calculates a difference between a first preset temperature selected in a first time zone and a second preset temperature selected in a second time zone adjacent to the first time zone among the plurality of time zones. A determining unit 117c determines whether or not the calculated difference is equal to or larger than an adjacency threshold value. In a case where the difference is equal to or larger than the adjacency threshold value, a display control unit 117d causes an item related to the first preset temperature and/or the second preset temperature to be displayed on the setting screen 200n in a form different from that in a case where the difference is less than the adjacency threshold value. The mobile terminal 101 transmits the preset temperatures selected by the user to an air conditioner 102 as target temperatures.

Furthermore, the display control unit 117d displays time zones in a first axis direction, candidate temperatures in a second axis direction orthogonal to the first axis, and a rectangular graph region on the setting screen 200n. In the graph region, the display control unit 117d causes a first operation part to be displayed at a point at which a position on the first axis indicated by the first time zone and a position on the second axis indicated by the first preset temperature cross each other. The display control unit 117d causes a second operation part to be displayed at a point at which a position on the first axis indicated by the second time zone and a position on the second axis indicated by the second preset temperature cross each other. The display control unit 117d causes an indication for determination indicating whether or not the difference is equal to or larger than the adjacency threshold value to be displayed in association with the first operation part and the second operation part as an item related to the first preset temperature and/or the second preset temperature. In a case where the difference is equal to or larger than the adjacency threshold value, the display control unit 117d causes the indication for determination to be displayed in a form different from that in a case where the difference is less than the adjacency threshold value.

The different form may be a different color, a different size, a different decoration, or a different character style.

More specifically, a rectangular graph region 276 is displayed in a central part of the setting screen 200n. A horizontal axis 203n (the first axis) is displayed below the graph region 276, and a vertical axis 202n (the second axis) is displayed on the left of the graph region 276. A start button 205 is displayed below the horizontal axis 203n.

The horizontal axis 203n represents a change of time. Scale values indicative of a plurality of scheduled times are displayed in a horizontal direction along the horizontal axis 203n. On the setting screen 200m, "11 O'CLOCK", "0 O'CLOCK", and "1 O'CLOCK" are displayed from left to right as scheduled times. Positions corresponding to "11 O'CLOCK", "0 O'CLOCK", and "1 O'CLOCK" indicate that scheduled times are 11 o'clock, 0 o'clock, and 1 o'clock, respectively.

The vertical axis 202n represents a changes of temperature. Scale values indicative of a plurality of temperatures are displayed in a vertical direction along the vertical axis 202n. On the setting screen 200a, "30° C.", "25° C.", and "20° C." are displayed from top to bottom. Positions corresponding to "30° C.", "25° C.", and "20° C." indicate that temperatures are 30° C., 25° C., and 20° C., respectively.

The graph region 276 is divided into a high temperature region 274x, a recommended temperature region 275, and a low temperature region 274y. The high temperature region 274x is a temperature region that is higher than an upper limit temperature at each scheduled time. The recommended temperature region 275 is a temperature region that is not more than the upper limit temperature and not less than the lower limit temperature at each scheduled time. The low temperature region 274y is a temperature region that is lower than the lower limit temperature at each scheduled time.

In the graph region 276, a temperature indication (operation part) is displayed at a point at which a position on the first axis indicated by each scheduled time and a position on the second axis indicated by a preset temperature corresponding to the scheduled time cross each other. As a result, a plurality of temperature indications 271, 272, and 273 are displayed in the graph region 276.

Each temperature indication includes an indication for determination. The indication for determination indicates whether or not a difference between a preset temperature indicated by a temperature indication including the indication for determination and a preset temperature indicated by an adjacent temperature indication is equal to or larger than the adjacency threshold value.

The different form of the indication for determination may be a different color, a different size, a different decoration, a different character, or a different character style.

Specifically, the indication for determination may be displayed in a first color (e.g., red) or a second color (e.g., green) depending on whether or not the difference between the preset temperatures is equal to or larger than the adjacency threshold value. Alternatively, the size of the indication for determination may be set to a first size (e.g., 16-dot long and 16-dot wide) or a second size (e.g., 32-dot long and 32-dot wide). Alternatively, the indication for determination may be decorated with a first decoration (e.g., an image of a smiling face) or a second decoration (e.g., an image of an angry face). Alternatively, the indication for determination may be given first characters (e.g., "equal to or larger than threshold value") or second characters (e.g., "less than threshold value"). Alternatively, the word "determination" may be, for example, displayed in the indication for determination and the character style of this word may be a first character style (e.g., Gothic font) or a second character style (e.g., italics).

On the setting screen 200n illustrated in FIG. 26, a difference between two preset temperatures indicated by the temperature indication 271 and the temperature indication 272 is equal to or larger than the adjacency threshold value. Meanwhile, a difference between two preset temperatures indicated by the temperature indication 272 and the temperature indication 273 is less than the adjacency threshold value. As illustrated in FIG. 26, the indication for determination included in the temperature indication 271 and the indication for determination included in the temperature indication 272 have different forms. This allows a user to know whether or not a difference between two preset temperatures indicated by adjacent two temperature indications is equal to or larger than the adjacency threshold value based on an indication for determination.

In the graph region 276, a line 277 connecting the temperature indication 271 and the temperature indication 272 and a line 278 connecting the temperature indication 272 and the temperature indication 273 are displayed.

The start button 205 is displayed in a lower part of the setting screen 200n.

Each temperature indication is an operation part that accepts input by contact of a user's object for operation.

The control unit 117 moves the temperature indication (operation part) upward or downward, i.e., in a direction of the vertical axis 202n (the second axis) in accordance with movement of the user's object for operation that is in contact with the temperature indication. When the object for operation is detached from the touch panel 120, the control unit 117 stops movement of the temperature indication. A preset temperature is selected based on a position on the vertical axis indicated by the temperature indication, and the selected preset temperature is accepted by the control unit 117.

The temperature indication may be sometimes called a slider since the temperature indication moves in accordance with the operation of moving an object for operation while keeping contact with the temperature indication.

(Details of Processing for Generating Setting Screen 200n)

Details of processing for generating the setting screen 200n in the control unit 117 are described below with reference to the flow chart illustrated in FIG. 27.

The display control unit 117d of the control unit 117 generates a rectangular outer frame along an outer periphery of the setting screen 200n (Step S181).

The display control unit 117d generates scale values of the vertical axis 202n and causes the generated scale values to be displayed in a left-side part of the setting screen 200n (Step S182).

The display control unit 117d repeats Steps S184 through S192 for each scheduled time included in a temperature range table 122 (Steps S183 through S193).

An acquiring unit 117a extracts a scheduled time from the temperature range table 122 (Step S184).

The display control unit 117d generates scale values of the horizontal axis 203n and causes the generated scales values to be displayed in a lower part of the setting screen 200n (Step S185).

The acquiring unit 117a extracts an upper limit temperature and a lower limit temperature that correspond to the scheduled time from the temperature range table 122 (Step S186).

The display control unit 117d generates a point indicative of the upper limit temperature and a point indicative of the lower limit temperature at positions corresponding to the scheduled time in the graph region 276 of the setting screen 200n (Step S187).

The acquiring unit 117a extracts a preset temperature (referred to as a first preset temperature) corresponding to the scheduled time from an air conditioner control information table 123 (Step S188).

The acquiring unit 117a extracts a preset temperature (referred to as a second preset temperature) corresponding to an adjacent scheduled time from the air conditioner control information table 123. The calculating unit 117b calculates a difference between the extracted first preset temperature and the extracted second preset temperature (Step S189).

The determining unit 117c compares the calculated difference with an adjacency threshold value (Step S190).

In a case where the difference is less than the adjacency threshold value ("LESS THAN" in Step S190), the display control unit 117d generates a slider (temperature indication) of a first pattern at the position of the preset temperature. That is, a temperature indication including an indication for determination indicating that the difference is less than the adjacency threshold value is displayed (Step S191). Meanwhile, in a case where the difference is equal to or larger than the adjacency threshold value ("EQUAL TO OR LARGER THAN" in Step S190), the display control unit 117d generates a slider of a second pattern at the position of the preset temperature. That is, a temperature indication including an indication for determination indicating that the difference is equal to or larger than the adjacency threshold value is displayed (Step S192).

After repetition of Steps S184 through S192 is finished, the display control unit 117d connects a plurality of points indicative of a plurality of upper limit temperatures by using lines. Next, the display control unit 117d connects a plurality of points indicative of a plurality of lower limit temperatures by using lines (Step S194).

The display control unit 117d hatches the high temperature region 274x and the low temperature region 274y in the graph region 276 (Step S195).

The display control unit 117d generates and displays a line connecting adjacent two temperature indications (sliders) in the graph region 276 (Step S196).

The display control unit 117d generates the start button 205 and causes the generated start button 205 to be displayed in a lower part of the setting screen 200m (Step S197).

The display control unit 117d supplies the generated setting screen 200n to the touch panel 120 via an input/output control unit 118. The setting screen 200n is displayed by the touch panel 120.

As described above, each temperature display includes an indication for determination. A user can know whether or not a difference between two preset temperatures corresponding to adjacent two scheduled times is equal to or larger than an adjacency threshold value by looking at the indication for determination.

That is, a user can know whether or not a difference between a first preset temperature and a second preset temperature is equal to or larger than an adjacency threshold value based on a display form of an item related to the first preset temperature and the second preset temperature in adjacent time zones. In a case where the difference is equal to or larger than the adjacency threshold value, it is highly likely that the ambient temperature of the air conditioner rapidly changes. In such a case, a user can be warned to update the preset temperature.

The following modifications are also possible.

(i) The display control unit 117d may change a color and a font attribute (color, size, decoration) of a character label of a vertical axis in the non-recommended temperature region (or the recommended temperature region) on the setting screen 200n.

(ii) The display control unit 117d may change part of the setting screen 200n to a background color, a font attribute (character color, size, decoration), or an icon different from other part of the setting screen 200n in a case where a preset temperature within the non-recommended temperature region (or the recommended temperature region) is selected on the setting screen 200n.

(iii) The display control unit 117d may cause a background color of the non-recommended temperature region (or the recommended temperature region) in the graph to be different from that in other part of the setting screen 200n.

(iv) The display control unit 117d may draw a mark (a line, an icon, or the like) at a boundary between the recommended temperature region and the non-recommended temperature region on the setting screen 200n.

(v) An operation may be restricted, for example, as follows.

In a case where a user slides an operation part from the recommended temperature range to the non-recommended temperature range, the control unit 117 may stop sliding of the operation part at the boundary between the recommended temperature range and the non-recommended temperature range.

Figure 27:
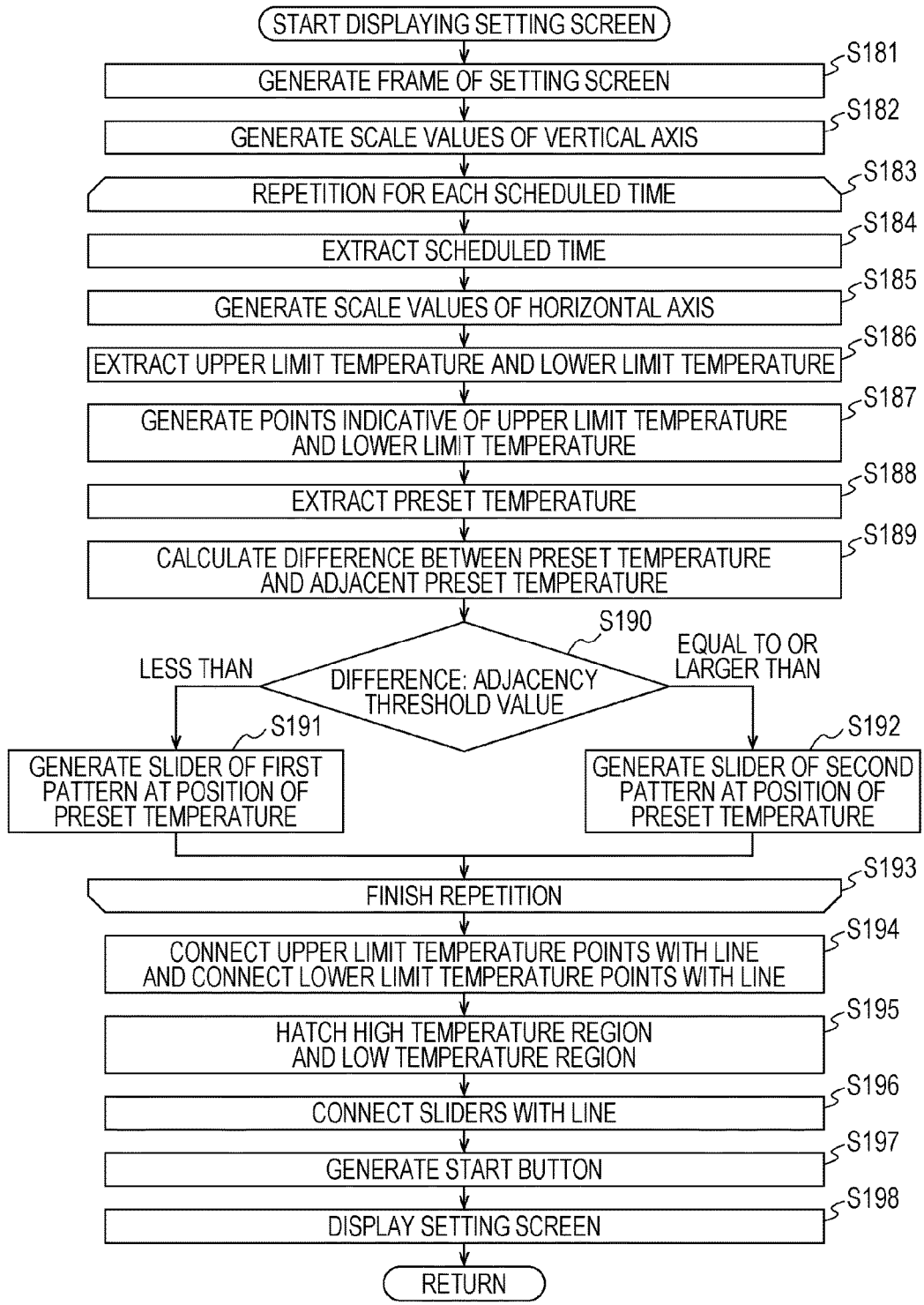
FIG. 27 is a flow chart illustrating operation for displaying a setting screen on the mobile terminal in Modification 5.

(vi) In the flow chart illustrated in FIG. 27, a difference between a preset temperature and a preset temperature at an adjacent scheduled time is calculated, the calculated difference is compared with the adjacency threshold value, and an indication for determination is generated and displayed. This procedure is repeated for each preset temperature. However, the method is not limited to this.

The following method may be employed.

The control unit 117 extracts all preset temperatures from the air conditioner control information table 123. Next, all combinations of two preset temperatures in adjacent time zones are extracted from among all the extracted preset temperatures. A difference between two preset temperatures is calculated for all of the combinations, and it is determined whether or not the calculated difference is equal to or larger than an adjacency threshold value by comparing the calculated difference with the adjacency threshold value. An indication for determination is generated for each combination, and the generated indication for determination is displayed.

(vii) On the setting screen 200n illustrated in FIG. 26, the indication for determination in the temperature indication 271 and the indication for determination in the temperature indication 272 are different from each other. However, the present modification is not limited to this.

In all of the temperature indications, "COOL", "HEAT", "OFF", or the like indicative of an operation mode is displayed. Furthermore, an indication for determination indicative of a relationship between the temperature indication 271 and the temperature indication 272 is displayed on a line connecting the temperature indication 271 and the temperature indication 272.

The indication for determination indicative of the relationship between the temperature indication 271 and the temperature indication 272 indicates whether or not a difference between a preset temperature indicated by the temperature indication 271 and a preset temperature indicated by the temperature indication 272 is equal to or larger than a threshold value.

(viii) The following is also possible.

(a) The control unit 117 may accept user's selection of an updated temperature that should replace the first preset temperature. The calculating unit 117b calculates a difference between the updated temperature and the second preset temperature. The determining unit 117c determines whether or not the calculated difference is equal to or larger than the adjacency threshold value. In a case where the difference is equal to or larger than the adjacency threshold value, the control unit 117 handles the selected updated temperature in a different manner from a case where the difference is less than the adjacency threshold value.

(b) The control unit 117 may abandon the selected updated temperature in a case where the difference is equal to or larger than the adjacency threshold value. Meanwhile, the control unit 117 replaces the first preset temperature with the updated temperature in a case where the difference is less than the adjacency threshold value.

(c) In a case where the difference is equal to or larger than the adjacency threshold value, the control unit 117 may change the selected updated temperature so that the difference becomes less than the adjacency threshold value.

(d) The display control unit 117d may cause an operation part for user's selection of an updated temperature to be displayed on the setting screen 200n. The control unit 117 accepts selection of an updated temperature by moving the operation part in accordance with the user's operation of the operation part. In a case where the difference becomes equal to or larger than the adjacency threshold value as a result of movement of the operation part, the display control unit 117d moves the operation part to a range in which the difference is less than the adjacency threshold value.

(e) In a case where the difference is equal to or larger than the adjacency threshold value, the control unit 117 may abandon the selected updated temperature and change the second preset temperature in the second time zone so that the difference becomes less than the adjacency threshold value.

(f) The acquiring unit 117a may further acquire an upper limit temperature and a lower limit temperature of a target temperature in the first time zone in the air conditioner 102. The determining unit 117c determines whether or not the updated temperature selected by the user is within a range between the upper limit temperature and the lower limit temperature. In a case where the updated temperature is not within the range, the control unit 117 abandons the updated temperature. Meanwhile, in a case where the updated temperature is within the range, the control unit 117 replaces the first preset temperature with the updated temperature.

(ix) The following is also possible.

(a) In a case where it is expected that the first preset temperature is to be updated and an updated temperature that should replace the first preset temperature is selected by a user, the calculating unit 117b calculates a difference between the updated temperature and the second preset temperature. The determining unit 117c determines whether or not the difference between the updated temperature and the second preset temperature is equal to or larger than the adjacency threshold value. In a case where the difference is equal to or larger than the adjacency threshold value, the display control unit 117d performs selection of the updated temperature by a method different from that in a case where the difference is less than the threshold value.

(b) The control unit 117 may restrict selection of the updated temperature in a case where a difference between the updated temperature and the second preset temperature is equal to or larger than the adjacency threshold value.

(c) The display control unit 117d may cause a plus button for setting an updated temperature by adding one degree to the first preset temperature which is a target of update in response to user's operation and a minus button for setting an updated temperature by subtracting one degree from the first preset temperature which is a target of update in response to user's operation to be displayed in each time zone on the setting screen 200n.

The control unit 117 restricts operation of the plus button or the minus button in a case where the difference becomes equal to or larger than the adjacency threshold value as a result of operation of the plus button or the minus button.

(d) The display control unit 117d may cause an operation part to be operated by a user for selection of an updated temperature to be displayed on the setting screen 200n. Selection of the updated temperature is accepted by moving the operation part in accordance with user's operation of the operation part.

The control unit 117 restricts movement operation of the operation part in a case where the difference becomes equal to or larger than the adjacency threshold value as a result of movement of the operation part.

(e) The display control unit 117d may cause a plurality of candidate temperatures to be displayed on the setting screen 200n. In a case where the difference becomes equal to or larger than the adjacency threshold value as a result of selection of an updated temperature that is expected to be selected from among the candidate temperatures, the display control unit 117d hides this updated temperature.

The control unit 117 accepts user's selection of an updated temperature from among the displayed candidate temperatures. The control unit 117 restricts selection of an updated temperature from among hidden candidate temperatures.

(f) The acquiring unit 117a may acquire an upper limit temperature and a lower limit temperature of a target temperature in a first time zone in the air conditioner 102. The determining unit 117c determines whether or not an updated temperature that is expected to be selected is within a range between the upper limit temperature and the lower limit temperature. The control unit 117 restricts selection of the updated temperature in a case where the updated temperature is within the range.

(x) The following is also possible.

In a case where a difference between the first preset temperature and the second preset temperature is equal to or larger than the range threshold value, the control unit 117 may warn a user by displaying information notifying the user of this on the setting screen 200n and by emitting a warning sound or vibrating the mobile terminal 101.

1.11 Modification 6

An air conditioner remote control system 10f, which is Modification 6 of the air conditioner remote control system 10, is described below.

The air conditioner remote control system 10f has a configuration similar to the air conditioner remote control system 10. Differences from the air conditioner remote control system 10 are mainly described below.

A mobile terminal 101 of the air conditioner remote control system 10f may accept user's input of an upper limit temperature or a lower limit temperature as follows.

Figure 28:
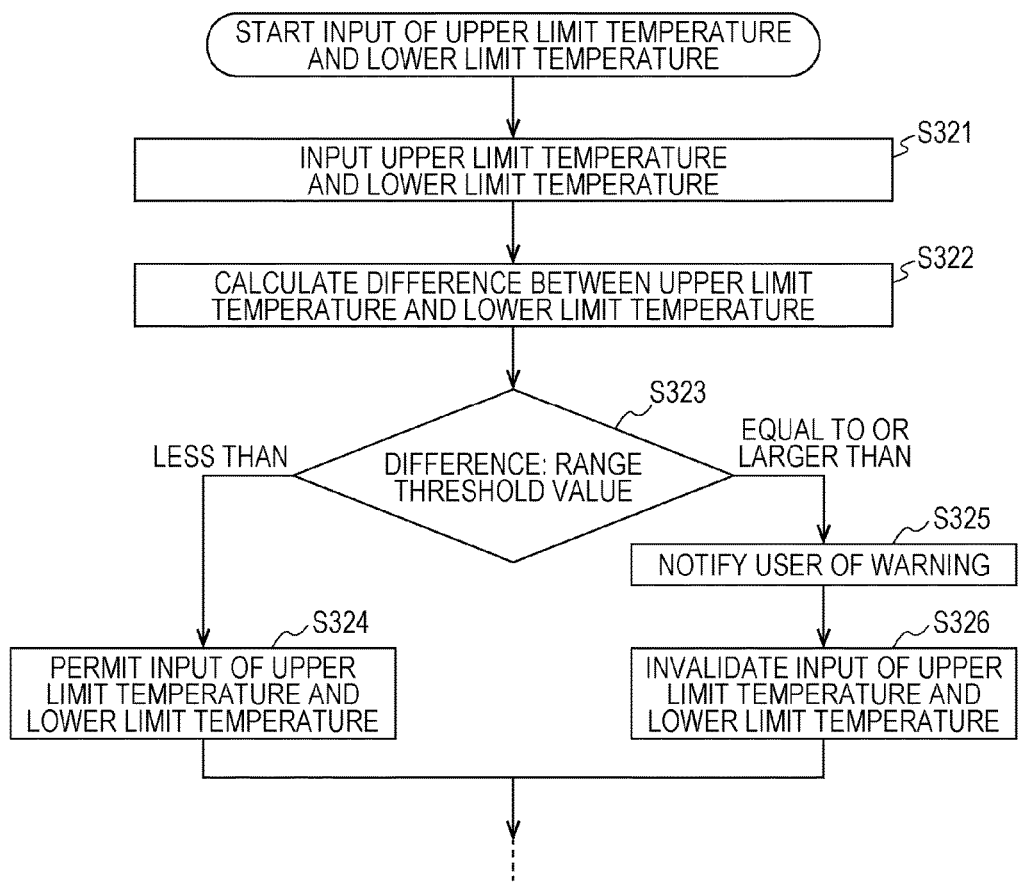
FIG. 28 is a flow chart illustrating operation for inputting an upper limit temperature and a lower limit temperature to a mobile terminal in Modification 6.

The input operation of an upper limit temperature or a lower limit temperature in the mobile terminal 101 is described below with reference to FIG. 28.

A touch panel 120 accepts user's input of an upper limit temperature, a lower limit temperature, or a combination of upper limit temperature and lower limit temperature at each scheduled time. The touch panel 120 supplies the input upper limit temperature, lower limit temperature, or combination of upper limit temperature and lower limit temperature to a control unit 117 via an input/output control unit 118 together with the scheduled time. An acquiring unit 117a of the control unit 117 receives the upper limit temperature, lower limit temperature, or combination of upper limit temperature and lower limit temperature together with the scheduled time (Step S321).

In a case where the acquiring unit 117a receives the upper limit temperature, the acquiring unit 117a extracts a lower limit temperature corresponding to the received scheduled time from a temperature range table 122. Next, a calculating unit 117b calculates a difference between the received upper limit temperature and the extracted lower limit temperature (Step S322).

In a case where the acquiring unit 117a receives the lower limit temperature, the acquiring unit 117a extracts an upper limit temperature corresponding to the received scheduled time from the temperature range table 122. Next, the calculating unit 117b calculates a difference between the extracted upper limit temperature and the received lower limit temperature (Step S322).

In a case where the acquiring unit 117a receives the combination of upper limit temperature and lower limit temperature, the calculating unit 117b calculates a difference between the received upper limit temperature and lower limit temperature (Step S322).

Next, the determining unit 117c compares the difference with a range threshold value (Step S323).

In a case where the difference is less than the range threshold value ("LESS THAN" in Step S323), the control unit 117 permits the input of the upper limit temperature, lower limit temperature, or combination of upper limit temperature and lower limit temperature. In this case, the control unit 117 overwrites part of the temperature range table 122 that corresponds to the scheduled time with the received upper limit temperature, lower limit temperature, or combination of upper limit temperature and lower limit temperature (Step S324).

In a case where the difference is equal to or larger than the range threshold value ("EQUAL TO OR LARGER THAN" in Step S323), the control unit 117 generates a message indicating that the input of the upper limit temperature, lower limit temperature, or combination of upper limit temperature and lower limit temperature is invalid. Next, the control unit 117 supplies the message to the touch panel 120 via the input/output control unit 118. The touch panel 120 displays the message as warning for the user (Step S325).

The control unit 117 may control an audio control unit 114 and a speaker 115 to emit a beep sound as warning for the user instead of the message. Alternatively, the control unit 117 may control a vibrator 124 to vibrate as warning for the user instead of the message.

Next, the control unit 117 invalidates input of the received upper limit temperature, lower limit temperature, or combination of upper limit temperature and lower limit temperature. That is, the control unit 117 abandons the received upper limit temperature, lower limit temperature, or combination of upper limit temperature and lower limit temperature (Step S326).

In this way, input of an upper limit temperature, a lower limit temperature, or a combination of upper limit temperature and lower limit temperature which causes the difference to be equal to or larger than the range threshold value is prohibited.

1.11 Modification 7

An air conditioner remote control system 10g, which is Modification 7 of the air conditioner remote control system 10e according to Modification 5, is described below.

The air conditioner remote control system 10g has a configuration similar to the air conditioner remote control system 10e. Differences from the air conditioner remote control system 10e are mainly described below.

Operation of a mobile terminal 101 of the air conditioner remote control system 10e performed in a case where the mobile terminal 101 receives user's input of a new preset temperature is described below with reference to the flow chart illustrated in FIG. 29.

A touch panel 120 accepts user's input of a new preset temperature (referred to as a first preset temperature) at one scheduled time (referred to as a first scheduled time) (Step S340).

Next, an acquiring unit 117a of a control unit 117 extracts a preset temperature (second preset temperature) at a second scheduled time adjacent to the first scheduled time from an air conditioner control information table 123. Next, a calculating unit 117b calculates a difference between the first preset temperature and the second preset temperature (Step S341).

Next, a determining unit 117c compares the difference with an adjacency threshold value (Step S342).

In a case where the difference is less than the adjacency threshold value ("LESS THAN" in Step S342), the control unit 117 permits the input of the first preset temperature at the first scheduled time. In this case, the control unit 117 overwrites a preset temperature corresponding to the first scheduled time in the air conditioner control information table 123 with the first preset temperature (Step S343).

In a case where the difference is equal to or larger than the adjacency threshold value ("EQUAL TO OR LARGER THAN" in Step S342), the control unit 117 generates a message indicating that the input of the first preset temperature is invalid. Next, the control unit 117 supplies the message to the touch panel 120 via an input/output control unit 118. The touch panel 120 displays the message as warning for the user (Step S344).

The control unit 117 may control an audio control unit 114 and a speaker 115 to emit a beep sound as warning for the user instead of the message. Alternatively, the control unit 117 may control a vibrator 124 to vibrate as warning for the user instead of the message.

Next, the control unit 117 invalidates the input of the accepted first preset temperature. That is, the control unit 117 abandons the accepted first preset temperature (Step S345).

In this way, input of a preset temperature whose difference from a preset temperature at an adjacent scheduled time is equal to or larger than the adjacency threshold value is prohibited.

Note that the following is also possible.

Another operation of the mobile terminal 101 of the air conditioner remote control system 10e performed in a case where the mobile terminal 101 accepts user's input of a new preset temperature is described below with reference to the flow chart illustrated in FIG. 30. Differences from FIG. 29 are mainly described below.

Figure 29:
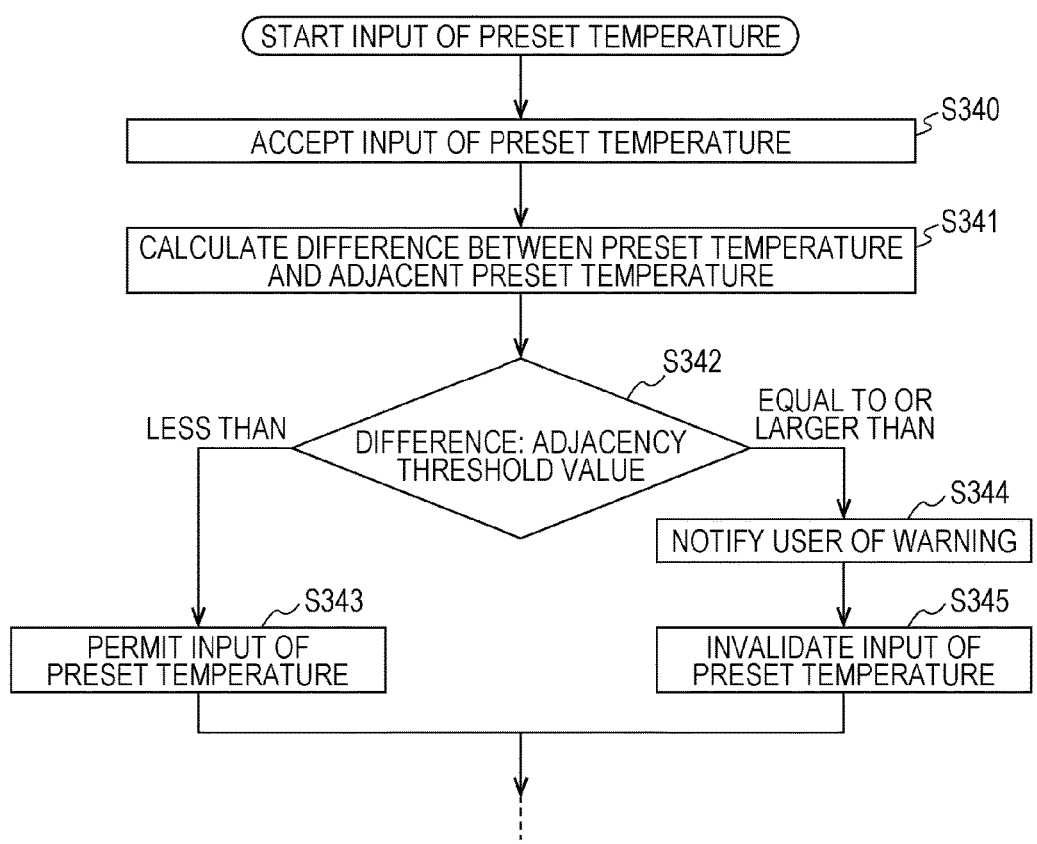
FIG. 29 is a flow chart illustrating operation for inputting a preset temperature to a mobile terminal in Modification 7.
Figure 30:
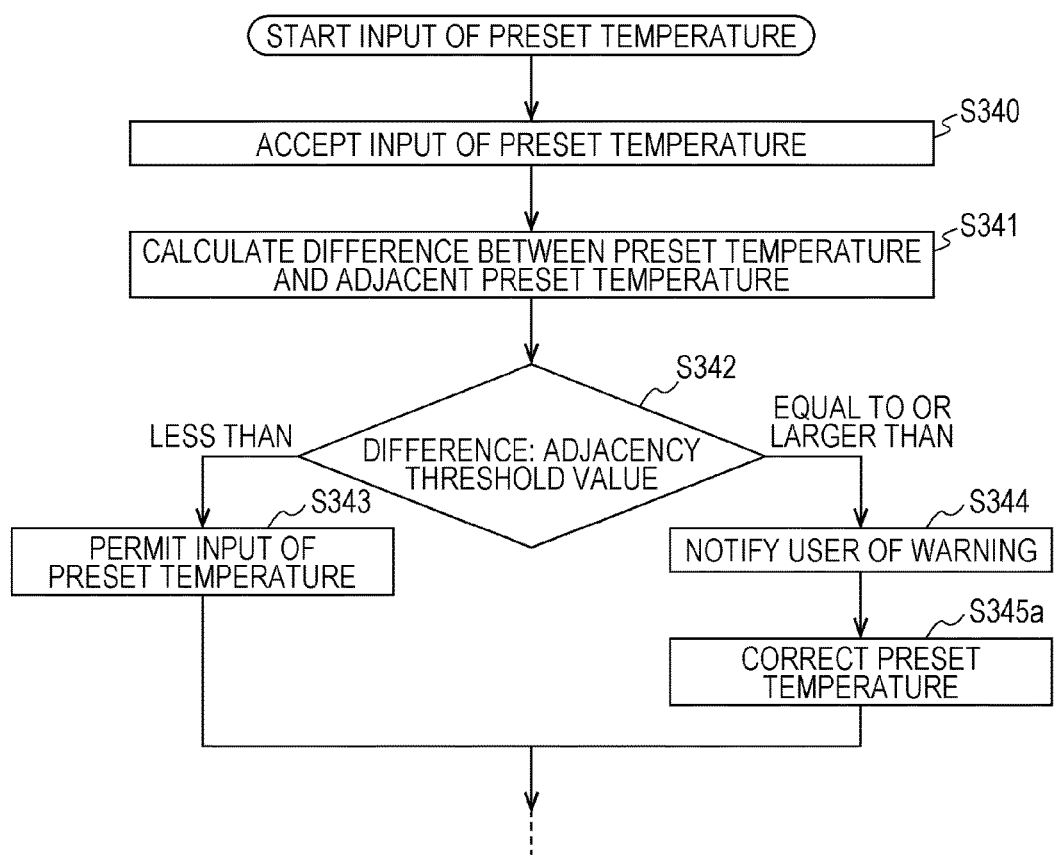
FIG. 30 is a flow chart illustrating operation for inputting a preset temperature to the mobile terminal in Modification 7.

Steps S340 through S344 in FIG. 30 are identical to Steps S340 through S344 in FIG. 29.

In Step S345a in FIG. 30 that replaces Step S345 in FIG. 29, the control unit 117 corrects the first preset temperature so that the difference between the first preset temperature and the second preset temperature becomes less than the adjacency threshold value (Step S345a).

Specifically, the control unit 117 selects a maximum first preset temperature that satisfies:

corrected first preset temperature<threshold value+ second preset temperature

In this way, even in a case where a preset temperature whose difference from a preset temperature at an adjacent scheduled time is equal to or larger than the adjacency threshold value is input, the preset temperature can be adjusted so that the difference from the preset temperature at the adjacent scheduled time becomes less than the threshold value.

2. Embodiment 2

An air conditioner remote control system 10h according to Embodiment 2 of the present disclosure is described below.

The air conditioner remote control system 10h has a configuration similar to the air conditioner remote control system 10. Differences from the air conditioner remote control system 10 are mainly described below.

Figure 31:
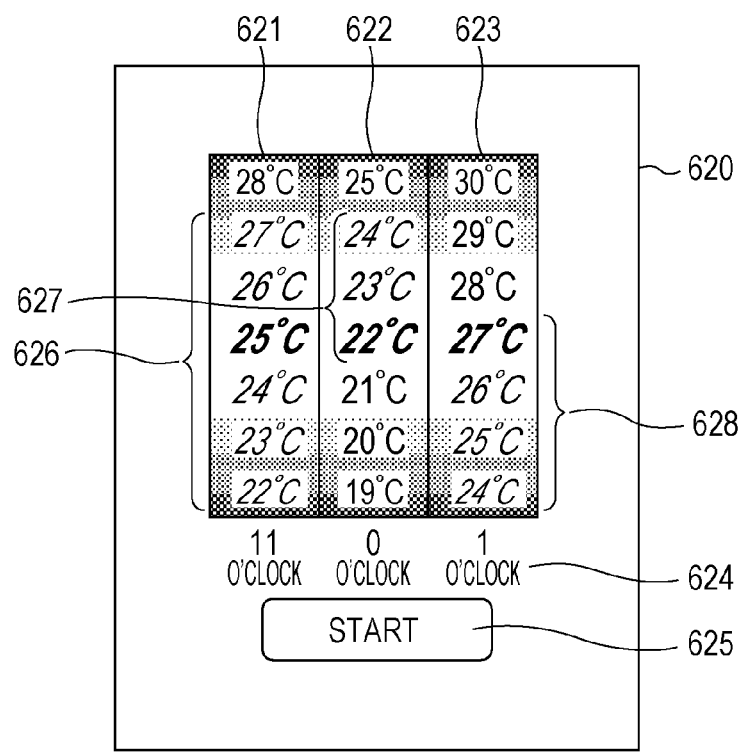
FIG. 31 illustrates a setting screen displayed on a mobile terminal in Embodiment 2.

A mobile terminal 101 of the air conditioner remote control system 10h may display, for example, a setting screen 620 illustrated in FIG. 31.

The setting screen 620 uses a cylinder-type indicator as in the setting screen 600 illustrated in FIG. 25. The setting screen 620 includes cylinder-type indicators 621, 622, and 623, a horizontal axis 624, and a start button 205.

In the cylinder-type indicators 621, 622, and 623, recommended temperature ranges 626, 627, and 608 each of which is not more than an upper limit temperature and not less than a lower limit temperature are displayed in italics. Meanwhile, temperatures in a high temperature range that is higher than the upper limit temperature and temperatures in a low temperature range that is lower than the lower limit temperature (temperatures in a non-recommended temperature range) are displayed in Gothic font.

In a case where a preset temperature is set for each scheduled time in the mobile terminal 101 of the air conditioner remote control system 10h, an upper limit temperature and a lower limit temperature are determined by the following calculating formulas:

upper limit temperature=MIN(preset temperatures at respective scheduled times)+5    formula 5 lower limit temperature=MAX(preset temperatures at respective scheduled times)−5    formula 6

Operation of the mobile terminal 101 of the air conditioner remote control system 10h performed in a case where a new preset temperature is input by a user is described below with reference to the flow chart illustrated in FIG. 32.

Figure 32:
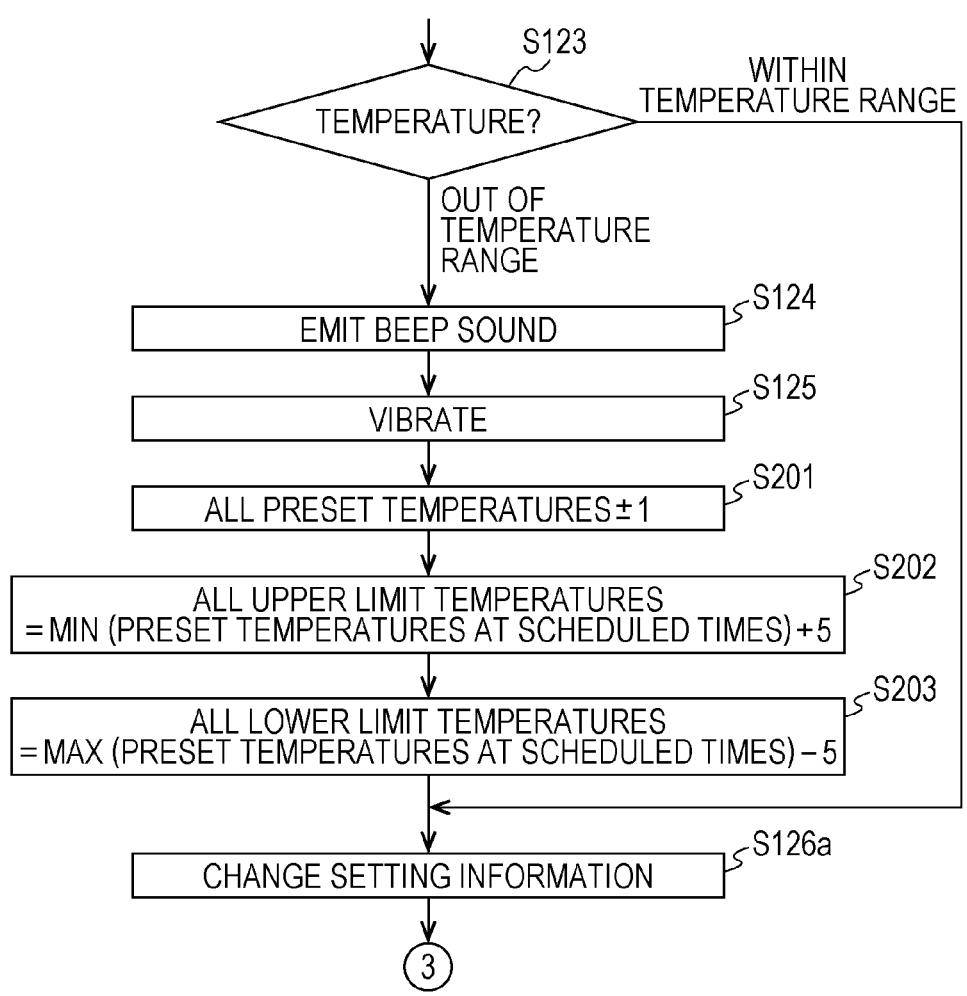
FIG. 32 is a flow chart illustrating operation for setting a preset temperature in the mobile terminal in Embodiment 2.

Steps S123, S124, and S125 in the flow chart illustrated in FIG. 32 are identical to Steps S123, S124, and S125 in the flow chart illustrated in FIG. 9, respectively.

Differences from the flow chart illustrated in FIG. 9 are mainly described below.

In a case where an input temperature is not within a range between an upper limit temperature and a lower limit temperature ("OUT OF TEMPERATURE RANGE" in Step S123), especially in a case where the input temperature is larger than the upper limit temperature, a control unit 117 adds one degree to a preset temperature at every scheduled time in the step that follows Step S125. In a case where the input temperature is smaller than the lower limit temperature, the control unit 117 subtracts one degree from a preset temperature at every scheduled time (Step S201).

Next, the control unit 117 calculates all upper limit temperatures by the following formula:

upper limit temperature=MIN(changed preset temperatures at scheduled times)+5(calculated for all of the scheduled times)(Step S202)

Next, the control unit 117 calculates all lower limit temperatures by the following formula:

lower limit temperature=MAX(changed preset temperatures at scheduled times)−5(calculated for all of the scheduled times)(Step S203)

After all of the upper limit temperatures and all of the lower limit temperature have been changed, the control unit 117 overwrites the upper limit temperatures and the lower limit temperatures at all of the scheduled times in a temperature range table 122 with the newly calculated upper limit temperatures and lower limit temperatures. Furthermore, the control unit 117 overwrites preset temperatures at all of the scheduled times in the air conditioner control information table 123 with the newly calculated preset temperatures (Step S126a).

Then, the control unit 117 transmits the air conditioner control information table 123 to a server device 103 as in the air conditioner remote control system 10.

In the case of the setting screen 620 illustrated in FIG. 31, MIN (preset temperatures at respective times)=22 degrees and MAX (preset temperatures at respective times)=27 degrees, and therefore the upper limit temperature and the lower limit temperature are calculated as follows:

upper limit temperature=22+5=27 degrees lower limit temperature=27−5=22 degrees.

In the case of the setting screen 620, a preset temperature in the central cylinder-type indicator 622 is a lower limit temperature, and therefore operation for further reducing the temperature causes the temperature to be below the lower limit temperature.

In the air conditioner remote control system 10h, in a case where operation for reducing a preset temperature at a certain scheduled time to a temperature that is lower than a lower limit temperature is performed, preset temperatures at all scheduled times are reduced by one degree. Because of such control, a preset temperature at each time can remain within a recommended temperature range even in a case where operation for reducing the preset temperature to a temperature that is lower than the lower limit temperature is performed in the central cylinder-type indicator 622. The same applies to a case where operation for increasing a preset temperature to a temperature that is higher than the upper limit temperature is performed.

3. Embodiment 3

An air conditioner remote control system 10i according to Embodiment 3 of the present disclosure is described below.

The air conditioner remote control system 10i has a configuration similar to the air conditioner remote control system 10. Differences from the air conditioner remote control system 10 are mainly described below.

A mobile terminal 101 of the air conditioner remote control system 10i may display, for example, a setting screen 200n illustrated in FIG. 26. On the setting screen 200n, preset temperatures are displayed in a graph region 276.

Figure 33A:
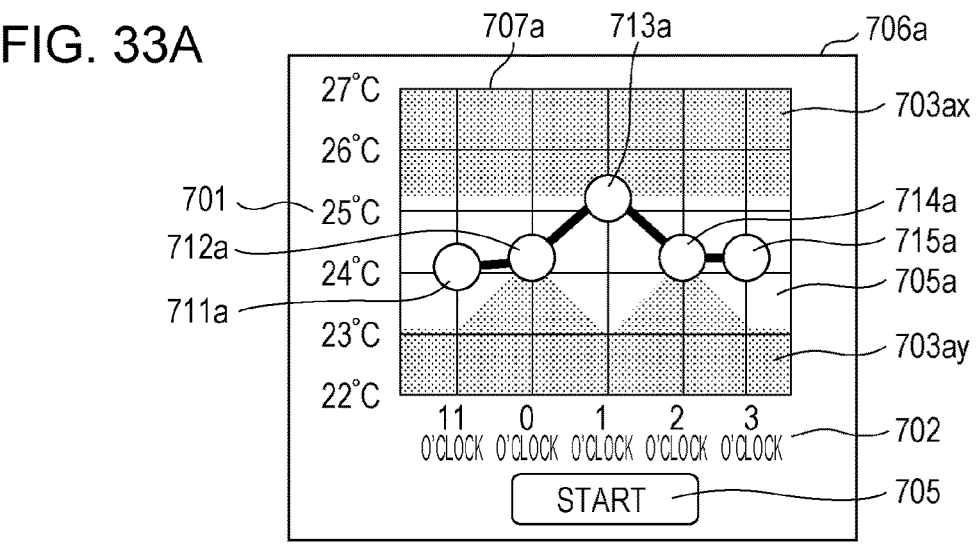
FIG. 33A is a diagram illustrating a setting screen displayed on a mobile terminal in Embodiment 3.

FIG. 33A illustrates another example of a setting screen displayed on the mobile terminal 101 of the air conditioner remote control system 10i.

In a central part of a setting screen 706a illustrated in FIG. 33A, a rectangular graph region 707a is displayed. A horizontal axis 702 is displayed below the graph region 707a, and a vertical axis 701 is displayed on the left of the graph region 707a. A start button 705 is displayed below the horizontal axis 702.

The horizontal axis 702 represents a change of time. Scale values indicative of a plurality of scheduled times are displayed along the horizontal axis 702 in a horizontal direction. On the setting screen 706a, "11 O'CLOCK", "0 O'CLOCK", "1 O'CLOCK", "2 O'CLOCK", and "3 O'CLOCK" are displayed as scheduled times from left to right. Positions corresponding to "11 O'CLOCK", "0 O'CLOCK", "1 O'CLOCK", "2 O'CLOCK", and "3 O'CLOCK" indicate that scheduled times are 11 o'clock, 0 o'clock, 1 o'clock, 2 o'clock, and 3 o'clock, respectively.

The vertical axis 701 represents a change of temperature. Scale values indicative of a plurality of temperatures are displayed along the vertical axis 701 in a vertical direction. On the setting screen 200a, "27° C.", "26° C.", "25° C.", "24° C.", "23° C.", and "22° C." are displayed from top to bottom. Positions corresponding to "27° C.", "26° C.", "25°

C.", "24° C.", "23° C.", and "22° C." indicate that temperatures are 27° C., 26° C., 25° C., 24° C., 23° C., and 22° C., respectively.

The graph region 707a is divided into a high temperature region 703ax, a recommended temperature region 705a, and a low temperature region 703ay. The high temperature region 703ax is a temperature region that is higher than an upper limit temperature at each scheduled time (in other words, a range that is out of a recommended temperature range). The recommended temperature region 705a is a temperature region that is not more than an upper limit temperature and not less than a lower limit temperature at each scheduled time (in other words, the recommended temperature range). The low temperature region 703ay is a temperature region that is lower than a lower limit temperature at each scheduled time (in other words, a range that is out of the recommended temperature range).

In the graph region 707a, a temperature indication is displayed for each scheduled time at a position that corresponds to the scheduled time and a preset temperature corresponding to the scheduled time. As a result, a plurality of temperature indications 711a, 712a, 713a, 714a, and 715a are displayed in the graph region 707a.

A user of the mobile terminal 101 can change preset temperatures at respective scheduled times by sliding the temperature indications 711a, 712a, 713a, 714a, and 715a indicative of the preset temperatures at the respective scheduled times upward or downward.

An upper limit temperature and a lower limit temperature at each scheduled time are determined by the following formula:

upper limit temperature=MIN(preset temperature at adjacent scheduled time on the right+1,preset temperature at adjacent scheduled time on the left+1)    formula 7 lower limit temperature=MAX(adjacent preset temperature on the right−1,adjacent preset temperature on the left−1)    formula 8

In the case illustrated in FIG. 33A, at the scheduled time "1 o'clock", upper limit temperature=MIN(preset temperature (24 degrees) at adjacent scheduled time on the left (scheduled time"0 O'CLOCK")+1,preset temperature at adjacent scheduled time on the right (24 degrees) (scheduled time"2 O'CLOCK")+1) =25 degrees, lower limit temperature=MAX(preset temperature (24 degrees) at adjacent scheduled time on the right (scheduled time"0 O'CLOCK")−1,preset temperature at adjacent scheduled time on the right (24 degrees) (scheduled time"2 O'CLOCK")−1)=23 degrees.

Accordingly, the recommended temperature region (recommended temperature range) is from 23 degrees to 25 degrees.

In the case illustrated in FIG. 33A, the preset temperature at the scheduled time "1 O'CLOCK" indicated by the temperature indication 713a is already an upper limit temperature. Accordingly, operation for further increasing the preset temperature causes the preset temperature to be out of the recommended temperature range.

Figure 33B:
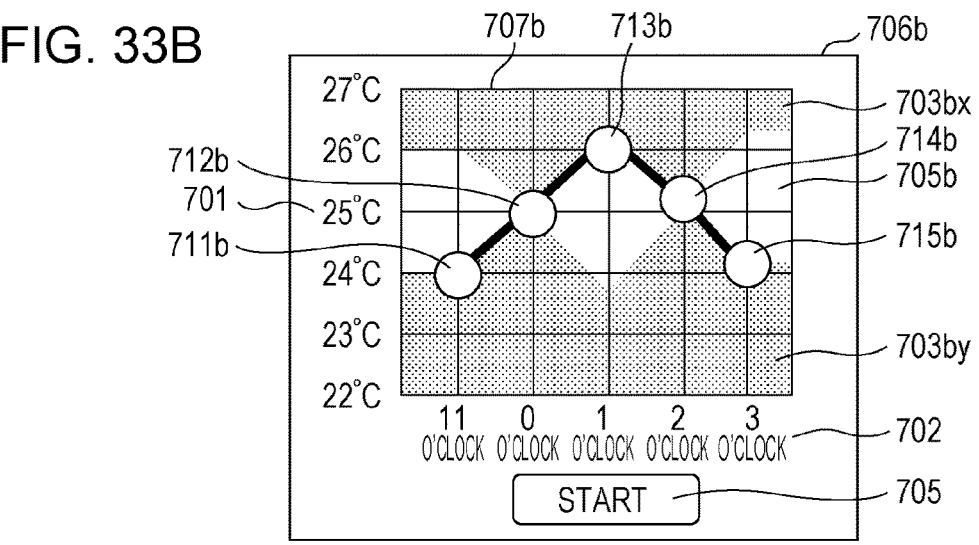
FIG. 33B is a diagram illustrating a setting screen displayed on the mobile terminal in Embodiment 3.

In the air conditioner remote control system 10i, in a case where operation for increasing a preset temperature at a certain scheduled time to a temperature that is out of the recommended temperature range, preset temperatures at adjacent scheduled times are increased by one degree as illustrated in FIG. 33B.

Specifically, in a case where a user performs operation for moving the temperature indication 713a illustrated in FIG. 33A to a position that is higher than the recommended temperature region 705a, the control unit 117 displays a temperature indication 713b at a position of 26° C. as illustrated in FIG. 33B.

Next, the control unit 117 increases adjacent temperature indications on both sides of the temperature indication 713b by one degree. In other words, the control unit 117 increases, by one degree, preset temperatures at the scheduled times 0 o'clock and 2 o'clock on both sides of the scheduled time 1 o'clock. Then, the control unit 117 moves the temperature indications 712a and 714a in FIG. 33A upward by one degree to positions indicated by temperature indications 712b and 714b as illustrated in FIG. 33B, respectively.

Next, the control unit 117 recalculates an upper limit temperature and a lower limit temperature at each scheduled time in accordance with the formulas 7 and 8. The control unit 117 overwrites the temperature range table 122 with the recalculated upper limit temperature and lower limit temperature at each scheduled time.

Because of such control, a preset temperature at each time can remain within a recommended temperature range even in a case where operation for increasing the preset temperature at the scheduled time "1 O'CLOCK" to a temperature that is out of the recommended temperature range is performed.

Figure 33C:
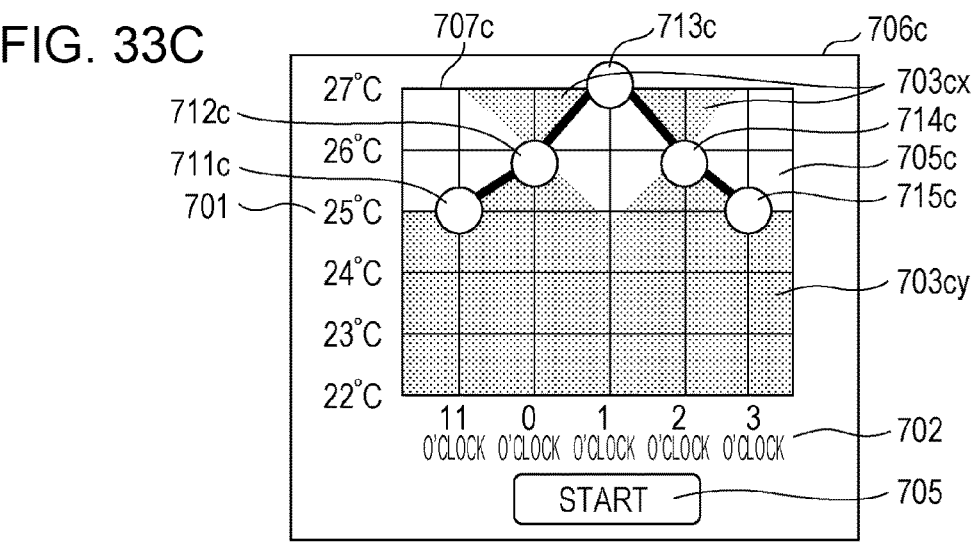
FIG. 33C is a diagram illustrating a setting screen displayed on the mobile terminal in Embodiment 3.

On a setting screen 706b illustrated in FIG. 33B, in a case where operation for increasing the preset temperature at the scheduled time "1 O'CLOCK" by one more degree, control operation for also increasing scheduled times adjacent to the adjacent scheduled times by one degree may be performed as illustrated in FIG. 33C.

Specifically, in a case where a user performs operation for moving the temperature indication 713b illustrated in FIG. 33B to a position that is higher than a recommended temperature region 705b, the control unit 117 displays a temperature indication 713c at a position of 27° C. as illustrated in FIG. 33C.

Next, the control unit 117 increases adjacent temperature indications on both sides of the temperature indication 713c by one degree. In other words, the control unit 117 increases, by one degree, preset temperatures at the scheduled times 0 o'clock and 2 o'clock on both sides of the scheduled time 1 o'clock. Then, the control unit 117 moves the temperature indications 712b and 714b in FIG. 33B upward by one degree to positions indicated by temperature indications 712c and 714c as illustrated in FIG. 33C, respectively.

Because of such control, a user can change a preset temperature to an upper limit temperature or a lower limit temperature without paying attention to the recommended temperature range.

When the change is completed, the air conditioner control information table is transmitted to the server device 103 in response to tap operation of the start button 705. A subsequent control method is similar to that in the air conditioner remote control system 10, and description thereof is omitted.

Operation in the air conditioner remote control system 10i is described below with reference to the flow chart illustrated in FIG. 34.

Figure 34:
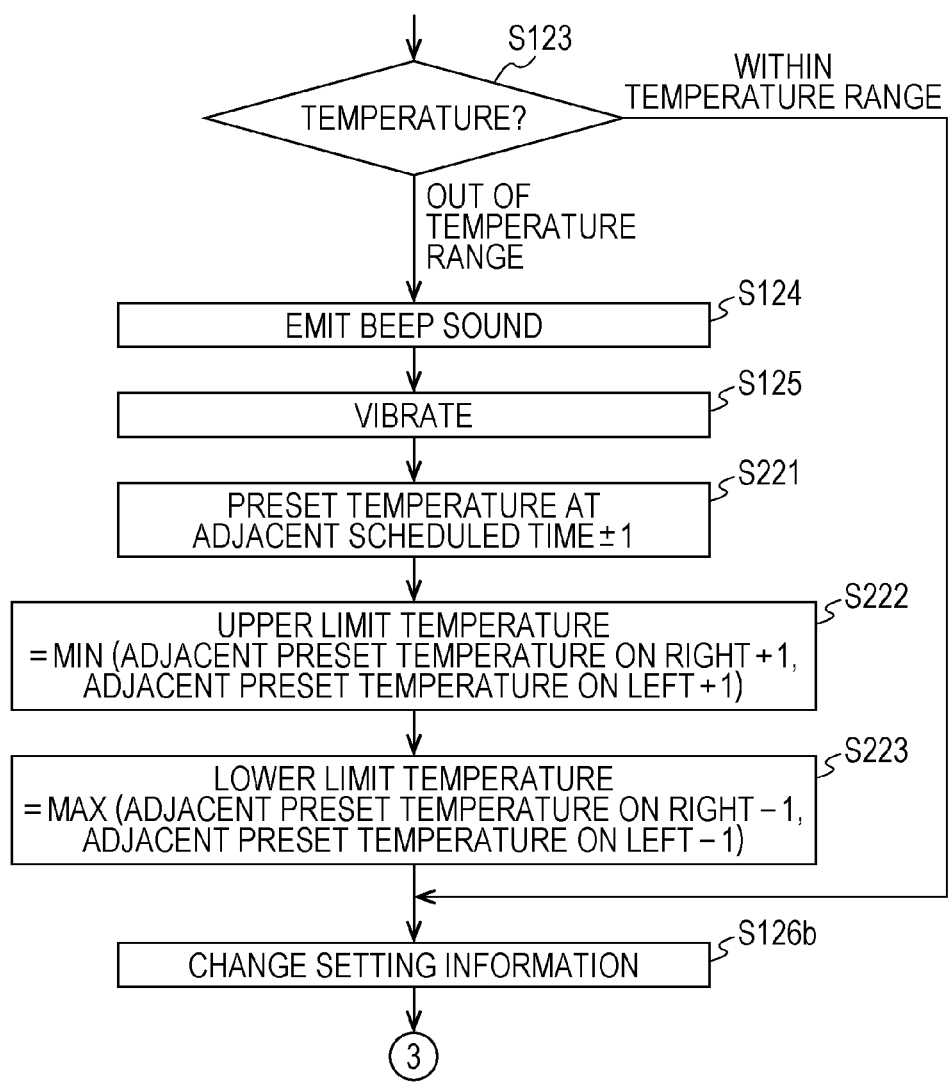
FIG. 34 is a flow chart illustrating operation for setting a preset temperature in the mobile terminal in Embodiment 3.

Steps S123, S124, and S125 of the flow chart illustrated in FIG. 34 are identical to Steps S123, S124, and S125 of the flow chart illustrated in FIG. 9, respectively.

Differences from the flow chart illustrated in FIG. 9 are mainly described below.

In a case where an input temperature is not within a range between an upper limit temperature and a lower limit temperature ("OUT OF TEMPERATURE RANGE" in Step S123), especially in a case where the input temperature is higher than the upper limit temperature, the control unit 117 increases preset temperatures at adjacent scheduled times by one degree in the step that follows Step S125. Meanwhile, in a case where the input temperature is lower than the lower limit temperature, the control unit 117 reduces the preset temperatures at the adjacent scheduled times by one degree (Step S221).

Next, the control unit 117 calculates an upper limit temperature as follows (Step S222):

> upper limit temperature=MIN(preset temperature at adjacent scheduled time on the right+1,preset temperature at adjacent scheduled time on the left+1)

Next, the control unit 117 calculates a lower limit temperature as follows (Step S223):

> lower limit temperature=MAX(preset temperature at adjacent scheduled time on the right−1,preset temperature at adjacent scheduled time on the left−1)

Next, the control unit 117 updates the temperature range table 122 and the air conditioner control information table 123 with the preset temperature at each scheduled time and the upper limit temperature and lower limit temperature at each scheduled time (Step S126b).

4. Other Modifications

The present disclosure have been descried above based on the embodiments above. Needless to say, however, the present disclosure is not limited to the embodiments above. The following cases are also encompassed in the present disclosure.

Figure 35:
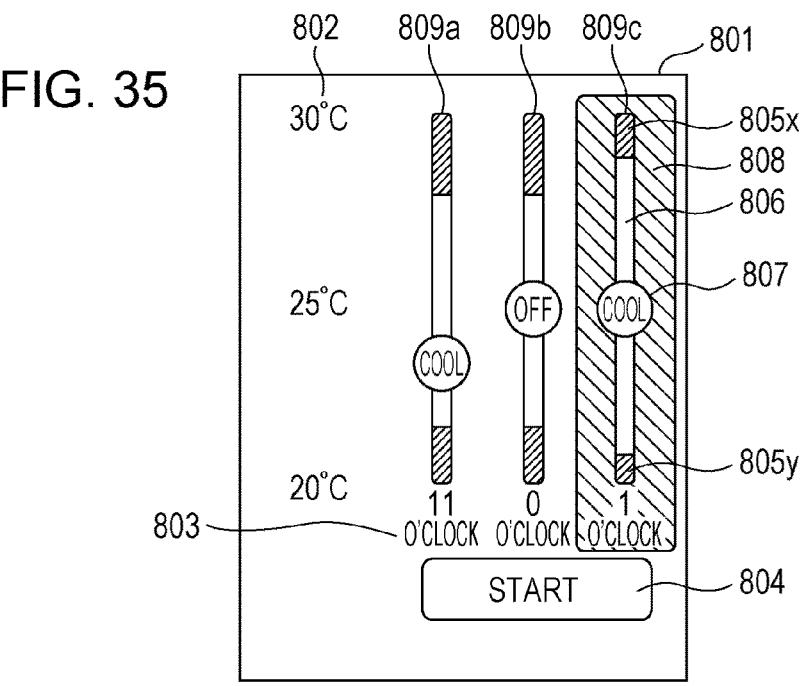
FIG. 35 is a diagram illustrating a setting screen displayed on a mobile terminal in another modification.

(1) A control unit 117 may display a setting screen 801 illustrated in FIG. 35 instead of the setting screen 200a illustrated in FIG. 5A.

The setting screen 801 is similar to the setting screen 200a. Differences from the setting screen 200a are mainly described below.

Items related to an upper limit temperature and a lower limit temperature are background parts related to the upper limit temperature and the lower limit temperature. A display control unit 117d may cause the background parts to be displayed in different colors or different decorations.

More specifically, the setting screen 801 includes a vertical axis 802, a horizontal axis 803, a plurality of temperature bars 809a, 809b, and 809c, a plurality of temperature setting buttons, and a start button 804, as illustrated in FIG. 35.

In the temperature bars 809a and 809b, a difference between an upper limit temperature and a lower limit temperature is less than a range threshold value. Meanwhile, in the temperature bar 809c, a difference between an upper limit temperature and a lower limit temperature is equal to or larger than the range threshold value.

The display control unit 117d decorates background parts of the temperature bars 809a and 809b in a first pattern. The first pattern is a pattern with no decoration.

Meanwhile, the display control unit 117d decorates a background part 808 of the temperature bar 809c in a second pattern. The second pattern is not a pattern with no decoration. The decoration of the second pattern is, for example, hatching.

The display control unit 117d may color the background parts. Specifically, a first color may be used instead of the decoration of the first pattern, and a second color may be used instead of the decoration of the second pattern.

The display control unit 117d may cause the sizes of the background parts to be different from each other. Specifically, the background parts decorated in the first pattern may be made larger, and the background part decorated in the second pattern may be made smaller.

The display control unit 117d may cause characters of different character styles to be displayed in the background parts. Specifically, characters of a first character style may be used instead of the decoration of the first pattern, and characters of a second character style may be used instead of the decoration of the second pattern. The displayed characters are, for example, "EQUAL TO OR LARGER THAN THRESHOLD VALUE", "LESS THAN THRESHOLD VALUE", and the like.

As described above, a background part of a temperature bar in which a difference between an upper limit temperature and a lower limit temperature is equal to or larger than a range threshold value is displayed in a form different from that of a temperature bar in which a difference between an upper limit temperature and a lower limit temperature is less than the range threshold value.

This allows a user to distinguish whether or not a difference between an upper limit temperature and a lower limit temperature is equal to or larger than the range threshold value.

Figure 36:
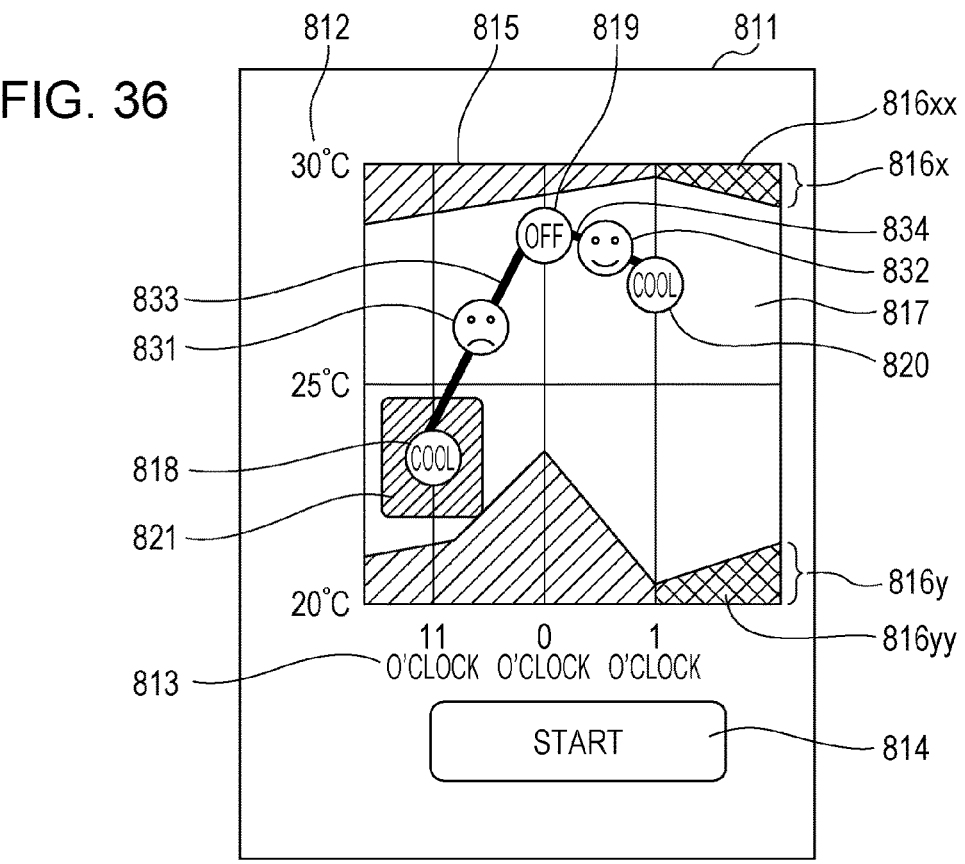
FIG. 36 is a diagram illustrating a setting screen displayed on a mobile terminal in another modification.

(2) A control unit 117 may display a setting screen 811 illustrated in FIG. 36 instead of the setting screen 200n illustrated in FIG. 26.

The setting screen 811 is similar to the setting screen 200n. Differences from the setting screen 200n are mainly described below.

An acquiring unit 117a acquires an upper limit temperature and a lower limit temperature of a target temperature in one time zone in an air conditioner 102. A calculating unit 117b calculates a difference between the acquired upper limit temperature and lower limit temperature. A determining unit 117c determines whether or not the calculated difference is equal to or larger than a range threshold value. A display control unit 117d causes items related to the upper limit temperature and the lower limit temperature in a case where the difference between the upper limit temperature and the lower limit temperature is equal to or larger than the range threshold value to be displayed on the setting screen 811 in a form different from those in a case where the difference is less than the range threshold value.

The control unit 117 accepts user's selection of a preset temperature in each of a plurality of time zones on the setting screen 811. The calculating unit 117b calculates a difference between a first preset temperature selected in a first time zone and a second preset temperature selected in a second time zone adjacent to the first time zone among the plurality of time zones. The determining unit 117c determines whether or not the calculated difference is equal to or larger than an adjacency threshold value. In a case where the difference is equal to or larger than the adjacency threshold value, the display control unit 117d causes items related to the first preset temperature and/or the second preset temperature to be displayed on the setting screen 811 in a form different from those in a case where the difference is less than the adjacency threshold value.

The items related to the upper limit temperature and the lower limit temperature are background parts related to the upper limit temperature and the lower limit temperature. The display control unit 117d may cause the background parts to be displayed by using different colors or different decorations.

More specifically, a rectangular graph region 815 is displayed in a central part of the setting screen 811. A horizontal axis 813 is displayed below the graph region 815, and a vertical axis 812 is displayed on the left of the graph region 815. A start button 814 is displayed below the horizontal axis 813.

The graph region 815 is divided into a high temperature region 816x, a recommended temperature region 817, and a low temperature region 816y. In the graph region 815, a temperature indication is displayed for each scheduled time at a position that corresponds to the scheduled time and a preset temperature corresponding to the scheduled time. As a result, a plurality of temperature indications 818, 819, and 820 are displayed in the graph region 815.

In the graph region 815, an indication for determination 831 is displayed on a line 833 connecting the temperature indications 818 and 819. An indication for determination 832 is displayed on a line 834 connecting the temperature indications 819 and 820.

It is assumed here that a difference between two preset temperatures indicated by the temperature indications 818 and 819 is equal to or larger than an adjacency threshold value. Furthermore, it is assumed that a difference between two preset temperatures indicated by the temperature indications 819 and 820 is less than the adjacency threshold value.

The indication for determination 831 and the indication for determination 832 indicate whether or not the difference is equal to or larger than the adjacency threshold value. The indication for determination 831 and the indication for determination 832 are displayed in different forms.

Out of two preset temperatures for which the difference is equal to or larger than the adjacency threshold value, a background part of a temperature indication for displaying one preset temperature and a background part of a temperature indication for displaying the other preset temperature are displayed in different forms.

On the setting screen 811, the background parts of the temperature indications 819 and 820 are decorated in a first pattern. The first pattern is a pattern with no decoration.

Meanwhile, the display control unit 117d decorates the background part of the temperature indication 818 in a second pattern. The second pattern is not a pattern with no decoration. The second pattern is, for example, hatching. The display control unit 117d may color the background part of the temperature indication 818.

As described above, in a case where a difference between two preset temperatures at adjacent two scheduled times is equal to or larger than an adjacency threshold value, a temperature indication indicating one of the two preset temperatures is displayed in a different form from a temperature indication indicating the other one of the two preset temperatures.

This allows a user to distinguish whether or not a difference between two preset temperatures at adjacent two scheduled times is equal to or larger than an adjacency threshold value.

On the setting screen 811, it is assumed that a difference between an upper limit temperature and a lower limit temperature in each of time zones 11 o'clock and 0 o'clock is less than a range threshold value. Meanwhile, it is assumed that a difference between an upper limit temperature and a lower limit temperature in a time zone 1 o'clock is equal to or larger than the range threshold value.

At 1 o'clock at which the difference between the upper limit temperature and the lower limit temperature is equal to or larger than the range threshold value, the display control unit 117d hatches a region 816xx and a region 816yy with diagonally rightward lines and diagonally leftward lines in the temperature region 816x and the low temperature region 816y. Meanwhile, the other regions of the high temperature region 816x and the low temperature region 816y are hatched with diagonally rightward lines.

As described above, the display control unit 117d causes a non-recommended temperature region in a case where a difference between an upper limit temperature and a lower limit temperature is equal to or larger than a range threshold value to be displayed on the setting screen 811 as an item related to the upper limit temperature and the lower limit temperature in a form different from that in a case where the difference is less than the range threshold value.

Alternatively, the display control unit 117d may cause a recommended temperature region in a case where a difference between an upper limit temperature and a lower limit temperature is equal to or larger than a range threshold value to be displayed on the setting screen 811 as an item related to the upper limit temperature and the lower limit temperature in a form different from that in a case where the difference is less than the range threshold value.

(3) The following is also possible.

(a) One aspect of the present disclosure is a method for controlling a terminal that controls an air conditioner. The terminal includes a display. The method for controlling the terminal includes causing a computer which is the terminal to: display, on the display, a temperature setting screen on which a user can set preset temperatures of the air conditioner in a respective plurality of time zones; display, in different forms on the temperature setting screen, a display target related to a preset temperature for which a difference between a maximum value and a minimum value of the preset temperature is larger than a predetermined value and a display target related to another preset temperature in the plurality of time zones; in a case where the preset temperatures of the air conditioner have been set by the user, hold the preset temperatures at the respective plurality of time zones that have been set on the temperature setting screen; and supply a control command for changing the preset temperatures of the air conditioner on the basis of the held preset temperatures at the respective plurality of time zones to a network at a predetermined timing.

(b) Another aspect of the present disclosure is a method for controlling a terminal that controls an air conditioner. The terminal includes a display. The method for controlling the terminal includes causing a computer which is the terminal to: display, on the display of a computer which is the terminal, a temperature setting screen on which a user can set preset temperatures of the air conditioner in a respective plurality of time zones; display, in different forms on the temperature setting screen, a display target related to a preset temperature for which a difference from a preset temperature in an adjacent time zone among the plurality of time zones is larger than a predetermined value and a display target related to another preset temperature; in a case where the preset temperatures of the air conditioner have been set by the user, hold the preset temperatures at the respective plurality of time zones that have been set on the temperature setting screen; and supply a control command for changing the preset temperatures of the air conditioner on the basis of the held preset temperatures at the respective plurality of time zones to a network at a predetermined timing.

(c) The method may be arranged such that the preset temperature for which the difference is larger than the predetermined value is displayed on the temperature setting screen in a font attribute different from the other preset temperature.

(d) The method may be arranged such that operation parts for changing the preset temperatures are displayed on the temperature setting screen; user's operation for setting the preset temperatures on the temperature setting screen is performed by moving the operation parts; and a movable region of an operation part corresponding to the preset temperature for which the difference is larger than the predetermined value is displayed in a color different from a movable region of an operation part corresponding to the other preset temperature.

(e) The method may be arranged such that operation parts for changing the preset temperatures are displayed on the temperature setting screen; user's operation for setting the preset temperatures on the temperature setting screen is performed by moving the operation parts on rails; and a rail corresponding to the preset temperature for which the difference is larger than the predetermined value is displayed in a width different from a rail corresponding to the other preset temperatures.

(f) The method may be arranged such that a background of a part of the temperature setting screen that corresponds to the preset temperature for which the difference is larger than the predetermined value is displayed in a color different from that of a part of the temperature setting screen that corresponds to the other preset temperature.

(g) The method may be arranged such that volume controllers for changing the preset temperatures are displayed on the temperature setting screen; and a memory of a volume controller corresponding to the preset temperature for which the difference is larger than the predetermined value is displayed in a color different from that of a volume controller corresponding to the other preset temperature.

(h) Another aspect of the present disclosure is a method for controlling a terminal that controls an air conditioner. The terminal includes a display. The method for controlling the terminal includes causing a computer which is the terminal to: display, on the display, a temperature setting screen on which a user can set preset temperatures of the air conditioner in a respective plurality of time zones; perform different types of control on setting operation of a preset temperature for which a difference between a maximum value and a minimum value of the preset temperature is larger than a predetermined value and on setting operation of another preset temperature on the temperature setting screen in the plurality of time zones; in a case where the preset temperatures of the air conditioner have been set by the user, hold the preset temperatures at the respective plurality of time zones that have been set on the temperature setting screen; and supply a control command for changing the preset temperatures of the air conditioner on the basis of the held preset temperatures at the respective plurality of time zones to a network at a predetermined timing.

(i) Another aspect of the present disclosure is a method for controlling a terminal that controls an air conditioner. The terminal includes a display. The method for controlling the terminal includes causing a computer which is the terminal to: display, on the display, a temperature setting screen on which a user can set preset temperatures of the air conditioner in a respective plurality of time zones; perform different types of control on setting operation of a preset temperature for which a difference from a preset temperature in an adjacent time zone among the plurality of time zones is larger than a predetermined value and on setting operation of another preset temperature on the temperature setting screen; in a case where the preset temperatures of the air conditioner have been set by the user, hold the preset temperatures at the respective plurality of time zones that have been set on the temperature setting screen; and supply a control command for changing the preset temperatures of the air conditioner on the basis of the held preset temperatures at the respective plurality of time zones to a network at a predetermined timing.

(j) The method may be arranged such that setting operation of the preset temperature for which the difference is larger than the predetermined value may be restricted on the temperature setting screen.

(k) The method may be arranged such that a first button for increasing the preset temperature and a second button for reducing the preset temperature are displayed on the temperature setting screen; the user's setting operation of the preset temperature on the temperature setting screen is performed by selecting the first button or the second button; and in a case where selection of the first button or the second button makes the difference larger than the predetermined value, selection of this button is restricted.

(l) The method may be arranged such that an operation part for changing the preset temperature is displayed on the temperature setting screen; the user's setting operation of the preset temperature on the temperature setting screen is performed by moving the operation part; and in a case where movement of the operation part in a specific direction makes the difference larger than the predetermined value, movement of the operation part in the specific direction is restricted.

(m) The method may be arranged such that the setting operation of the preset temperature for which the difference is larger than the predetermined value is restricted by hiding the preset temperature for which the difference is larger than the predetermined value on the temperature setting screen.

(n) The method may be arranged such that in a case where setting operation for setting a preset temperature for which the difference is larger than the predetermined value is performed on the temperature setting screen, the preset temperature is automatically corrected so that the difference becomes not larger than the predetermined value.

(o) The method may be arranged such that an operation part for changing the preset temperature is displayed on the temperature setting screen; the user's setting operation of the preset temperature on the temperature setting screen is performed by moving the operation part; and in a case where movement of the operation part in a specific direction makes the difference larger than the predetermined value, the operation part is automatically moved to a range in which the difference is not larger than the predetermined value.

(p) The method may be arranged such that in a case where setting operation for setting a preset temperature for which the difference is larger than the predetermined value has been performed on the temperature setting screen, preset temperatures in time zones other than the time zone in which the setting operation has been performed are also changed in accordance with the setting operation.

(q) The method may be arranged such that in a case where setting operation for setting a preset temperature for which the difference is larger than the predetermined value has been performed on the temperature setting screen, the user is warned.

(r) The method may be arranged such that in a case where setting operation for setting a preset temperature for which the difference is larger than the predetermined value has been performed on the temperature setting screen, the user is warned by changing display of the temperature setting screen.

(s) The method may be arranged such that in a case where setting operation for setting a preset temperature for which the difference is larger than the predetermined value has been performed on the temperature setting screen, the user is warned by causing the terminal to emit a warning sound.

(t) The method may be arranged such that in a case where setting operation for setting a preset temperature for which the difference is larger than the predetermined value has been performed on the temperature setting screen, the user is warned by vibrating the terminal.

As described above, according to the present disclosure, detailed setting of a preset temperature of an air conditioner in each time zone is possible by using a mobile terminal. This makes it possible to control the temperature according to user's preference and to avoid a change in physical condition and an increase in power consumption due to a rapid change of temperature by restricting a fluctuation range of the preset temperature.

(4) Each of the devices described above is a computer system constituted by a microprocessor, a ROM, a RAM, a hard disc unit, a display unit, and the like. A computer program is stored in the RAM and the hard disc unit. The computer program is made up of a plurality of command codes indicative of commands for a computer so that a predetermined function is accomplished. The microprocessor operates in accordance with the computer program. Thus, the devices accomplish functions thereof. That is, the microprocessor reads out commands included in the computer program one by one, decodes the read commands, and operates in accordance with the result of decoding.

The microprocessor operates in accordance with the commands included in the computer program stored in the RAM or the hard disc unit. This allows it to appear as if the computer program and the microprocessor constitute a single hardware circuit and this hardware circuit is operating.

(5) One or more of the constituent elements constituting each of the devices described above may be realized by a single system LSI (Large Scale Integration). The system LSI is a super-multifunctional LSI produced by integrating a plurality of elements on a single chip. Specifically, the system LSI is a computer system including a microprocessor, a ROM, a RAM, and the like. A computer program is stored in the RAM. The microprocessor operates in accordance with the computer program. Thus, the system LSI accomplishes functions thereof.

The constituent elements constituting each of the devices described above may be realized as individual chips or some or all of the constituent elements may be realized as a single chip. The term "LSI" is used, but the term "IC", "system LSI", "super LSI", or "ultra LSI" may be used depending on the degree of integration.

The LSI is constituted by a plurality of circuit blocks.

Furthermore, means to achieve integration is not limited to an LSI and may be a special circuit or a general-purpose processor. An FPGA (Field Programmable Gate Array) that can be programmed after production of an LSI or a reconfigurable processor in which connection or setting of circuit cells inside an LSI can be reconfigured can be also used.

If a technique of integration circuit that replaces an LSI appears in the future as a result of advancement of the semiconductor technique or appearance of another technique deriving from the semiconductor technique, integration of the functional blocks can be achieved by using such a technique.

(6) One or more of the constituent elements constituting each of the devices described above may be realized by an IC card that can be attached to and detached from the device or a stand-alone module. The IC card or the module is a computer system constituted by a microprocessor, a ROM, a RAM, and the like. The IC card or the module may include the super-multifunctional LSI. The microprocessor operates in accordance with a computer program. Thus, the IC card or the module accomplishes functions thereof. The IC card or the module may have tamper resistance.

(7) The present disclosure may be the computer program or may be a digital signal made up of the computer program.

The present disclosure may be a computer-readable non-transitory recording medium, such as a flexible disc, a hard disc, a CD-ROM, an MO, a DVD, a DVD-ROM, a DVD-RAM, a BD (Blu-ray Disc), or a semiconductor memory, in which the computer program or the digital signal is stored. Alternatively, the present disclosure may be the computer program or the digital signal stored in these recording media.

The present disclosure may be the computer program or the digital signal transmitted via an electrical communication line, a wireless or wired communication line, a network represented by the Internet, data broadcasting, or the like.

The program or the digital signal may be executed by another independent computer system by recording the program or the digital signal on the recording medium and delivering the recording medium or by delivering the program or the digital signal via the network or the like.

(8) The embodiment and the modifications described above may be combined.

A method for controlling a terminal device that remotely operates an air conditioner according to the present disclosure has an excellent effect of being capable of warning a user not to rapidly change the ambient temperature of the air conditioner. Therefore, the present disclosure is useful as a technique used in a terminal device that remotely operates an air conditioner.

What is claimed is:

1. A method for controlling a terminal device that controls an air conditioner via a network, the terminal device including a computer, a memory, and a display, comprising causing the computer to:
acquire information, stored in the memory, on correspondence among a plurality of time zones, and target upper limit temperatures and target lower limit temperatures of the air conditioner that correspond to the respective plurality of time zones, the target upper limit temperatures being upper limit values of recommended preset temperatures of the air conditioner, and the target lower limit temperatures being lower limit values of the recommended preset temperatures of the air conditioner; and
display, on the display, a setting screen that allows a user to set, for each time zone of the plurality of time zones, a preset temperature of the air conditioner within a recommended temperature range between a target upper limit temperature and a target lower limit temperature corresponding to a respective time zone,
wherein the setting screen includes a graph region in which a graph whose first axis corresponds to the plurality of time zones and whose second axis orthogonal to the first axis corresponds to the preset temperatures of the air conditioner is displayed, wherein the graph region includes, in each time zone of the plurality of time zones, a first temperature region displayed in a first display form, a second temperature region displayed in a second display form, and a symbol indicative of a corresponding preset temperature being displayed in the first temperature region, wherein the first temperature region indicates the recommended temperature range for a respective time zone that is not less than the target lower limit temperature and not more than the target upper limit temperature for the respective time zone, and the second temperature region being a temperature region other than the first temperature region, and wherein, when a preset temperature in a target time zone for is adjusted to be outside of a recommended temperature range for the target time zone, preset temperatures for one or more time zones adjacent to the target time zone are adjusted correspondingly such that recommend temperature ranges for the target time zone and the one or more adjacent time zones become modified to keep the adjusted preset temperature for the target time zone and the one or more adjacent time zones within the modified recommended temperature ranges.

2. The method according to claim 1, wherein:
a target upper limit temperature of a time zone is determined by taking a minimum value among:
temperature obtained by adding a predetermined value to a first temperature which is a preset temperature in a first time zone, and
a temperature obtained by adding the predetermined value to a second temperature which is a preset temperature in a second time zone; and
a target lower limit temperature of a time zone is determined by taking a maximum value among:
a temperature obtained by subtracting the predetermined value from the first temperature, and
a temperature obtained by subtracting the predetermined value from the second temperature.

3. The method according to claim 2, wherein:
the first time zone and the second time zone are adjacent time zones among the plurality of time zones.

4. The method according to claim 3, wherein:
the display is a touch panel type display;
the symbol indicative of the corresponding preset temperature is slidable along the second axis by a user's operation;
when the symbol is slid from a first position indicative of a a preset temperature to a second position corresponding to a target temperature a third time zone included in the plurality of time zones, the target temperature corresponding to the second position is compared with a target upper limit temperature corresponding to the third time zone, and the target temperature corresponding to the second position is compared with a target lower limit temperature corresponding to the third time zone;
when the target temperature corresponding to the second position is higher than the target upper limit temperature corresponding to the third time zone, a symbol corresponding to a fourth time zone is moved from a first position indicative of a preset temperature in the fourth time zone to a second position corresponding to a first adjusted preset temperature, the first adjusted preset temperature being obtained by adding the predetermined value to the target temperature; and
when the target eighth temperature is lower than the target lower limit temperature corresponding to the third time zone, the symbol corresponding to the fourth time zone is moved from the first position indicative of the preset temperature in the fourth zone to a third position corresponding to a second adjusted preset temperature, the second adjusted preset temperature being obtained by subtracting the predetermined value from the target temperature.

5. The method according to claim 4, further comprising causing the computer to:
when the symbol corresponding to the fourth time zone is moved to the position indicative of the first adjusted preset temperature, set the preset temperature in the third time zone to the target, set the preset temperature in the fourth time zone to the first adjusted preset temperature, and calculate target upper limit temperatures and target lower limit temperatures of one or more adjacent time zones;
when the symbol corresponding to the fourth time zone is moved to the position indicative of the second adjusted preset temperature, set the preset temperature in the third time zone to the target temperature, set the preset temperature in the fourth time zone to the second adjusted preset temperature, and calculate the target upper limit temperatures and the target lower limit temperatures of the one or more adjacent time zones; and
update display of the first temperature region and the second temperature region in each of the plurality of time zones based on the calculated target upper limit temperatures and the calculated target lower limit temperatures calculated for the one or more adjacent time zones.

6. The method according to claim 5, further comprising causing the computer to update the information on correspondence among the plurality of time zones, target upper limit temperatures, and target lower limit temperatures by using the calculated target upper limit temperatures and the calculated target lower limit temperatures calculated for the one or more adjacent time zones.

7. The method according to claim 1, wherein:
the first display form includes a first color and a first pattern; and
the second display form includes a second color different from the first color and a second pattern different from the first pattern.

8. The method according to claim 4, wherein:
the setting screen includes a button which is pressed by the user when the the preset temperatures in the plurality of time zones have been set;
the terminal device is connected to the air conditioner via at least one of the network and a server device connected via the network; and
the method further comprises causing the computer to:
generate a control command for operating the air conditioner at the set preset temperatures in the plurality of time zones when the button is pressed by the user; and
transmit the generated control command to the air conditioner via at least one of the network and the server device.

9. A terminal device that controls an air conditioner via a network, comprising:
a memory;
a display;
a processor that:
acquires information, stored in the memory, on correspondence among a plurality of time zones, and target upper limit temperatures and target lower limit temperatures of the air conditioner that correspond to the respective plurality of time zones, the target upper limit temperatures being upper limit values of recommended preset temperatures of the air conditioner, and the target lower limit temperatures being lower limit values of the recommended preset temperatures of the air conditioner; and displays, on the display, a setting screen that allows a user to set, for each time zone of the plurality of time zones, a preset temperature of the air conditioner within a recommended temperature range between a target upper limit temperature and a target lower limit temperature corresponding to a respective time zone, wherein the setting screen includes a graph region in which a graph whose first axis corresponds to the plurality of time zones and whose second axis orthogonal to the first axis corresponds to the preset temperatures of the air conditioner is displayed, wherein the graph region includes, in each time zone of the plurality of time zones, a first temperature region displayed in a first display form, a second temperature region displayed in a second display form, and a symbol indicative of a corresponding preset temperature being displayed in the first temperature region, wherein the first temperature region indicates the recommended temperature range for a respective time zone that is not less than the target lower limit temperature and not more than the target upper limit temperature for the respective time zone, and the second temperature region being a temperature region other than the first temperature region, and wherein, when a preset temperature in a target time zone for is adjusted to be outside of a recommended temperature range for the target time zone, preset temperatures for one or more time zones adjacent to the target time zone are adjusted correspondingly such that recommend temperature ranges for the target time zone and the one or more adjacent time zones become modified to keep the adjusted preset temperature for the target time zone and the one or more adjacent time zones within the modified recommended temperature ranges.

10. A system comprising:
an air conditioner; and
a terminal device that controls the air conditioner via a network,
the terminal device comprising:
a memory;
a display;
a processor that:
acquires information, stored in the memory, on correspondence among a plurality of time zones, and target upper limit temperatures and target lower limit temperatures of the air conditioner that correspond to the respective plurality of time zones, the target upper limit temperatures being upper limit values of recommended preset temperatures of the air conditioner, and the target lower limit temperatures being lower limit values of the recommended preset temperatures of the air conditioner; and displays, on the display, a setting screen that allows a user to set, for each time zone of the plurality of time zones, a preset temperature of the air conditioner within a recommended temperature range between a target upper limit temperature and a target lower limit temperature corresponding to a respective time zone, wherein the setting screen includes a graph region in which a graph whose first axis corresponds to the plurality of time zones and whose second axis orthogonal to the first axis corresponds to the preset temperatures of the air conditioner is displayed, wherein the graph region includes, in each time zone of the plurality of time zones, a first temperature region displayed in a first display form, a second temperature region displayed in a second display form, and a symbol indicative of a corresponding preset temperature being displayed in the first temperature region, wherein the first temperature region indicates the recommended temperature range for a respective time zone that is not less than the target lower limit temperature and not more than the target upper limit temperature for the respective time zone, and the second temperature region being a temperature region other than the first temperature region, and wherein, when a preset temperature in a target time zone for is adjusted to be outside of a recommended temperature range for the target time zone, preset temperatures for one or more time zones adjacent to the target time zone are adjusted correspondingly such that recommend temperature ranges for the target time zone and the one or more adjacent time zones become modified to keep the adjusted preset temperature for the target time zone and the one or more adjacent time zones within the modified recommended temperature ranges.

11. A non-transitory computer readable medium storing a program executed by a terminal device, the terminal device including a computer, a memory, and a display, the program causing the computer to:

acquire information, stored in the memory, on correspondence among a plurality of time zones, and target upper limit temperatures and target lower limit temperatures of the air conditioner that correspond to the respective plurality of time zones, the target upper limit temperatures being upper limit values of recommended preset temperatures of the air conditioner, and the target lower limit temperatures being lower limit values of the recommended preset temperatures of the air conditioner; and display, on the display, a setting screen that allows a user to set, for each time zone of the plurality of time zones, a preset temperature of the air conditioner within a recommended temperature range between a target upper limit temperature and a target lower limit temperature corresponding to a respective time zone, wherein the setting screen includes a graph region in which a graph whose first axis corresponds to the plurality of time zones and whose second axis orthogonal to the first axis corresponds to the preset temperatures of the air conditioner is displayed, wherein the graph region includes, in each time zone of the plurality of time zones, a first temperature region displayed in a first display form, a second temperature region displayed in a second display form, and a symbol indicative of a corresponding preset temperature being displayed in the first temperature region, wherein the first temperature region indicates the recommended temperature range for a respective time zone that is not less than the target lower limit temperature and not more than the target upper limit temperature for the respective time zone, and the second temperature region being a temperature region other than the first temperature region, and wherein, when a preset temperature in a target time zone for is adjusted to be outside of a recommended temperature range for the target time zone, preset temperatures for one or more time zones adjacent to the target time zone are adjusted correspondingly such that recommend temperature ranges for the target time zone and the one or more adjacent time zones become modified to keep the adjusted preset temperature for the target time zone and the one or more adjacent time zones within the modified recommended temperature ranges.

12. A method for controlling a terminal device that controls an air conditioner via a network, the terminal device including a computer, a memory, and a display, comprising causing the computer to:

acquire information, stored in the memory, on correspondence among a plurality of time zones, and target upper limit temperatures and target lower limit temperatures of the air conditioner that correspond to the respective plurality of time zones, the target upper limit temperatures being upper limit values of recommended preset temperatures of the air conditioner, and the target lower limit temperatures being lower limit values of the recommended preset temperatures of the air conditioner; and display, on the display, a setting screen that allows a user to set, for each time zone of the plurality of time zones, a preset temperature of the air conditioner within a recommended temperature range between a target upper limit temperature and a target lower limit temperature corresponding to a respective time zone, wherein the setting screen includes a graph region that includes, for each time zone of the plurality of time zones, a first temperature region displayed in a first display form, a second temperature region displayed in a second display form, and a symbol indicative of a corresponding preset temperature being displayed in the first temperature region, wherein the first temperature region indicates the recommended temperature range for a respective time zone that is not less than the target lower limit temperature and not more than the target upper limit temperature for the respective time zone, and the second temperature region being a temperature region other than the first temperature region, and wherein, when a preset temperature in a target time zone for is adjusted to be outside of a recommended temperature range for the target time zone, preset temperatures for one or more time zones adjacent to the target time zone are adjusted correspondingly such that recommend temperature ranges for the target time zone and the one or more adjacent time zones become modified to keep the adjusted preset temperature for the target time zone and the one or more adjacent time zones within the modified recommended temperature ranges.

* * * * *